(12) United States Patent
Kobayashi

(10) Patent No.: US 11,988,579 B2
(45) Date of Patent: May 21, 2024

(54) DERIVATION METHOD OF DIAGNOSING A STATE OF A SUPERSTRUCTURE, DERIVATION DEVICE, DERIVATION SYSTEM, AND PROGRAM

(71) Applicant: SEIKO EPSON CORPORATION, Tokyo (JP)

(72) Inventor: Yoshihiro Kobayashi, Komagane (JP)

(73) Assignee: SEIKO EPSON CORPORATION (JP)

( * ) Notice: Subject to any disclaimer, the term of this patent is extended or adjusted under 35 U.S.C. 154(b) by 23 days.

(21) Appl. No.: 17/852,544

(22) Filed: Jun. 29, 2022

(65) Prior Publication Data
US 2023/0003609 A1 Jan. 5, 2023

(30) Foreign Application Priority Data
Jun. 30, 2021 (JP) .................. 2021-108921

(51) Int. Cl.
*G01M 5/00* (2006.01)
(52) U.S. Cl.
CPC ........ *G01M 5/0041* (2013.01); *G01M 5/0008* (2013.01)

(58) Field of Classification Search
CPC . G01M 5/0041; G01M 5/0066; G01M 5/0008
See application file for complete search history.

(56) References Cited

FOREIGN PATENT DOCUMENTS

| JP | 6467304 B2 | 2/2019 |
|---|---|---|
| JP | 6543863 B2 | 7/2019 |

*Primary Examiner* — Natalie Huls
*Assistant Examiner* — Cynthia L Davis
(74) *Attorney, Agent, or Firm* — Harness, Dickey & Pierce, P.L.C.

(57) ABSTRACT

A dynamic response at a designated position is derived based on a deflection amount normalized by a vibration component of the dynamic response, an amplitude ratio, which is a ratio of a first deflection amount that is the normalized deflection amount indicating a distribution of a vibration amplitude of the observation point to a second deflection amount that is the normalized deflection amount indicating a distribution of a vibration amplitude of a designated position, the vibration component of the designated position derived based on the vibration component and the amplitude ratio, and the static response of the designated position derived based on the time-series data and the estimated value.

13 Claims, 35 Drawing Sheets

DERIVATION METHOD OF DIAGNOSING A STATE OF A SUPERSTRUCTURE, DERIVATION DEVICE, DERIVATION SYSTEM, AND PROGRAM

The present application is based on, and claims priority from JP Application Serial Number 2021-108921, filed Jun. 30, 2021, the disclosure of which is hereby incorporated by reference herein in its entirety.

BACKGROUND

1. Technical Field

The present disclosure relates to a derivation method, a derivation device, a derivation system, and a program.

2. Related Art

In recent years, many social infrastructures have deteriorated over time, and there is a demand for a method for diagnosing a state of a structure constituting a social infrastructure such as a railway bridge.

JP-B-6543863 discloses a method for investigating structural performance of a railway bridge, which makes it possible to appropriately investigate and evaluate structural performance of a bridge by using observation data of acceleration response of the bridge during traveling of a train. In the method for investigating structural performance of a railway bridge according to JP-B-6543863, a theoretical analysis model of dynamic response of a railway bridge during traveling of a train is formulated using a train as a moving load train and a bridge as a simple beam, acceleration of the bridge during traveling of the railway train is measured, and unknown parameters of the theoretical analysis model are estimated from this acceleration data by a reverse analysis method.

JP-B-6467304 discloses a method for obtaining an impact coefficient and a dynamic response component of a bridge by using a vehicle vertical acceleration response of a traveling train particularly when the traveling train passes through the bridge.

There is a case where a formation moving object formed with one or more moving objects, such as a railway train, moves on a structure such as a bridge. In such a case, vibration may occur in the structure due to the movement of the continuous moving objects formed in the formation moving object. Depending on a natural frequency of the structure, the structure may resonate with the vibration generated by the movement of the formation moving object. For a purpose of diagnosis of the structure or the like, there is a demand to obtain a dynamic response at a designated position in the structure where observation is not performed. However, in JP-B-6543863 and JP-B-6467304, it is not possible to obtain a dynamic response at a designated position in the structure where observation is not performed.

SUMMARY

A derivation method includes: an acquisition step of acquiring time-series data including a physical quantity generated at a predetermined observation point in a structure as a response caused by a movement of a formation moving object formed with one or more moving objects on the structure; an environment information acquisition step of acquiring, as environment information, information on a structure length that is a length of the structure, a moving object length that is a length of the moving object, and an installation position of a contact portion of the moving object with the structure; a time point derivation step of deriving an entry time point and an exit time point of the formation moving object with respect to the structure, based on the time-series data; a number acquisition step of acquiring the number of the moving objects formed in the formation moving object; an estimated value acquisition step of acquiring an estimated value of a deflection amount of the structure at the observation point due to a static response generated as the response based on the number, the entry time point, the exit time point, the environment information, and a deflection model of the structure; and a deflection derivation step of deriving a dynamic response at the designated position based on a deflection amount normalized by a vibration component of the dynamic response, which is derived based on the model and the vibration component of the dynamic response that is a difference between the time-series data and the estimated value, an amplitude ratio, which is a ratio of a first deflection amount that is the normalized deflection amount indicating a distribution of a vibration amplitude of the observation point to a second deflection amount that is the normalized deflection amount indicating a distribution of a vibration amplitude at a designated position that is a designated position of the structure, the vibration component of the designated position derived based on the vibration component and the amplitude ratio, and the static response of the designated position derived based on the time-series data and the estimated value.

A derivation device includes: an acquisition unit configured to acquire time-series data including a physical quantity generated at a predetermined observation point in a structure as a response caused by a movement of a formation moving object formed with one or more moving objects on the structure; an environment information acquisition unit configured to acquire, as environment information, information on a structure length that is a length of the structure, a moving object length that is a length of the moving object, and an installation position of a contact portion of the moving object with the structure; a time point derivation unit configured to derive an entry time point and an exit time point of the formation moving object with respect to the structure based on the time-series data; a number acquisition unit configured to acquire the number of the moving objects formed in the formation moving object; an estimated value acquisition unit configured to acquire an estimated value of a deflection amount of the structure at the observation point due to a static response generated as the response based on the number, the entry time point, the exit time point, the environment information, and a deflection model of the structure; and a deflection derivation unit configured to derive a dynamic response at the designated position based on a deflection amount normalized by a vibration component of the dynamic response, which is derived based on the model and the vibration component of the dynamic response that is a difference between the time-series data and the estimated value, an amplitude ratio, which is a ratio of a first deflection amount that is the normalized deflection amount indicating a distribution of a vibration amplitude of the observation point to a second deflection amount that is the normalized deflection amount indicating a distribution of a vibration amplitude at a designated position that is a designated position of the structure, the vibration component of the designated position derived based on the vibration component and the amplitude ratio, and the static response of the designated position derived based on the time-series data and the estimated value.

A derivation system includes a derivation device and a sensor. The derivation device includes: an acquisition unit configured to acquire time-series data including a physical quantity that is generated at a predetermined observation point in a structure as a response caused by a movement of a formation moving object formed with one or more moving objects on the structure and that is measured via the sensor; an environment information acquisition unit configured to acquire, as environment information, information on a structure length that is a length of the structure, a moving object length that is a length of the moving object, and an installation position of a contact portion of the moving object with the structure; a time point derivation unit configured to derive an entry time point and an exit time point of the formation moving object with respect to the structure based on the time-series data; a number acquisition unit configured to acquire the number of the moving objects formed in the formation moving object; an estimated value acquisition unit configured to acquire an estimated value of a deflection amount of the structure at the observation point due to a static response generated as the response based on the number, the entry time point, the exit time point, the environment information, and a deflection model of the structure; and a deflection derivation unit configured to derive a dynamic response at the designated position based on a deflection amount normalized by a vibration component of the dynamic response, which is derived based on the model and the vibration component of the dynamic response that is a difference between the time-series data and the estimated value, an amplitude ratio, which is a ratio of a first deflection amount that is the normalized deflection amount indicating a distribution of a vibration amplitude of the observation point to a second deflection amount that is the normalized deflection amount indicating a distribution of a vibration amplitude at a designated position that is a designated position of the structure, the vibration component of the designated position derived based on the vibration component and the amplitude ratio, and the static response of the designated position derived based on the time-series data and the estimated value.

A non-transitory computer-readable storage medium stores a program, and the program causes a computer to execute: an acquisition step of acquiring time-series data including a physical quantity generated at a predetermined observation point in a structure as a response caused by a movement of a formation moving object formed with one or more moving objects on the structure; an environment information acquisition step of acquiring, as environment information, information on a structure length that is a length of the structure, a moving object length that is a length of the moving object, and an installation position of a contact portion of the moving object with the structure; a time point derivation step of deriving an entry time point and an exit time point of the formation moving object with respect to the structure, based on the time-series data; a number acquisition step of acquiring the number of the moving objects formed in the formation moving object; an estimated value acquisition step of acquiring an estimated value of a deflection amount of the structure at the observation point due to a static response generated as the response based on the number, the entry time point, the exit time point, the environment information, and a deflection model of the structure; and a deflection derivation step of deriving a dynamic response at the designated position based on a deflection amount normalized by a vibration component of the dynamic response, which is derived based on the model and the vibration component of the dynamic response that is a difference between the time-series data and the estimated value, an amplitude ratio, which is a ratio of a first deflection amount that is the normalized deflection amount indicating a distribution of a vibration amplitude of the observation point to a second deflection amount that is the normalized deflection amount indicating a distribution of a vibration amplitude at a designated position that is a designated position of the structure, the vibration component of the designated position derived based on the vibration component and the amplitude ratio, and the static response of the designated position derived based on the time-series data and the estimated value.

DESCRIPTION OF EXEMPLARY EMBODIMENTS

Embodiments of the present disclosure will be described in the following order.

(1) Configuration of Derivation System
(1-1) Outline of Derivation System
(1-2) Deflection Model
(1-3) Verification Experiment
(1-4) Details of Elements
(2) Derivation Process
(3) Other Embodiments

(1) Configuration of Derivation System (1-1) Outline of Derivation System

Figure 1:
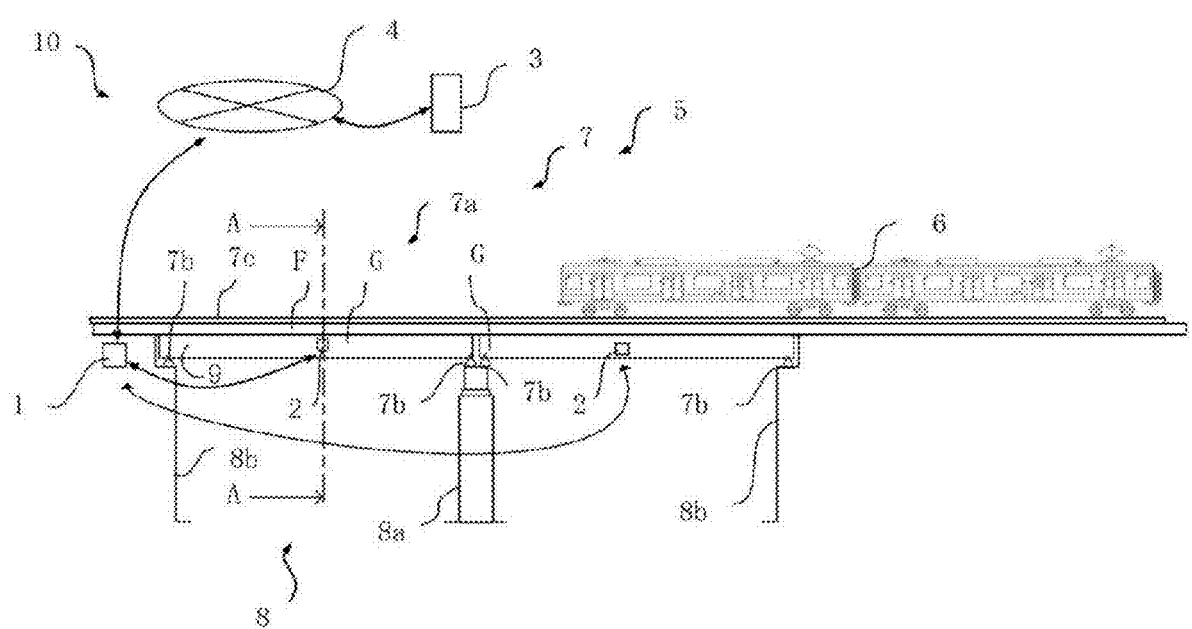
FIG. 1 is a block diagram showing a configuration of a derivation system.

FIG. 1 is a block diagram showing an example of a configuration of a derivation system 10 according to the present embodiment. The derivation system 10 is a system that derives a dynamic response generated at a designated position 9, which is a designated position different from an observation point on the bridge 5, of dynamic responses generated in the bridge 5 due to passage of the railway train 6, based on time-series data of a physical quantity at a predetermined observation point on the bridge 5 on which the railway train 6 formed with one or more railway vehicles moves. The railway train 6 is an example of a formation moving object. Each of the railway vehicles included in the railway train 6 is an example of a moving object. The bridge 5 is an example of a structure on which the moving object moves. Each railway vehicle of the railway train 6 moves on the bridge 5 via wheels provided on an axle. The wheel is an example of a contact portion between the railway vehicle and the bridge. In the present embodiment, each of the railway vehicles formed in the railway train 6 is a railway vehicle having the same structure. As shown in FIG. 1, the derivation system 10 includes a measurement device 1, at least one sensor device 2 provided in a superstructure 7 of the bridge 5, and a server device 3.

The measurement device 1 calculates deflection, that is, a displacement of the superstructure 7 caused by traveling of the railway train 6 based on acceleration data output from each sensor device 2. The measurement device 1 is installed on, for example, a bridge abutment 8b. The measurement device 1 and the server device 3 can communicate with each other via, for example, a wireless network of a mobile phone and a communication network 4 such as the Internet. The measurement device 1 transmits information on the displacement of the superstructure 7 caused by the traveling of the railway train 6 to the server device 3. The server device 3 derives the number of railway vehicles formed in the railway train 6 based on the transmitted displacement data.

In the present embodiment, the bridge 5 is a railroad bridge, and is, for example, a steel bridge, a girder bridge, or an RC bridge. The RC is an abbreviation for reinforced-concrete. In the present embodiment, the bridge 5 is a structure to which Bridge Weigh In Motion (BWIM) is applicable. The BWIM is a technology in which a bridge is regarded as a "scale", deformation of the bridge is measured, and thereby a weight and the number of axles of a moving object passing through the bridge is measured. The bridge, which enables analysis of the weight of the moving object traveling on the bridge, based on a response such as deformation or strain of the bridge, is considered to be a structure to which BWIM is applicable. Therefore, the BWIM system, which applies a physical process between an action on the bridge and the response, enables the measurement of the weight of the moving object that travels on the bridge. The weight of the moving object is measured by measuring a correlation coefficient between the displacement and a load in advance, and using the correlation coefficient to derive the load of the moving object passing through from the measurement result of the displacement of the bridge when the moving object passes through.

Figure 2:
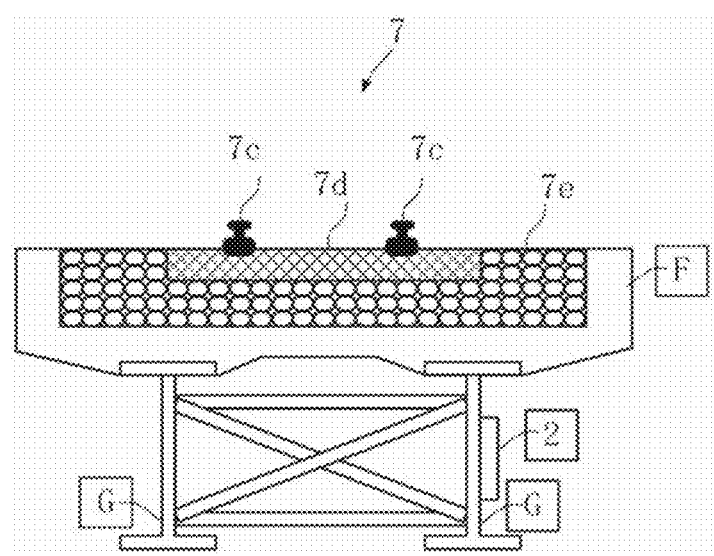
FIG. 2 is a diagram showing a cross section of a bridge.

The bridge 5 includes the superstructure 7 that is a portion where the moving object moves, and a substructure 8 that supports the superstructure 7. FIG. 2 is a cross-sectional view of the superstructure 7 taken along a line A-A of FIG. 1. As shown in FIGS. 1 and 2, the superstructure 7 includes a bridge floor 7a, a support 7b, rails 7c, ties 7d, and a ballast 7e, and the bridge floor 7a includes a floor plate F, a main girder G, a cross girder which is not shown. As shown in FIG. 1, the substructure 8 includes bridge piers 8a and the bridge abutments 8b. The superstructure 7 is a structure across the bridge abutment 8b and the bridge pier 8a adjacent to each other, two adjacent bridge abutments 8b, or two adjacent bridge piers 8a. Hereinafter, the bridge abutment 8b and the bridge pier 8a are collectively referred to as a support portion. In the present embodiment, a support that is a set of support portions and a portion of the bridge girder of the superstructure 7 across the set of support portions are collectively referred to as one bridge girder. That is, a simple beam-like structure in which both ends are supported by two support portions is defined as one bridge girder. Therefore, the bridge 5 shown in FIG. 1 includes two bridge girders. Hereinafter, each bridge girder included in the bridge 5 is referred to as a unit bridge girder.

The measurement device 1 and the sensor device 2 are coupled to each other, for example, in a wired or wireless manner, and communicate with one another via a communication network such as a controller area network (CAN).

The sensor device 2 is used to measure a predetermined physical quantity used to derive a displacement (deflection) at an observation point set on the superstructure 7. In the present embodiment, the predetermined physical quantity is an acceleration. In the present embodiment, the sensor device 2 is installed at the observation point. The sensor device 2 includes an acceleration sensor such as a quartz acceleration sensor or a micro-electro-mechanical systems (MEMS) acceleration sensor. The sensor device 2 outputs acceleration data for deriving the displacement of the superstructure 7 caused by a movement of the railway train 6 which is a moving object at the observation point.

In the present embodiment, the sensor device 2 is installed at a central portion of the superstructure 7 in a longitudinal direction, specifically, at a central portion of the main girder G in the longitudinal direction. The sensor device 2 is not limited to being installed at the central portion of the superstructure 7 as long as the sensor device 2 can detect an acceleration for calculating the displacement of the superstructure 7. When the sensor device 2 is provided on the floor plate F of the superstructure 7, the sensor device 2 may be damaged due to traveling of the railway train 6, and the measurement accuracy may be affected by local deformation of the bridge floor 7a, so that in the example of FIGS. 1 and 2, the sensor device 2 is provided at the main girder G of the superstructure 7.

The floor plate F, the main girders G, and the like of the superstructure 7 are deflected in a vertical direction due to a load of the railway train 6 traveling on the superstructure 7. Each sensor device 2 measures an acceleration of the deflection of the floor plate F or the main girder G caused by the load of the railway train 6 traveling on the superstructure 7.

The designated position 9 is a position designated on the bridge 5 as a derivation target of the dynamic response generated in the unit bridge girder of the bridge 5 due to the passage of the railway train 6.

(1-2) Deflection Model

Here, a model of deflection of a bridge when a railway train moves on a unit bridge girder will be described. Here, the model is information such as an equation indicating a correspondence relationship between predetermined information and a derivation result.

In the following, the number of railway vehicles (the number of railway vehicles) formed in the railway train moving on the bridge is defined as N. An entry time point, which is a time point at which the railway train enters the bridge, is defined as $t_i$. Here, the entry of the railway train into the bridge means that the wheels of a first axle of a railway vehicle $C_1$ (a first railway vehicle from the head of the railway train) have entered the unit bridge girder. In the following description, an exit time point, which is a time point at which the railway train exits from the unit bridge girder, is defined as $t_o$. Here, the exit of the railway train from the unit bridge girder means that the wheels of a rearmost axle of a railway vehicle $C_N$ (the rearmost railway vehicle of the railway train) have exited from the unit bridge girder. In addition, in the following, a period during which the railway train passes through the unit bridge girder (a period from the entry time point $t_i$ to the exit time point $t_o$) is defined as $t_s$. Hereinafter, N, $t_i$, $t_o$, and $t_s$ are collectively referred to as observation information.

Figure 3:
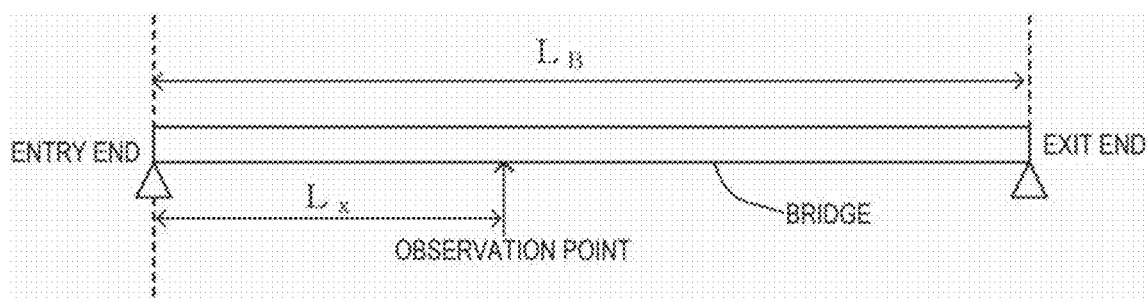
FIG. 3 is a diagram showing dimensions of a unit bridge girder.

In the following description, a bridge length, which is a length of the unit bridge girder, is defined as $L_B$. The bridge length is an example of a structure length. A distance from an end in a direction in which the railway train enters among ends of the unit bridge girder in the longitudinal direction to the observation point is defined as $L_x$. FIG. 3 shows the lengths $L_B$ and $L_x$. In the following description, the end in a direction in which the railway train enters among the ends of the unit bridge girder in the longitudinal direction is referred to as an entry end. In addition, in the following, an end in a direction in which the railway train exits among the ends of the unit bridge girder in the longitudinal direction is referred to as an exit end. The vehicle length of the mth railway vehicle from the head of the railway train is defined as $L_c(m)$. The vehicle length is an example of a moving object length. In the following, the lengths $L_c(1)$ to $L_c(N)$ are collectively referred to as a length $L_c$. The mth railway vehicle from the head of the railway train is defined as $C_m$. The number of axles in the railway vehicle $C_m$ is defined as $a_r(m)$. In the following, $a_r(1)$ to $a_r(N)$ are collectively referred to as $a_r$, and the $a_r(m)$ axles in the railway vehicle $C_m$ are defined as a first axle, a second axle, a third axle, . . . , an $a_r(m)$th axle in order from the head of the railway vehicle $C_m$. A distance from a front end of the railway vehicle $C_m$ in a traveling direction to the first axle is defined as $L_a(a_w(m, 1))$. Here, $a_w(\alpha, \beta)$ indicates a βth axle of the αth railway vehicle in the railway train. A distance from a (n−1)th axle to a nth axle in the railway vehicle $C_m$ is defined as $L_a(a_w(m, n))$, n being an integer of 2 or more. That is, $L_a(a_w(\alpha, \beta))$ indicates a distance between the βth axle and the (β−1)th axle in the railway train $C_\alpha$ or a distance between the βth axle in the railway train $C_\alpha$ and the front end of the railway train $C_\alpha$ in the traveling direction. Hereinafter, $L_a(a_w(1, 1))$ to $L_a(a_w(N, a_r(N)))$ are collectively referred to as $L_a$. Each $L_a$ indicates a position of the corresponding axle in the corresponding railway vehicle. For example, $L_a(a_w(m, 1))$ indicates that the first axle is present behind the front end of the railway vehicle $C_m$ by a distance of $L_a(a_w(m, 1))$. $L_a(a_w(m, 2))$ indicates that the second axle is present behind the first axle of the railway vehicle $C_m$ by a distance of $L_a(a_w(m, 2))$.

Figure 4:
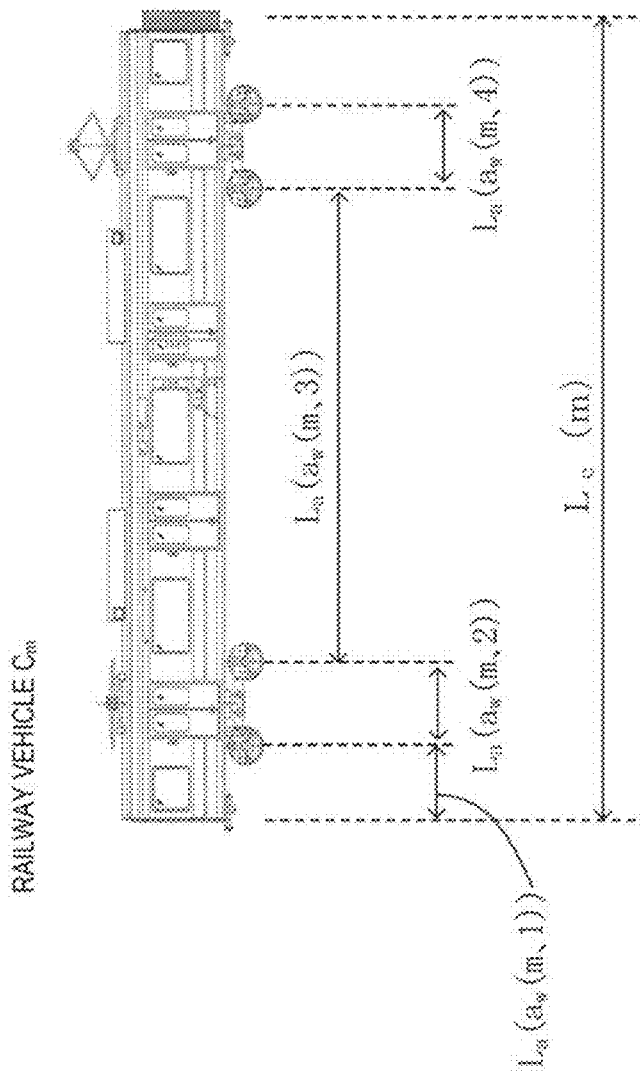
FIG. 4 is a diagram showing dimensions of a railway vehicle.

Here, a railway vehicle having a similar four-axle configuration is formed in the railway train. That is, $a_r(m)$ is 4, m being 1, 2, . . . , N. FIG. 4 shows the lengths $L_c(m)$, $L_a(a_w(m, 1))$, $L_a(a_w(m, 2))$ $L_a(a_w(m, 3))$, and $L_a(a_w(m, 4))$ in the railway vehicle $C_m$.

Hereinafter, $L_B$, $L_x$, $L_c$, $a_r$, and $L_a$ are collectively referred to as environment information.

As shown in the following Equation (1), $t_s$ is obtained as a difference between $t_o$ and $t_i$.

$$t_s = t_o - t_i \tag{1}$$

The total number $T_{a_r}$ of wheels of the railway train is obtained by the following Equation (2).

$$T_{a_r} = \sum_{m=1}^{N} a_r(m) \tag{2}$$

A distance from the first axle of the railway vehicle $C_1$ at the head of the railway vehicle to the nth axle of the mth railway vehicle $C_m$ of the railway vehicle is represented as $D_{wa}(a_w(m, n))$. $D_{wa}(a_w(m, n))$ is obtained from the following Equation (3).

$$D_{wa}(a_w(m, n)) = \sum_{y=1}^{m} L_c(y) + \sum_{x=1}^{n} L_a(a_w(m, x)) - L_c(m) - L_a(a_w(1, 1)) \tag{3}$$

The distance from the first axle of the railway vehicle $C_1$ at the head of the railway vehicle to the last axle $a_r(N)$ of the rearmost railway vehicle $C_N$ is $D_{wa}(a_w(N, a_r(N)))$. By using $D_{wa}(a_w(N, a_r(N)))$, an average velocity $v_a$ of the railway train passing through the unit bridge girder is represented by the following Equation (4).

$$v_a = \frac{L_B}{t_s} + \frac{D_{wa}(a_w(N, a_r(N)))}{t_s} \tag{4}$$

From Equation (3) and Equation (4), the following Equation (5) is established.

$$v_a = \frac{L_B}{t_s} + \frac{1}{t_s}[\sum_{y=1}^{N} L_c(y) + \sum_{x=1}^{a_r(N)} L_a(a_w(N, x)) - L_c(N) - L_a(a_w(1, 1))] \tag{5}$$

Figure 5:
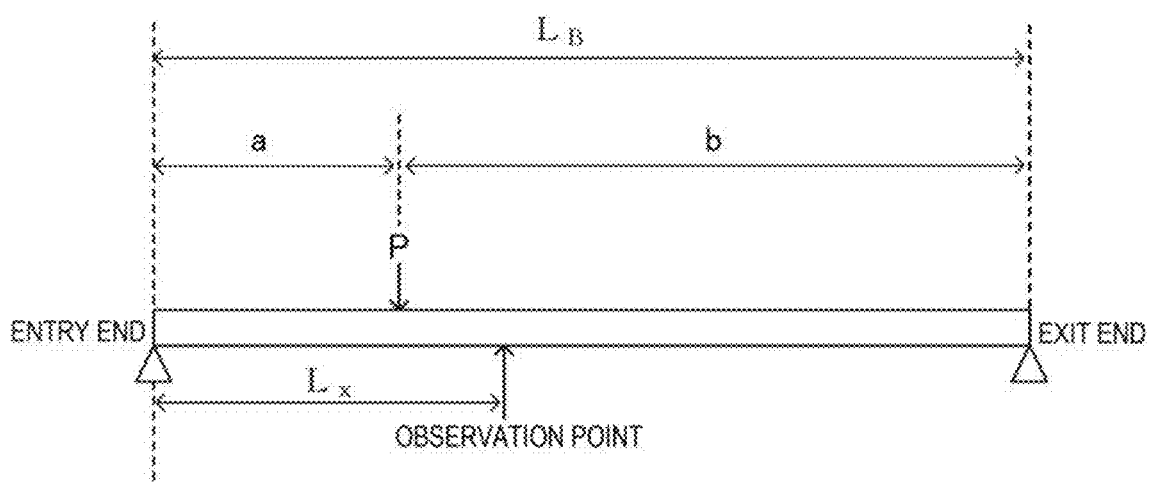
FIG. 5 is a diagram showing an outline of the unit bridge girder.

Next, deflection generated in the unit bridge girder when a load is applied to the bridge will be described. FIG. 5 is a schematic view of the unit bridge girder. FIG. 5 shows a situation in which a load P is applied to the bridge. Here, the unit bridge girder is a model of a simple beam supported at both ends. The distance between a position of the unit bridge girder to which the load P is applied and the entry end is represented by a. A distance between the position of the unit bridge girder to which the load P is applied and the exit end is represented by b. In this case, the bending moment at the position of the unit bridge girder to which the load P is applied is represented by the following Equation (6).

$$M = \frac{abP}{L_B} \quad (6)$$

Figure 6:
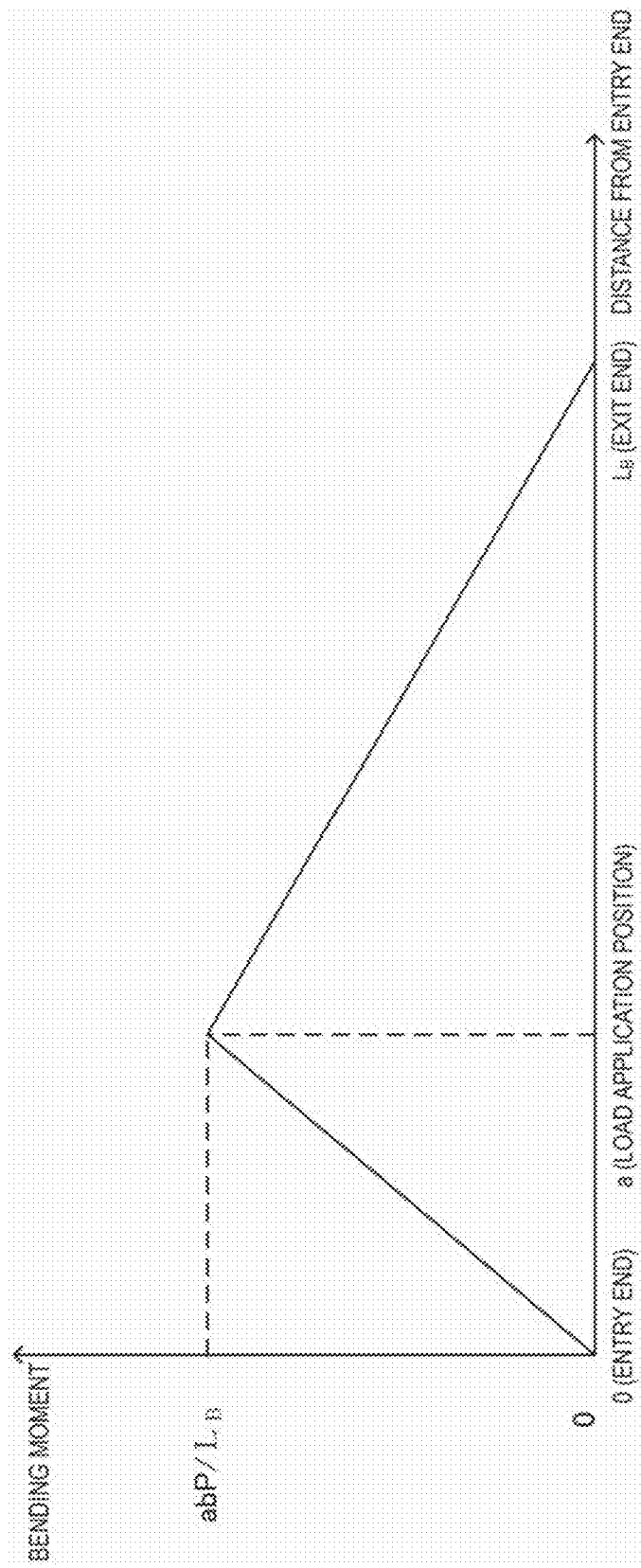
FIG. 6 is a diagram showing a bending moment at the unit bridge girder.

FIG. 6 shows the bending moment at each position of the unit bridge girder due to the load P. As shown in FIG. 6, the bending moment generated in the unit bridge girder due to the load P is 0 at the entry end, increases proportionally as the position approaches the position to which the load P is applied from the entry end, and becomes a value represented by Equation (6) at the position to which the load P is applied. The bending moment generated in the unit bridge girder due to the load P decreases proportionally as the position approaches the exit end from the position to which the load P is applied, and becomes 0 at the exit end. Therefore, the bending moment at an optional position X in the unit bridge girder is represented by the following Equation (7).

$$M = \frac{bP}{L_B}x - H_a P(x-a) \quad (7)$$

In Equation (7), x represents the distance from the entry end to the position X in the traveling direction of the railway train. Ha in Equation (7) is a value represented by the following Equation (8).

$$H_a = \begin{cases} x \leq a: & 0 \\ x > a: & 1 \end{cases} \quad (8)$$

Between the bending moment and a deflection w of the unit bridge girder at the optional position X, a relationship represented by the following Equation (9) is established.

$$-M = EI\frac{d\theta}{dx} = EI\frac{d^2w}{dx^2} \quad (9)$$

θ in Equation (9) is an angle formed by a horizontal line and the deflected unit bridge girder at the position X. From Equation (7) and Equation (9), the following Equation (10) is established.

$$\frac{d^2w}{dx^2} = -\frac{1}{EI}(\frac{bP}{L_B}x - H_a P(x-a)) \quad (10)$$

By integrating both sides of Equation (10) twice with x, the following Equation (11) representing the deflection w at the position X is obtained.

$$w = \frac{P}{6EIL_B}\{-bx^3 + H_a L_B(x-a)^3 + g1x + g2\} \quad (11)$$

In Equation (11), g1 and g2 are constant terms. Here, since the unit bridge girder is supported at the entry end and the exit end, no deflection is generated at the positions of the entry end and the exit end. That is, in Equation (11), when x=0 and x=$L_B$, both sides are 0. Therefore, g1 and g2 are represented by the following Equation (12) and Equation (13).

$$g1 = ab(a+2b) \quad (12)$$

$$g2 = 0 \quad (13)$$

From Equation (11), Equation (12), and Equation (13), the following Equation (14) representing the deflection w at the position X is obtained.

$$w = \frac{P}{6EIL_B}\{-bx^3 + H_a L_B(x-a)^3 + ab(a+2b)x\} \quad (14)$$

When the load P is applied to a center of the unit bridge girder in the longitudinal direction, the maximum deflection among the deflection generated in the unit bridge girder due to the application of the load P is generated at the center of the bridge in the longitudinal direction. When this maximum deflection is $w_{0.5l}$, an equation representing $w_{0.5l}$ is obtained. When the load P is applied to the center of the unit bridge girder in the longitudinal direction, a=b=$0.5L_B$. Since the position X of a target for which the deflection is to be obtained is the center of the unit bridge girder in the longitudinal direction, x=$0.5L_B$. In this case, since x≤a, $H_a$=0 is obtained from Equation (8). By substituting x=$0.5L_B$, a=b=$0.5L_B$, and $H_a$=0 into Equation (14), the following Equation (15) representing deflection $w_{0.5l}$ is obtained.

$$w_{0.5l} = \frac{P}{48EI}L_B^3 \quad (15)$$

The deflection at an optional position in the unit bridge girder represented by Equation (14) is normalized using $w_{0.5l}$.

When the position of the load P exists on the entry end side with respect to the position X, that is, when x>a, $H_a$=1 is obtained from Equation (8), and Equation (14) is represented as Equation (16) below.

$$w = \frac{P}{6EIL_B}\{-bx^3 + L_B(x-a)^3 + ab(a+2b)x\} \quad (16)$$

a=$L_B$r. Here, r is a real number from 0 to 1. Since b=$L_B$-a, b is represented as b=$L_B$(1-r). When a=$L_B$r and b=$L_B$(1-r) are substituted into Equation (16) and the deflection is normalized by dividing by $w_{0.5l}$, the following Equation (17) representing a normalized deflection amount $w_{std}$ at the position X when x>a is obtained.

$$w_{std} = \frac{8}{L_B}\left\{xr^3 + \left(\frac{x^3}{L_B^2} + 2x\right)r\right\} - \frac{8}{L_B}\{L_B r^3 + \frac{3x^2}{L_B}r\} \quad (17)$$

Similarly, when the position of the load P exists on the exit end side with respect to the position X, that is, when x≤a, $H_a=0$ is obtained from Equation (8), and Equation (14) is represented as the following Equation (18).

$$w = \frac{P}{6EIL_B}\{-bx^3 + ab(a+2b)x\} \tag{18}$$

$a=L_B r$. Here, r is a real number from 0 to 1. Since $b=L_B-a$, b is represented as $b=L_B(1-r)$. When $a=L_B r$ and $b=L_B(1-r)$ are substituted into Equation (18) and the deflection is normalized by dividing by $w_{0.5 1}$, the following Equation (19) representing the normalized deflection amount $w_{std}$ at the position X when x≤a is obtained.

$$w_{std} = \frac{8}{L_B}\left\{xr^3 + \left(\frac{x^3}{L_B^2} + 2x\right)r\right\} - \frac{8}{L_B}\{3xr^2 + \frac{x^3}{L_B^2}\} \tag{19}$$

By substituting $L_x$ for x in Equation (17) and Equation (19), the normalized deflection amount $w_{std}$ at the deflection observation point is represented as the following Equation (20) as a function of r.

$$w_{std}(r) = \frac{8}{L_B}\left\{L_x r^3 + \left(\frac{L_x^3}{L_B^2} + 2L_x\right)r - R(r)\right\} \tag{20}$$

The function R(r) in Equation (20) is a function represented by the following Equation (21).

$$R(r) = \begin{cases} L_x > L_B r: & L_B r^3 + \frac{3L_x^2}{L_B}r \\ L_x \le L_B r: & 3L_x r^2 + \frac{L_x^3}{L_B^2} \end{cases} \tag{21}$$

Here, using Equation (20) and Equation (21), a function indicating a temporal change in deflection generated at an observation point due to a load applied to the bridge via a wheel of any one axle $a_w(m, n)$ is obtained. First, a period required for the wheel of one axle of the railway train to reach the observation point from the entry end is defined as $t_{xn}$. $t_{xn}$ is obtained from $L_x$ and $v_a$ by the following Equation (22).

$$t_{xn} = \frac{L_x}{v_a} \tag{22}$$

A period during which one wheel of the railway train crosses the unit bridge girder, that is, a period from the entry end to the exit end is defined by $t_{ln}$. $t_{ln}$ is obtained from $L_B$ and $v_a$ by the following Equation (23).

$$t_{ln} = \frac{L_B}{v_a} \tag{23}$$

A time point at which the wheel of the nth axle $a_w(m, n)$ of the mth railway vehicle of the railway train reaches the entry end is defined as $t_o(m, n)$. $t_o(m, n)$ is obtained from $t_i$, $v_a$, and $D_{wa}(a_w(m, n))$ by the following Equation (24).

$$t_0(m, n) = t_i + \frac{D_{wa}(a_w(m, n))}{v_a} \tag{24}$$

From Equation (22), $L_x$ is represented as the following Equation (25).

$$L_x = v_a t_{xn} \tag{25}$$

From Equation (23), $L_B$ is represented as the following Equation (26).

$$L_B = v_a t_{ln} \tag{26}$$

The position of the axle $a_w(m, n)$ is a load position. Therefore, the position of the axle $a_w(m, n)$ is a position at a distance of $a=L_B r$ in the direction from the entry end to the exit end. When a variable indicating the time point is t, a distance from the entry end of $a_w(m, n)$ at the time point t is equal to a distance traveled by the railway vehicle from the time point $t_o(m, n)$ to the time point t. Therefore, the following Equation (27) is established.

$$L_B r = v_a(t - t_0(m, n)) \tag{27}$$

From Equation (27), r is represented as in the following Equation (28).

$$r = \frac{v_a(t - t_0(m, n))}{L_B} = \frac{v_a(t - t_0(m, n))}{v_a t_{ln}} = \frac{(t - t_0(m, n))}{t_{ln}} \tag{28}$$

By replacing $L_x$, $L_B$, and r in Equation (20) and Equation (21) using Equation (25), Equation (26), and Equation (28), a function $w_{std}(a_w(m, n), t)$ in the following Equation (29) is obtained as a model indicating a temporal change in deflection generated at the observation point due to the load applied to the unit bridge girder via the wheel of the axle $a_w(m, n)$. A function R(t) in Equation (29) is a function represented by the following Equation (30).

$$w_{std}(a_w(m, n), t) = \begin{cases} t < t_0(m, n): 0 \\ t_0(m, n) \le t \le t_0(m, n) + t_{ln}: \\ \frac{8}{t_{ln}}\left\{t_{xn}\left(\frac{t - t_0(m, n)}{t_{ln}}\right)^3 + \left(\frac{t_{xn}^3}{t_{ln}^2} + 2t_{xn}\right)\left(\frac{t - t_0(m, n)}{t_{ln}}\right) - R(t)\right\} \\ t_0(m, n) + t_{ln} < t: 0 \end{cases} \tag{29}$$

$$R(t) = \begin{cases} t < t_0(m, n): 0 \\ t_0(m, n) \le t \le t_0(m, n) + t_{ln} \cap t_{xn} > t - t_0(m, n): \\ t_{ln}\left(\frac{t - t_0(m, n)}{t_{ln}}\right)^3 + \frac{3t_{xn}^2}{t_{ln}}\left(\frac{t - t_0(m, n)}{t_{ln}}\right) \\ t_0(m, n) \le t \le t_0(m, n) + t_{ln} \cap t_{xn} \le t - t_0(m, n): \\ 3t_{xn}\left(\frac{t - t_0(m, n)}{t_{ln}}\right)^2 + \frac{t_{xn}^3}{t_{ln}^2} \\ t_0(m, n) + t_{ln} < t: 0 \end{cases} \tag{30}$$

When the observation information and the environment information ($t_i$, $t_o$, N, $L_B$, $L_x$, $L_c(1)$ to $L_c(N)$, $a_r(1)$ to $a_r(N)$, and $L_a(a_w(1, 1))$ to $L_a(a_w(N, a_r(N)))$) are known, $w_{std}(a_w(m, n), t)$ is obtained using the information. For example, $t_s$ is obtained from $t_i$ and $t_o$ using Equation (1). From $t_s$, N, $a_r$, $L_a$, and $L_c$, $v_a$ is obtained using Equation (5). From $v_a$, $L_B$, and $L_x$, $t_{xn}$ and $t_{ln}$ are obtained using Equation (22) and Equation (23). From $L_a$, $L_c$, and $t_i$, $t_o(m, n)$ is obtained using Equation (3) and Equation (24). Then, by substituting the obtained $t_{xn}$, $t_{ln}$, and $t_o(m, n)$ into the Equation (29) and Equation (30), the function $w_{std}(a_w(m, n), t)$ of t is obtained.

Figure 7:
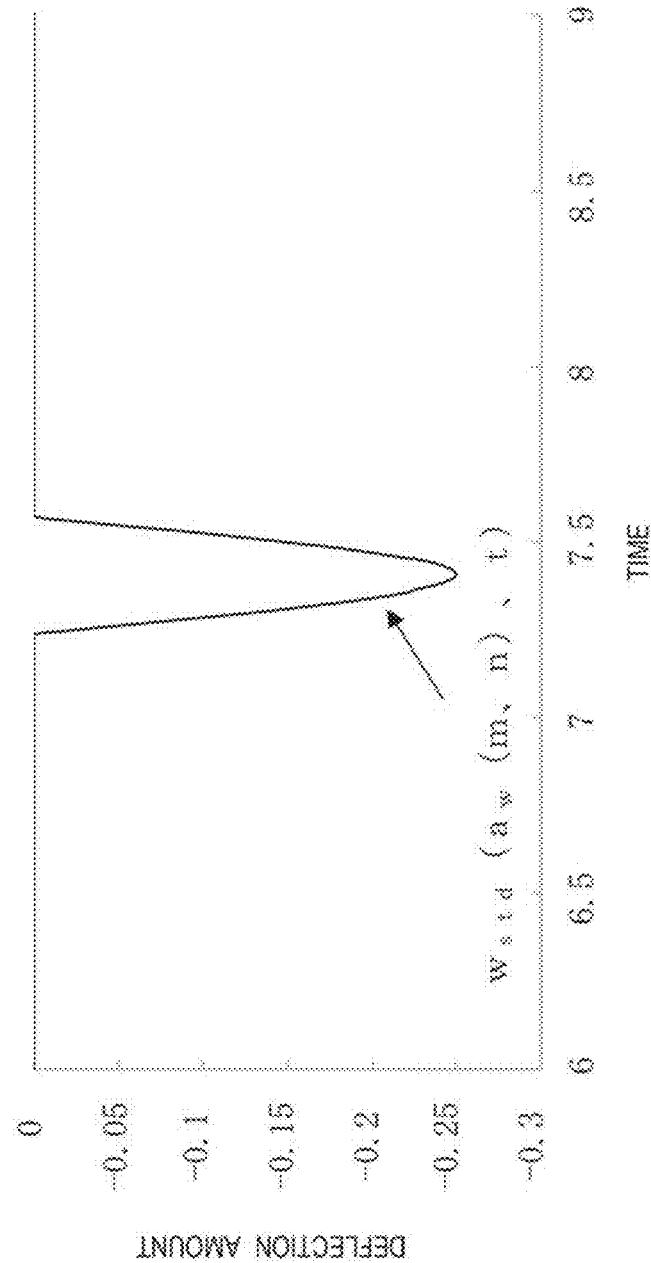
FIG. 7 is a diagram showing an outline of deflection of the unit bridge girder caused by a wheel.

An example of a change in the deflection amount at the observation point indicated by $w_{std}(a_w(m, n), t)$ is shown in FIG. 7. In a graph of FIG. 7, a horizontal axis represents time, and a vertical axis represents the deflection amount. In accordance with the movement of one railway vehicle $C_m$, a set of wheels for each of the $a_r(m)$ axles moves on the unit bridge girder. Therefore, a function $C_{std}(m, t)$ serving as a model indicating a temporal change in the deflection amount generated at the observation point due to the movement of one railway vehicle $C_m$ is obtained as the sum of $w_{std}(a_w(m, n), t)$ for the respective axles as in the following Equation (31).

$$C_{std}(m, t) = \sum_{n=1}^{a_r(m)} w_{std}(a_w(m, n), t) \quad (31)$$

Figure 8:
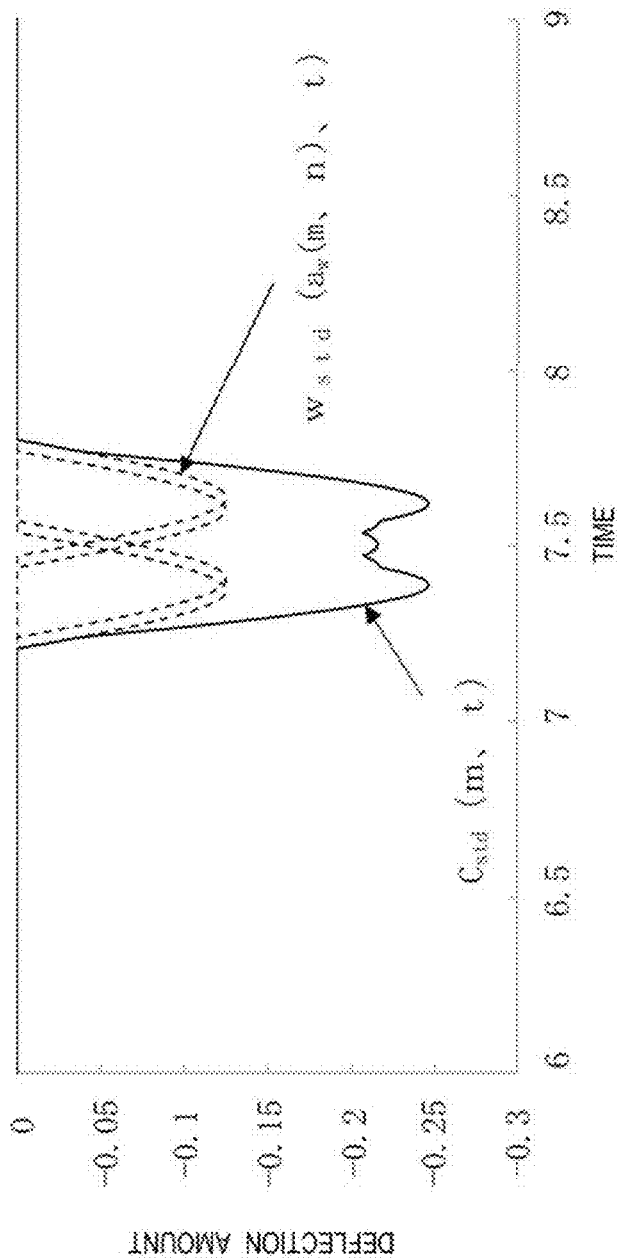
FIG. 8 is a diagram showing an outline of deflection of the unit bridge girder caused by a railway vehicle.

FIG. 8 shows how the deflection amount changes at the observation point indicated by the function $C_{std}(m, t)$ when $a_r(m)$ is 4, that is, when the railway vehicle $C_m$ has a four-axle configuration. In a graph of FIG. 8, a horizontal axis represents time, and a vertical axis represents the deflection amount. A solid line in the graph of FIG. 8 indicates $C_{std}(m, t)$, and each dotted line in the graph indicates $w_{std}(a_w(m, n), t)$ for each axle.

In accordance with the movement of the railway train, the N railway vehicles move on the unit bridge girder. Therefore, a function $T_{std}(t)$ serving as a model indicating a temporal change in the deflection amount generated at the observation point due to movement of one railway train is obtained as the sum of $C_{std}(m, t)$ for the respective railway vehicles as in the following Equation (32).

$$T_{std}(t) = \sum_{m=1}^{N} C_{std}(m, t) \quad (32)$$

Figure 9:
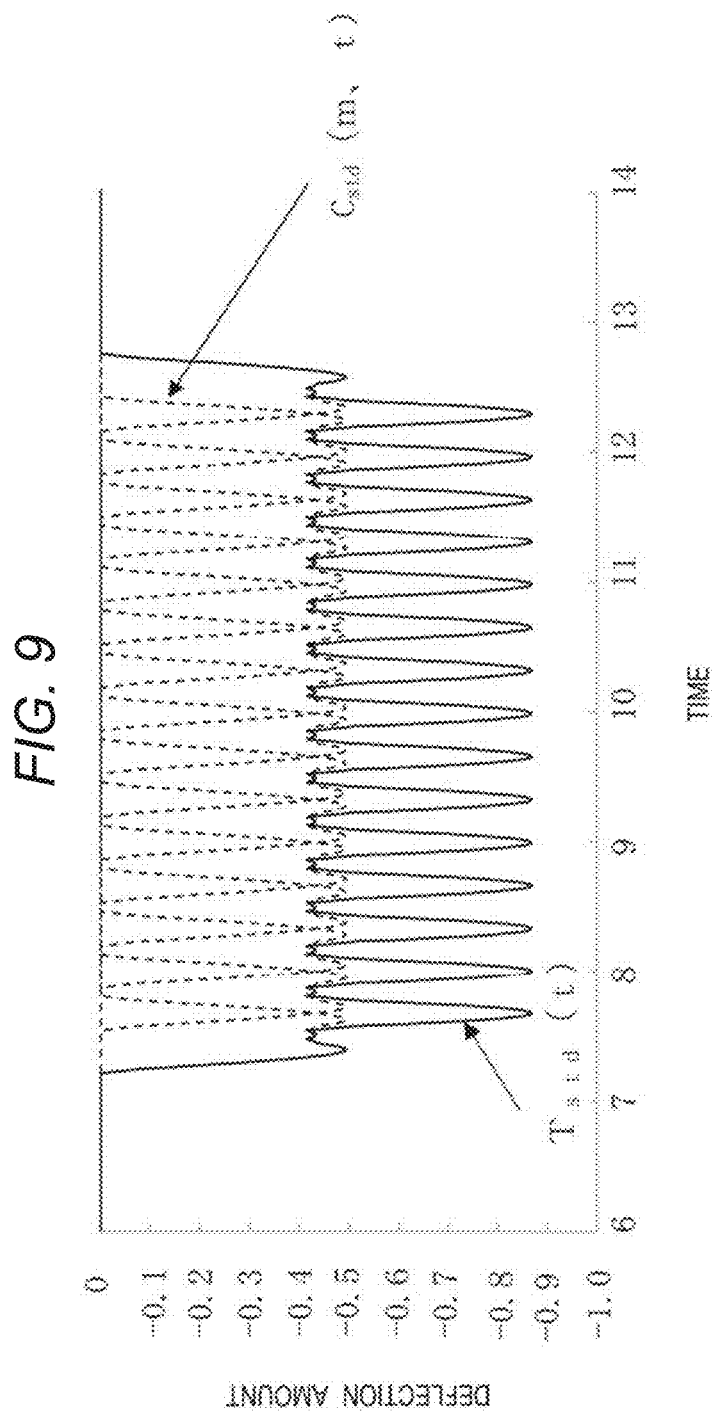
FIG. 9 is a diagram showing an outline of deflection of the unit bridge girder caused by a railway train.

FIG. 9 shows how the deflection amount changes at the observation point indicated by the function $T_{std}(t)$ when N is 16, that is, when 16 railway vehicles are formed in the railway train. In a graph of FIG. 9, a horizontal axis represents time, and a vertical axis represents the deflection amount. A solid line in the graph of FIG. 9 indicates $T_{std}(t)$, and each dotted line in the graph indicates $C_{std}(m, t)$ for each railway vehicle. As shown in the graph of FIG. 9, the waveform is obtained by adding together the deflection of each passing railway vehicle, and it can be seen that vibration occurs in a cycle in which continuous railway vehicles pass through the unit bridge girder.

The deflection model of the unit bridge girder is described as above. As described above, the model of the deflection in the present embodiment is an equation based on the structure of the bridge indicated by the simple beam supporting both ends.

(1-3) Verification Experiment

The inventors obtained the deflection amount $T_{std}(t)$ under conditions that the observation information and the environment information have the following values. That is, N=4, $t_i$=7.21 [sec], $t_o$=8.777 [sec], $t_s$=1.567 [sec], $L_B$=25 [m] $L_x$=12.5 [m] $L_c$=25 [m], $a_r$=4, $L_a$ ($a_w$ (In, 1))=2.5 [m] for each of m=1 to N, $L_a(a_w(m, 2))$=2.5 [m] for each of m=1 to N, $L_a(a_w(m, 3))$=15 [m] for each of m=1 to N, and $L_a(a_w(m, 4))$=2.5 [m] for each of m=1 to N.

Figure 10:
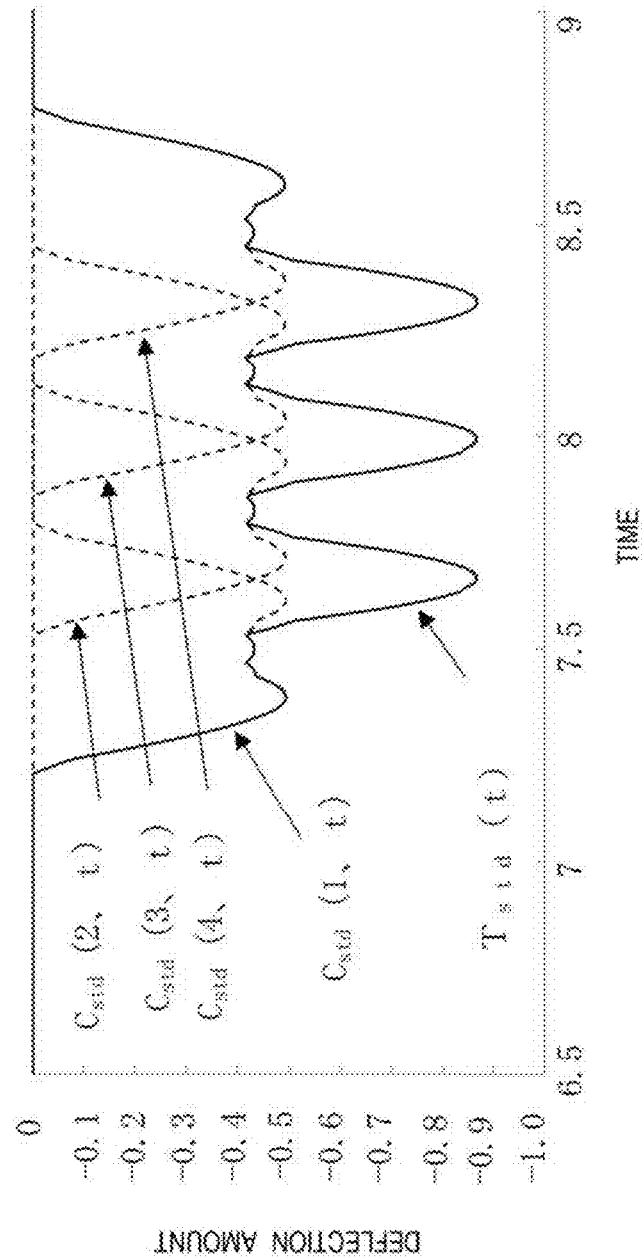
FIG. 10 is a diagram showing the deflection of the unit bridge girder caused by the railway vehicle.
Figure 11:
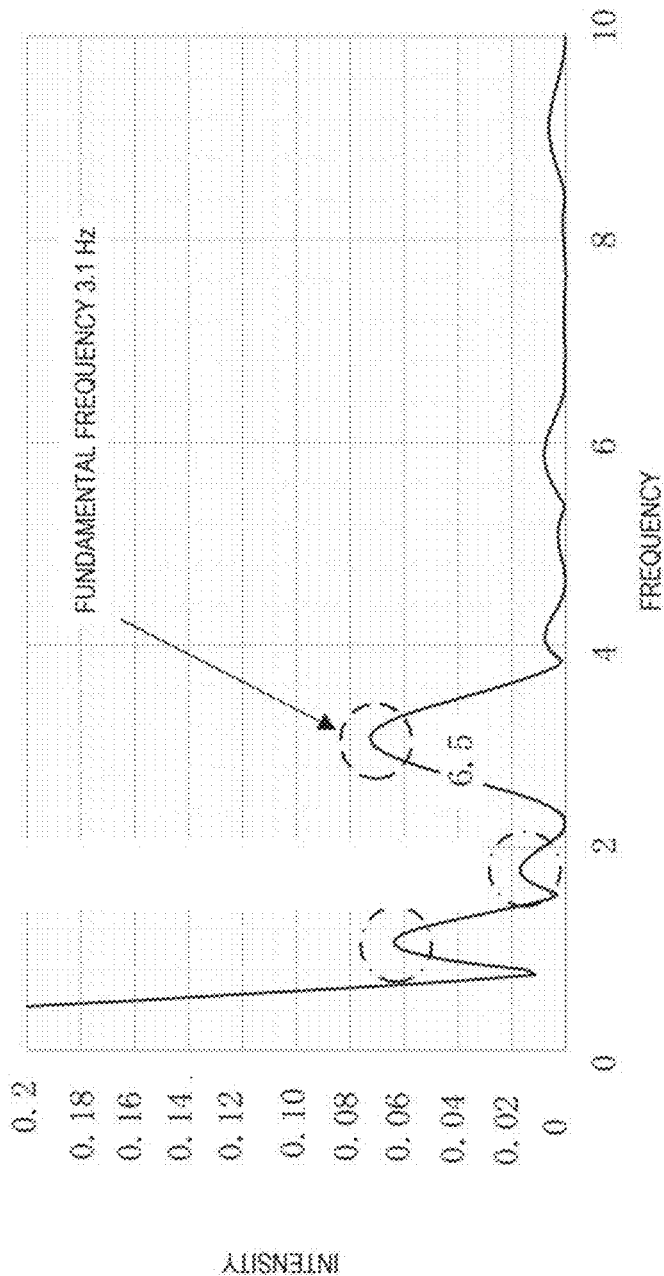
FIG. 11 is a diagram showing an FFT result of the deflection of the unit bridge girder.

The deflection amount $T_{std}(t)$ at this time is shown in FIG. 10. In a graph of FIG. 10, a horizontal axis represents time, and a vertical axis represents the deflection amount. The inventors also obtained an intensity of each frequency component included in $T_{std}(t)$ by performing fast Fourier transform (FFT) on the obtained $T_{std}(t)$. A result of the FFT for $T_{std}(t)$ is shown in FIG. 11. In a graph of FIG. 11, a horizontal axis represents the frequency, and a vertical axis represents the intensity of the corresponding frequency component. Then, the inventors obtained a fundamental frequency $F_f$ of $T_{std}(t)$ from the result of the FFT of $T_{std}(t)$ as the frequency of the vibration occurring in the bridge in accordance with the movement of the continuous railway vehicles. Here, the fundamental frequency is a frequency of a component having the lowest frequency included in the signal. Specifically, the inventors specified a peak corresponding to the lowest frequency from the result of the FFT of $T_{std}(t)$ except for a side lobe generated due to an influence of a window function used in the FFT, and obtained the specified peak as the fundamental frequency. In the example of FIG. 11, as indicated by portions surrounded by one-dot chain lines, two peaks of the side lobes generated due to the influence of the window function used in the FFT are observed in a range of less than 2 Hz. The inventors specified a peak in a portion surrounded by a dotted line as a peak having the lowest frequency among the peaks excluding these peaks, and obtained a frequency corresponding to the specified peak as the fundamental frequency $F_f$. The inventors obtained a fundamental frequency of 3.1 Hz from the graph of FIG. 11.

The inventors obtained a wave number ν of the fundamental frequency $F_f$ included in a passing period $t_s$ by using the following Equation (33).

$$\nu = t_s F_f \quad (33)$$

In this case, ν=1.567×3.1=4.8577. Here, the number N of railway vehicles of the moving railway train is 4. The inventors found a feature that the wave number ν of the fundamental frequency $F_f$ included in the passing period $t_s$ is a value higher than N by about one. Hereinafter, this feature is referred to as a first feature. Therefore, the inventors found that the number N of railway vehicles included in a railway train can be obtained by using the following Equation (34), assuming that the number N of railway vehicles included in the railway train can be obtained as a value obtained by rounding, to an integer, a value obtained by subtracting one from the wave number ν of the fundamental frequency $F_f$ included in the passing period $t_s$. A round function is a function that returns a value obtained by rounding off an argument.

$$N = \text{round}(\nu - 1) \quad (34)$$

The inventors obtained a fundamental cycle $T_f$ from the fundamental frequency $F_f$ by using the following Equation (35).

$$T_f = \frac{1}{F_f} \quad (35)$$

Then, the inventors performed low-pass filter processing for attenuating a component of a frequency equal to or higher than the fundamental frequency on $T_{std}(t)$ by performing a moving average on the deflection amount $T_{std}(t)$ in the fundamental cycle $T_f$. The low-pass filter processing may be processing of applying another FIR filter that attenuates the component of the frequency equal to or higher than the fundamental frequency. $T_{std}(t)$ subjected to the low-pass filter processing is defined as $T_{std\_lp}(t)=T_{std\_lp}(k\Delta T)$. Here, k is a variable indicating what number of observations when the deflection amount is observed in a cycle at the observation point. That is, when a data cycle (time resolution) of the observation of the deflection amount is $\Delta T$, $t=k\Delta T$.

As shown in the following Equation (36), a moving average interval $k_{mf}$ adjusted to the time resolution of the data is obtained from the fundamental cycle $T_f$ and $\Delta T$.

$$k_{mf} = 2\left\lfloor \frac{T_f}{2\Delta T} \right\rfloor + 1 \quad (36)$$

By using $k_{mf}$, $T_{std\_lp}(t)$ is obtained by the following Equation (37).

$$T_{std\_lp}(t) = T_{std\_lp}(k\Delta T) = \frac{1}{k_{mf}} \sum_{n=k-\frac{k_{mf}-1}{2}}^{k+\frac{k_{mf}-1}{2}} T_{std}(n\Delta T) \quad (37)$$

The inventors performed high-pass filter processing for attenuating a component of a frequency lower than the fundamental frequency on $T_{std}(t)$ by subtracting $T_{std\_lp}(t)$ from the deflection amount $T_{std}(t)$. The high-pass filter processing may be processing of applying another FIR filter that attenuates the component of the frequency lower than the fundamental frequency. $T_{std}(t)$ subjected to the high-pass filter processing is defined as $T_{std\_hp}(t)$. Specifically, the inventors obtained $T_{std\_hp}(t)$ by subtracting $T_{std\_lp}(t)$ from $T_{std}(t)$ as shown in the following Equation (38).

$$T_{std\_hp}(t) = T_{std}(k\Delta T) - T_{std\_lp}(t) \quad (38)$$

Figure 12:
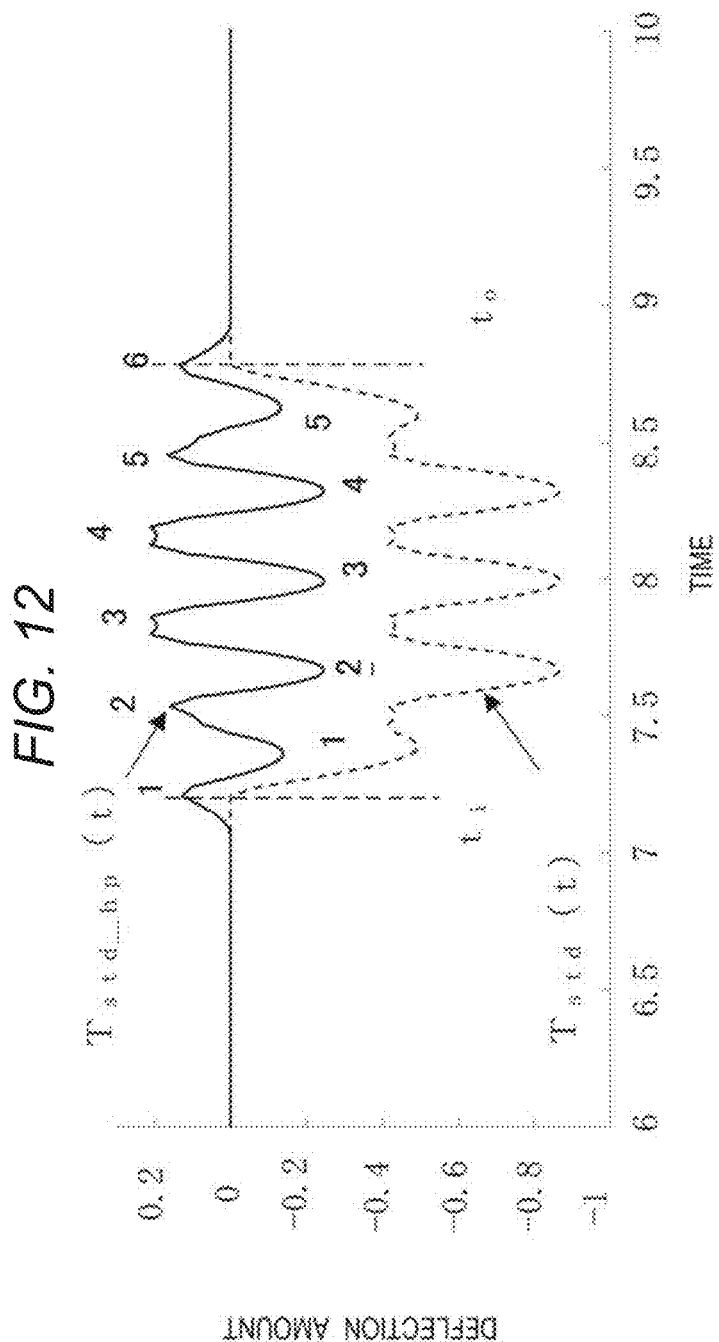
FIG. 12 is a diagram showing the deflection of the unit bridge girder caused by the railway train after high-pass filter processing.

The obtained $T_{std\_hp}(t)$ is superimposed on $T_{std}(t)$ and shown in FIG. 12. In a graph of FIG. 12, a horizontal axis represents time ($t=k\Delta T$), and a vertical axis represents the deflection amount. A solid line in the graph of FIG. 12 indicates $T_{std\_hp}(k)$, and a dotted line in the graph indicates $T_{std}(t)$.

From the graph of FIG. 12, the number of positive peaks of $T_{std\_hp}(t)$ in the passing period $t_s$ (period from the entry time point $t_i$ to the exit time point $t_o$) is 6. Here, the positive peak is a peak that is convex in an upward direction of the bridge among the peaks of $T_{std\_hp}(t)$. The number of negative peaks of $T_{std\_hp}(t)$ in the passing period is is 5. Here, the negative peak is a peak that is convex in a downward direction of the bridge among the peaks of $T_{std\_hp}(t)$. Accordingly, the inventors found a feature that the number (6) of positive peaks of $T_{std\_hp}(t)$ in the passing period $t_s$ is larger by two than the number N (4) of the railway vehicles included in the railway train, and the number (5) of the negative peaks is larger by one than N(4). Hereinafter, this feature is referred to as a second feature.

The inventors verified whether the first feature and the second feature are satisfied while changing the observation information and the environment information to various values. As a result, the inventors found that the first feature and the second feature are satisfied when $L_c/2<L_B<3L_c/2$ is satisfied. The inventors found that, based on the first feature and the second feature, it is possible to derive the number of railway vehicles formed in the railway train 6 from time-series data of the displacement (deflection) of the bridge at the observation point of the bridge. Hereinafter, the time-series data of the displacement at the observation point of the bridge is defined as u(t). u(t) is data of discrete values of displacement measured in a predetermined cycle, and is data in which each discrete value is associated with a measurement time point.

The inventors considered deflection amounts $C_{std}(1, t)$ to $C_{std}(N, t)$ and $T_{std}(t)$ generated when a railway train formed with the same railway vehicles passes through the bridge under conditions in which the observation information and the environment information have the following values. That is, N=4, $t_i$=7.21 [sec], $t_o$=8.777 [sec], $t_s$=1.567 [sec], $L_B$=25 [m], $L_x$=12.5 [m], $L_c$=25 [m], $a_r$=4, $L_a(a_w(m, 1))$=2.5 [m] for each of m=1 to N, $L_a(a_w(m, 2))$=2.5 [m] for each of m=1 to N, $L_a(a_w(m, 3))$=15 [m] for each of m=1 to N, and $L_a(a_w(m, 4))$=2.5 [m] for each of m=1 to N.

Figure 13:
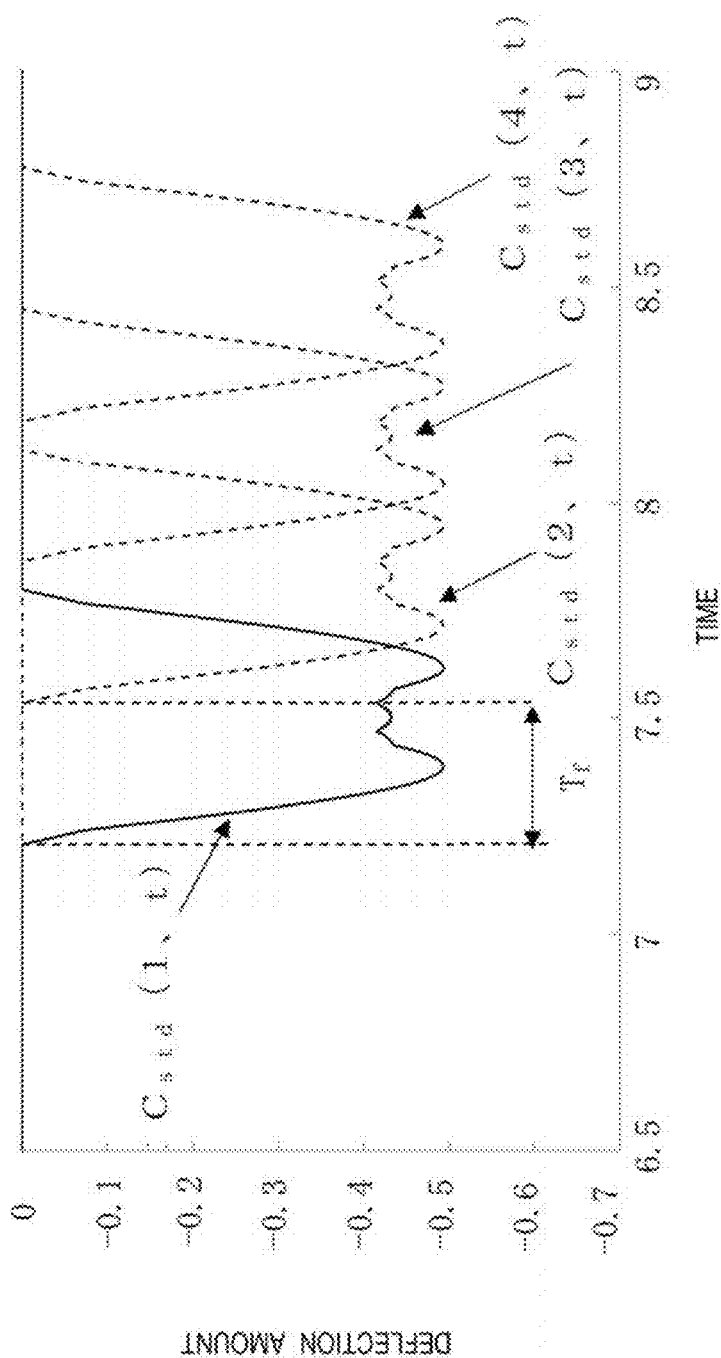
FIG. 13 is a diagram showing deflection of the unit bridge girder caused by each railway vehicle.

The deflection amounts $C_{std}(1, t)$ to $C_{std}(4, t)$ by four railway vehicles included in the railway train at this time are shown in FIG. 13. A cycle of vibration generated in the bridge when the railway vehicles continuously pass through the bridge is defined as $T_f$. The vibration generated in the bridge when the railway vehicles continuously pass through the bridge is vibration generated when the continuous railway vehicles pass through the bridge. For this reason, the cycle $T_f$ is a time difference between the entry time points of the continuous railway vehicles passing through the bridge into the bridge. Since the bridge is deflected by the railway vehicle from the time point when the railway vehicle enters the bridge, the time difference between a start time point of the deflection indicated by $C_{std}(m, t)$ and a start time point of the deflection indicated by $C_{std}(m+1, t)$ is the cycle $T_f$. FIG. 13 shows the deflection generated in the bridge due to the passage of each railway vehicle of the railway train when the railway train passes through the bridge. In a graph of FIG. 13, a horizontal axis represents time, and a vertical axis represents the deflection amount. As shown in FIG. 13, the deflection due to the passing of the railway vehicles in front and rear occurs at a time difference of $T_f$.

Since the cycle $T_f$ is a time difference between the entry time points of the continuous railway vehicles passing through the bridge into the bridge, as shown in the following Equation (39), the cycle $T_f$ can be regarded as a period during which the railway vehicle having a vehicle length $L_c(m)$ passes through at a velocity $v_a$.

$$T_f = \frac{L_C(m)}{v_a} \quad (39)$$

A period during which the railway vehicle $C_m$ of the railway train passes through the bridge is defined as $t_c(m)$. $t_c(m)$ is an example of a moving object passing period, which is a period during which the railway vehicle $C_m$ which is a moving object passes through a bridge which is a structure. $t_c(m)$ is a period from the time point when the first axle of the railway vehicle $C_m$ reaches the entry end to the time point when the $a_r(m)$th axle of the railway vehicle $C_m$ reaches the exit end. That is, $t_c(m)$ is a period during which the railway vehicle $C_m$ moves by a total distance of the bridge length $L_B$ and the distance from the first axle which is the foremost axle of the railway vehicle $C_m$ to the $a_r(m)$th axle which is the rearmost axle of the railway vehicle $C_m$. Therefore, $t_c(m)$ is represented by the following Equation (40).

$$t_c(m) = \left\{ L_B + \sum_{n=1}^{a_r(m)} L_a(a_w(m, n)) - L_a(a_w(m, 1)) \right\} / v_a \quad (40)$$

When the railway train passes through the bridge, the number of railway vehicles for which the subsequent railway vehicle is present among the railway vehicles formed in the railway train is defined as $C_{Tn}$. Among the railway vehicles formed in the railway train, for the railway vehicles other than the rearmost railway vehicle, there is a subsequent railway vehicle. Therefore, $C_{Tn}$ is a number smaller than N by 1. That is, the following Equation (41) is established.

$$t_s = C_{Tn} T_f + t_c(m) \quad (41)$$

Figure 14:
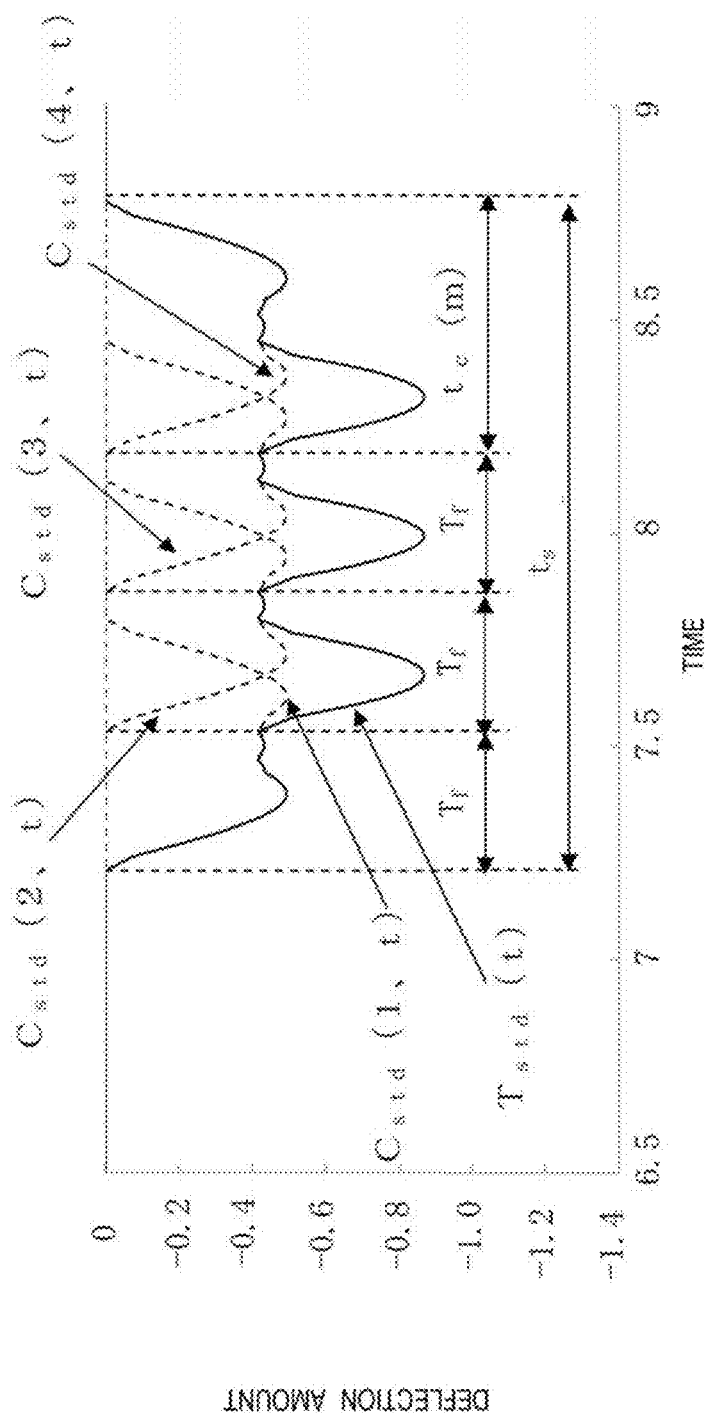
FIG. 14 is a diagram showing deflection of the unit bridge girder caused by each railway vehicle and the railway train.

FIG. 14 shows $C_{std}(1, t)$ to $C_{std}(N, t)$ and $T_{std}(t)$. In a graph of FIG. 14, a horizontal axis represents time, and a vertical axis represents the deflection amount. A solid line in the graph of FIG. 14 indicates $T_{std}(t)$, and dotted lines in the graph indicate $C_{std}(1, t)$ to $C_{std}(4, t)$. As shown in FIG. 14, the passing period $t_s$ is the sum of $C_{Tn} T_f$ and a period $t_c(m)$ during which one railway vehicle $C_m$ passes through the bridge. That is, the following Equation (42) is established.

$$N = C_{Tn} + 1 \quad (42)$$

From Equation (41) and Equation (42), the number N of railway vehicles formed in the railway train is represented by the following Equation (43).

$$N = \frac{t_s - t_c(m)}{T_f} + 1 \quad (43)$$

$T_f$ is also a period required for the railway train to move by the vehicle length of one railway vehicle. Therefore, the distance by which the railway train travels during the passing period $t_s$ is the sum of the length of the (N−1) railway vehicles and the distance by which the railway train travels during the period $t_c(m)$ at the velocity $v_a$. Therefore, the following Equation (44) is established.

$$v_a = \frac{(N-1)L_C(m) + t_c(m)v_a}{t_s} \quad (44)$$

From Equation (44), the following Equation (45) is established. From Equation (45), it can be confirmed that Equation (43) is established.

$$(N-1) = \frac{v_a t_s - t_c(m)v_a}{L_C(m)} = \frac{t_s - t_c(m)}{\frac{L_C(m)}{v_a}} = \frac{t_s - t_c(m)}{T_f} \quad (45)$$

It is considered that the deflection amount $T_{std}(t)$ generated in the bridge when the railway train passes through the bridge includes, as a component of the fundamental frequency $F_f$, a component of vibration generated in the bridge in accordance with the movement of the continuous railway vehicles. $F_f$ is also the frequency of the vibration generated in the bridge in accordance with the movement of the continuous railway vehicles, and thus can be represented as a reciprocal of $T_f$ as shown in the following Equation (46).

$$F_f = \frac{1}{T_f} \quad (46)$$

From Equation (39) and Equation (46), the velocity $v_a$ is represented by a product of $F_f$ and $L_c(m)$ as in the following Equation (47).

$$v_a = F_f L_c(m) \quad (47)$$

Therefore, $t_c(m)$ represented by Equation (40) is a value obtained by dividing the total distance of the bridge length $L_B$ and the distance from the first axle which is the foremost axle of the railway vehicle $C_m$ to the $a_r(m)$th axle which is the rearmost axle by the product of $F_f$ and $L_c(m)$.

From Equation (43) and Equation (46), the number N of railway vehicles formed in the railway train is represented as a value obtained by adding one to the product of the fundamental frequency $F_f$ and a value obtained by subtracting the passing period $t_c(m)$ of the bridge by one railway vehicle $C_m$ from the passing period $t_s$ of the railway train passing through the bridge, and is represented by the following Equation (48).

$$N = (t_s - t_c(m))F_f + 1 \quad (48)$$

The inventors found that the average velocity $v_a$ of the railway train is represented by the product of the fundamental frequency $F_f$ and the length of one railway vehicle $C_m$ included in the railway train, as represented by Equation (47). In addition, the inventors found that the period $t_c(m)$ during which one railway vehicle $C_m$ passes through the bridge is represented as a period during which the railway vehicle $C_m$ moves a length of the sum of the length $L_B$ of the bridge and the distance from the first axle of the railway vehicle $C_m$ to the $a_r(m)$th axle at the velocity $v_a$, as represented by Equation (40). Further, the inventors found that the number N of railway vehicles formed in the railway train is represented as a value obtained by adding one to the product of the fundamental frequency $F_f$ and a value obtained by subtracting $t_c(m)$ from $t_s$, as represented by Equation (48).

Then, the inventors conceived a method of deriving the number of railway vehicles formed in the railway train by using time-series data of a displacement at an observation point set on a bridge on which the railway train moves.

The method conceived by the inventors is a method of acquiring time-series data u(t) of the displacement at the observation point set on the bridge on which a railway train moves, acquiring $L_B$, $L_c$, and $L_a$ as the environment information, acquiring the fundamental frequency $F_f$ of u(t) as a frequency of vibration generated in the bridge due to the passage of the continuous railway vehicles formed in the railway train based on the time-series data u(t), deriving the passing period is of the railway train passing through the bridge based on u(t), and deriving the number of railway vehicles included in the railway train based on $L_B$, $L_c$, $L_a$, $F_f$, and is using the relationships represented by Equation (40), Equation (47), and Equation (48).

In the present embodiment, the derivation system 10 derives the value of the number N of railway vehicles formed in the railway train 6 based on the time-series data u(t) of the deflection amount of the bridge 5 measured at the observation point by using the knowledge obtained by the experiment.

The inventors conceived that the actual deflection amount T (t) at a certain position in the bridge is approximated by the sum of the deflection amount proportional to the deflection amount $T_{std}(t)$ at that position derived by the deflection model and the $T_{offset}(t)$ that is not correlated with the deflection amount derived by the deflection model. That is, the inventors conceived an idea of approximating T(t) as a linear function for $T_{std}(t)$ as in the following Equation (49).

$c_1$ in Equation (49) is a linear coefficient. Here, a portion proportional to the deflection amount derived by the deflection model is a displacement proportional to the load of the unit bridge girder to which the BWIM can be applied.

$$T(t) \cong c_1 T_{std}(t) + T_{offset}(t) \quad (49)$$

$$t_i \le t \le t_o$$

The inventors conceived that $u_{lp}(t)$ obtained by subjecting the time-series data measured at the observation point to the low-pass filter processing is approximated as a linear function for $T_{std\_R\_lp}(t)$ having the linear coefficient of $c_1$, as shown in the following Equation (50). $T_{std\_R\_lp}(t)$ is a value obtained by subjecting the normalized deflection amount $T_{std\_R}(t)$ of the observation point derived using the deflection model to the low-pass filter processing for attenuating a component of a frequency equal to or higher than the fundamental frequency. $C_0$ in Equation (50) is a zero-order coefficient and indicates a displacement assumed to be independent of the position of the observation point.

$$u_{lp}(t) \cong c_1 T_{std\_R\_lp}(t) + c_0 \quad (50)$$

$$t_i \le t \le t_o$$

When a value obtained by subtracting the right side from the left side of Equation (50) is used as an error, and $c_1$ and $c_0$ are derived by using a least-squares method so as to minimize the error, the following Equation (51) and Equation (52) are obtained.

$$c_1 = \frac{K \sum_{t=t_a}^{t_b} u_{lp}(t) T_{std\_R\_lp}(t) - \sum_{t=t_a}^{t_b} T_{std\_R\_lp}(t) \sum_{t=t_a}^{t_b} u_{lp}(t)}{K \sum_{t=t_a}^{t_b} T_{std\_R\_lp}(t)^2 - \left(\sum_{t=t_a}^{t_b} T_{std\_R\_lp}(t)^2\right)} \quad (51)$$

$$c_0 = \frac{\sum_{t=t_a}^{t_b} u_{lp}(t) - \sum_{t=t_a}^{t_b} T_{std\_R\_lp}(t)}{K} \quad (52)$$

In Equation (51) and Equation (52), ta is a start time point of a predetermined period of time for which $u_{lp}(t)$ is approximated by $T_{std\_R\_lp}(t)$. In the present embodiment, ta is the entry time point $t_i$. In addition, $t_b$ is an end time point of the predetermined period of time for which $u_{lp}(t)$ is approximated by $T_{std\_R\_lp}(t)$. In the present embodiment, $t_b$ is the exit time point $t_o$. K in Equation (51) and Equation (52) is a value represented by the following Equation (53).

$$K = \sum_{t=t_a}^{t_b} 1 \quad (53)$$

As shown on the right side of Equation (50), the deflection amount restored using $T_{std\_R\_lp}(t)$ and coefficients $c_1$ and $c_0$ is defined as $T_{Estd\_R\_lp}(t)$. $T_{Estd\_R\_lp}(t)$ is represented by the following Equation (54). Here, in the periods of $t<t_i$ and $t>t_o$, since the railway train does not travels on the unit bridge girder, it is defined that there is no deflection, and $c_0=0$.

$$T_{Estd\_R\_lp}(t) = \begin{cases} t < t_i: & c_1 T_{std\_R\_lp}(t) \\ t_i \le t \le t_o: & c_1 T_{std\_R\_lp}(t) + c_0 \\ t_0 < t: & c_1 T_{std\_R\_lp}(t) \end{cases} \quad (54)$$

An amplitude ratio $R_r$ of $T_{Estd\_R\_lp}(t)$ to $T_{std\_R\_lp}(t)$ is obtained by the following Equation (55). $k_0$ in Equation (55) is a value indicating what number of observations of the deflection amount performed earliest during the period during which the waveform of the deflection amount $u_{lp}(t)$ is shifted. n is a value obtained by subtracting $k_0$ from a value indicating what number of observation values of the deflection amount, which is measured latest during the period during which the waveform of the deflection amount $u_{lp}(t)$ is shifted. That is, the observation value of the deflection amount performed latest during the period during which the waveform of $u_{lp}(t)$ is shifted is the $(k_0+n)$th observation value.

$$R_r = \left(\frac{1}{n+1} \sum_{k=k_0}^{k_0+n} T_{Estd\_R\_lp}(k\Delta T)\right) / \left(\frac{1}{n+1} \sum_{k=k_0}^{k_0+n} T_{std\_R\_lp}(k\Delta T)\right) \quad (55)$$

The inventors assumed that the offset $T_{offset\_R\_std}(t)$ at the observation point is a product of $R_r$ and $T_{std\_R\_lp}(t)$ and is a value rounded to $c_0$ for an element having an absolute value larger than $c_0$, as shown in the following Equation (56). That is, $T_{offset\_R\_std}(t)$ indicates a component of deflection that the value approaches $c_0$ with the passage of time from the entry of the railway train into the bridge, remains constant at $c_0$ after the value reached $c_0$, and converges to 0 with the passage of time when the railway train exits.

$$T_{offset\_R\_std}(t) = \begin{cases} |R_r T_{std\_R\_lp}(t)| \le |c_0|: & R_r T_{std\_R\_lp}(t) \\ |R_r T_{std\_R\_lp}(t)| > |c_0|: & c_0 \end{cases} \quad (56)$$

The estimated value of the deflection amount at the observation point, which is not due to resonance that is a static response generated in accordance with the passage of the railway train, is defined as $T_{EO\_R}(t)$. Here, the static response indicates a deflection due to a load of the moving object passing through the bridge. The static response does not include a deflection due to resonance of the bridge excited by the passage of the moving object. The dynamic response is the sum of the static response and the deflection amount due to resonance. From a relationship represented by Equation (50), the inventors considered that $T_{EO\_R}(t)$ is represented as the sum of $T_{offset\_R\_std}(t)$ and the product of $c_1$ and the estimated value $T_{std\_R}(t)$ using the deflection model, as in the following Equation (57).

$$T_{EO\_R}(t) = c_1 T_{std\_R}(t) + T_{offset\_R\_std}(t) \quad (57)$$

Figure 15:
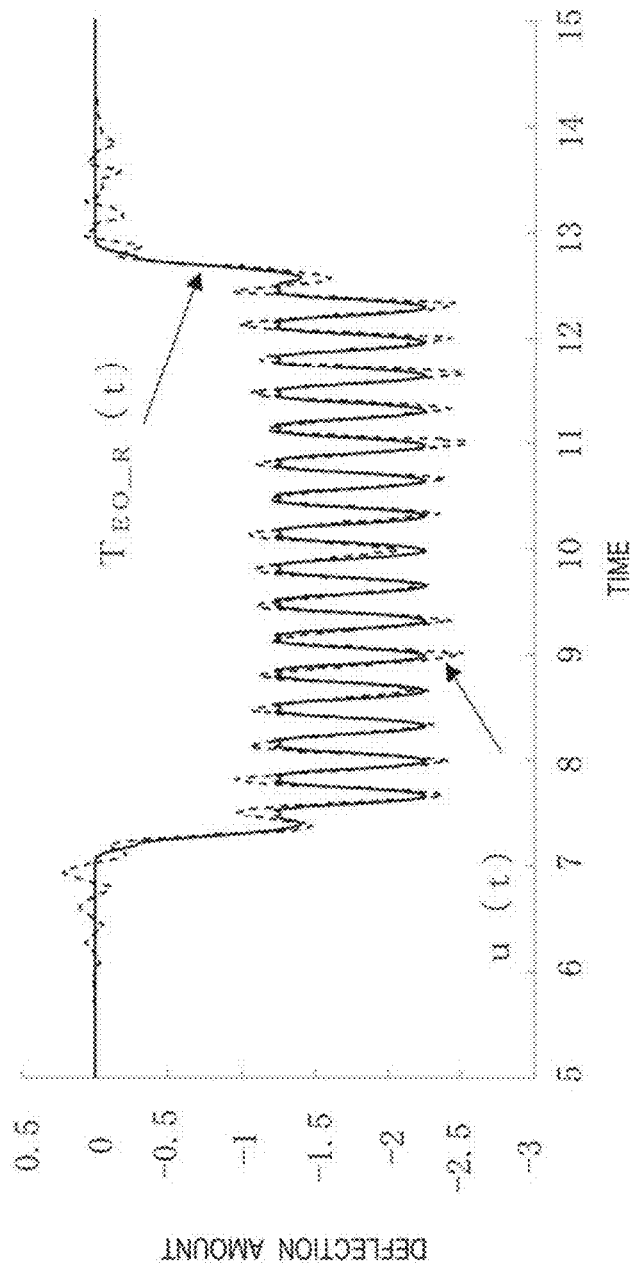
FIG. 15 is a diagram showing an estimated value of a deflection amount.

FIG. 15 shows the time-series data u(t) of the deflection amount actually measured at the observation point of the bridge, and the estimated value $T_{EO\_R}(t)$ of the static response, which is the deflection amount derived from the normalized deflection amount $T_{std\_R}(t)$ at the observation point derived from the deflection model by Equation (57). In a graph of FIG. 15, a horizontal axis represents time, and a vertical axis represents the deflection amount. A solid line in the graph of FIG. 15 indicates $T_{EO\_R}(t)$. A dotted line in the graph indicates u(t). FIG. 15 shows that the estimated value $T_{EO\_R}(t)$ accurately restores u(t). In the example of FIG. 15, since the natural frequency of the bridge is not in the vicinity of the frequency of the vibration generated in the bridge due to the passage of the railway train, the resonance due to the passage of the railway train does not occur in the bridge.

The inventors conceived the following method for deriving the deflection amount of the static response at a designated position other than the observation point position of the unit bridge girder.

Here, it is assumed that a position of a distance $L_B \times r_x$ from the entry end to the exit end on the unit bridge girder is designated as the position for deriving the deflection amount. Here, it is assumed that $r_x=0.05$. Here, the normalized deflection amount at the designated position derived using the deflection model in which $L_x$ in Equation (20), Equation (21), Equation (22), and Equation (25) is replaced with $L_B \times r_x$ is defined as $T_{std\_rx}(t)$. $T_{std\_rx}(t)$ subjected to the low-pass filter processing for attenuating a component of a frequency equal to or higher than the fundamental frequency is defined as $T_{std\_rx\_lp}(t)$.

Here, the deflection amount restored by adding $c_0$ to the product of $T_{std\_rx\_lp}(t)$ and the coefficient $c_1$ using the coefficients $c_1$ and $c_0$ derived at the observation point position in the unit bridge girder is defined as $T_{Estd\_rx\_lp}(t)$. The inventors conceived a method of deriving the deflection amount indicating the static response at the designated position by using $T_{std\_rx}(t)$, $T_{std\_rx\_lp}(t)$, and the coefficients $c_1$ and $c_0$.

Hereinafter, a procedure of this method performed by the inventors will be described.

The inventors obtained $T_{std\_rx}(t)$, and obtained $T_{std\_rx\_lp}(t)$ by subjecting the obtained $T_{std\_rx}(t)$ to the low-pass filter processing for attenuating a component of a frequency equal to or higher than the fundamental frequency.

Figure 16:
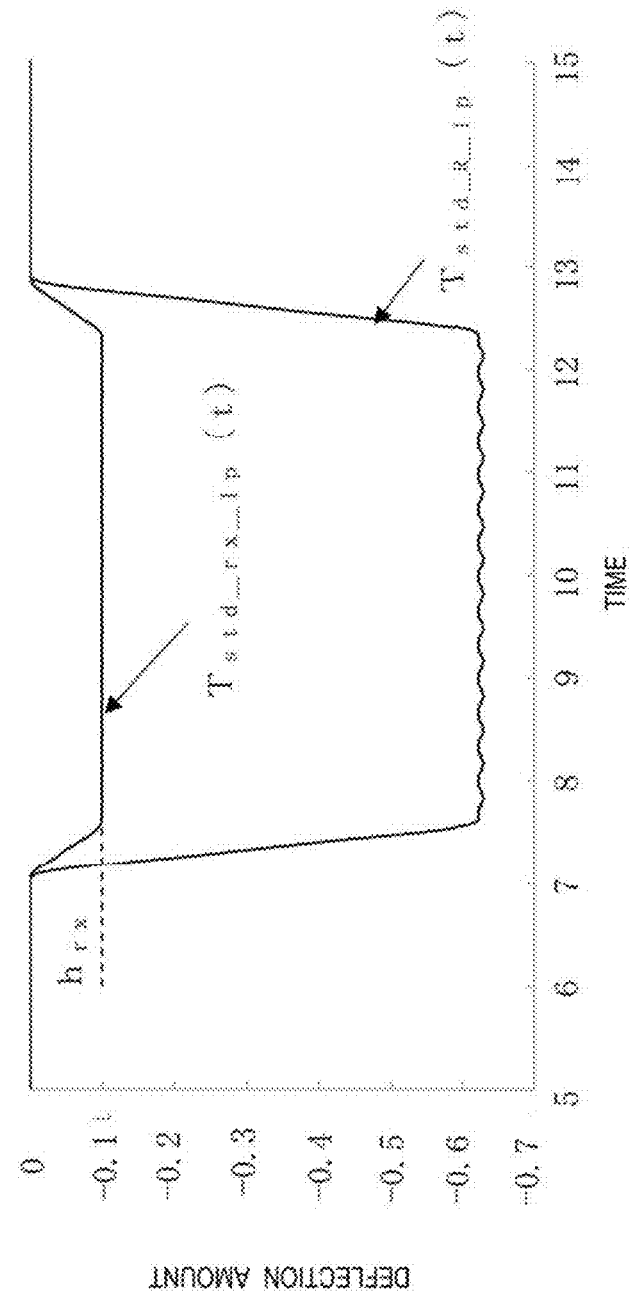
FIG. 16 is a diagram showing an amplitude at a designated position.

The inventors then derived an amplitude $h_{rx}$ of $T_{std\_rx\_lp}(t)$ using the following Equation (58). FIG. 16 shows the derived amplitude $h_{rx}$.

$$h_{rx} = \frac{1}{t_2 - t_1} \sum_{t=t_1}^{t_2} T_{std\_rx\_lp}(t) \tag{58}$$

In Equation (58), $t_1$ and $t_2$ are respectively a start time point and an end time point of any period during a period during which vibration due to the passage of the railway train is generated in the bridge. In the present embodiment, $t_1$ and $t_2$ are respectively a start time point and an end time point of a period set within a period during which $T_{std\_rx\_lp}(t)$ is shifted. That is, $t_1$ and $t_2$ are periods during which the value of $T_{std\_rx\_lp}(t)$ falls within a range of a predetermined width centered on a value whose absolute value is larger than a predetermined value. For example, $t_1$ and $t_2$ may be respectively a start time point and an end time point of a period having a predetermined width (for example, 1 second, 2 seconds, or the like) in the center of the passing period $t_s$ (the period from the entry time point $t_i$ to the exit time point $t_o$). In addition, $t_1$ and $t_2$ may be respectively a time point after a lapse of a predetermined period (for example, a period having a length of a predetermined ratio (10%, 30%, or the like) of the passing period $t_s$) from the entry time point $t_i$ and a time point earlier than the exit time point $t_o$ by a predetermined period (for example, a period having a length of a predetermined ratio (10%, 30%, or the like) of the passing period $t_s$).

In this way, the inventors derived the average value of $T_{std\_rx\_lp}(t)$ in the period from $t_1$ to $t_2$ as the amplitude $h_{rx}$ using Equation (58).

The inventors derived the coefficients $c_1$ and $c_0$ by using Equation (51) and Equation (52) based on $u_{lp}(t)$ obtained by subjecting the time-series data u(t) to the low-pass filter processing for attenuating a component of a frequency equal to or higher than the fundamental frequency and $T_{std\_R\_lp}(t)$ obtained by subjecting the normalized deflection amount estimated value $T_{std\_R}(t)$ at the observation point derived by using the deflection model to the low-pass filter processing for attenuating a component of a frequency equal to or higher than the fundamental frequency.

The amplitude of $T_{Estd\_rx\_lp}(t)$ will be discussed. $T_{Estd\_rx\_lp}(t)$ is a value obtained by adding $c_0$ to the product of $T_{std\_rx\_lp}(t)$ and the coefficient $c_1$. Therefore, a time function $R_{r\_rx}(t)$ indicating the amplitude ratio of $T_{Estd\_rx\_lp}(t)$ to $T_{std\_rx\_lp}(t)$ is represented by the following Equation (59).

$$R_{r\_rx}(t) = \frac{T_{Estd\_rx\_lp}(t)}{T_{std\_rx\_lp}(t)} = \frac{c_1 T_{std\_rx\_lp}(t) + c_0}{T_{std\_rx\_lp}(t)} \tag{59}$$

Figure 17:
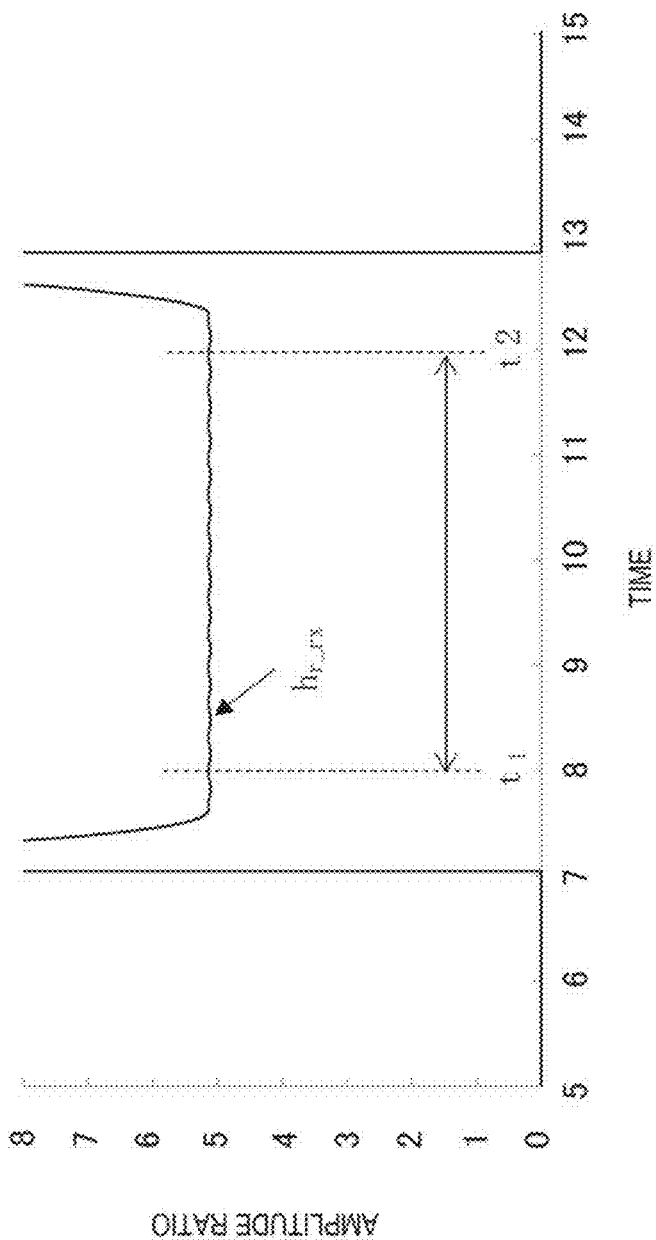
FIG. 17 is a diagram showing an amplitude ratio.

The function $R_{r\_rx}(t)$ is shown in FIG. 17. Here, since $T_{std\_rx\_lp}(t)$ is shifted during the period from $t_1$ to $t_2$, the denominator and numerator of the right side of Equation (59) are substantially constant values during the period from $t_1$ to $t_2$, and the value of $R_{r\_rx}(t)$ is also substantially constant. That is, the period from $t_1$ to $t_2$ is a period during which the value of the amplitude ratio at each time point indicated by $R_{r\_rx}(t)$ falls within a range of a predetermined width centered on a value whose absolute value is equal to or greater than a predetermined value. Here, the average amplitude ratio of $R_{r\_rx}(t)$ in the period from $t_1$ to $t_2$ is defined as $R_{r\_rx}$. The amplitude ratio $R_{r\_rx}$ is represented by the following Equation (60).

$$R_{r\_rx} = \frac{1}{t_2 - t_1} \sum_{t=t_1}^{t_2} R_{r\_rx}(t) \tag{60}$$

The amplitude of $T_{Estd\_rx\_lp}(t)$ is a value obtained by adding $c_0$ to the product of the amplitude $h_{rx}$ of $T_{std\_rx\_lp}(t)$ and $c_1$. Therefore, the amplitude ratio $R_{r\_rx}$ is also represented as a ratio of the amplitude of $T_{Estd\_rx\_lp}(t)$ to the amplitude $h_{rx}$ of $T_{std\_rx\_lp}(t)$ by the following Equation (61).

$$R_{r\_rx} = \frac{c_1 h_{rx} + c_0}{h_{rx}} \tag{61}$$

The inventors derived the amplitude ratio $R_{r\_rx}$ using Equation (60) based on $t_1$, $t_2$, and $R_{r\_rx}(t)$. However, the amplitude ratio $R_{r\_rx}$ can also be derived by using Equation (61) based on $h_{rx}$, $c_1$, and $c_0$. Then, the inventors derived the deflection amount $T_{r\_rx}$ obtained by multiplying $T_{std\_rx\_lp}(t)$ by $R_{r\_rx}$ using the following Equation (62).

$$T_{r\_rx}(t) = T_{std\_rx\_lp}(t) R_{r\_rx} \tag{62}$$

The deflection amount $T_{r\_rx}$ can be derived using the following Equation (63) derived by replacing $R_{r\_rx}$ of Equation (62) with a ratio of $T_{Estd\_rx\_lp}(t)$ (a value obtained by adding $c_0$ to a product of $T_{std\_rx\_lp}(t)$ and the coefficient $c_1$) to $T_{std\_rx\_lp}(t)$.

$$T_{r\_rx}(t) = c_1 T_{std\_rx\_lp}(t) + c_0 \tag{63}$$

When $c_0=0$ before the entry time point $t_i$ and after the exit time point $t_o$, $T_{r\_rx}$ may be represented by the following Equation (64).

$$T_{r\_rx}(t) = \begin{cases} t < t_i: & c_1 T_{std\_rx\_lp}(t) \\ t_i \le t \le t_o: & c_1 T_{std\_rx\_lp}(t) + c_0 \\ t_o < t: & c_1 T_{std\_rx\_lp}(t) \end{cases} \quad (64)$$

Then, the inventors derived the offset $T_{offset\_rx}(t)$ of the deflection amount at the designated position based on the derived $T_{r\_rx}$ using Equation (65). That is, the inventors derived $T_{r\_rx}$ obtained by rounding an element whose absolute value is larger than $c_0$ to $c_0$ as $T_{offset\_rx}(t)$.

$$T_{offset\_rx}(t) = \begin{cases} |T_{r\_rx}(t)| > |c_0|: & c_0 \\ |T_{r\_rx}(t)| \le |c_0|: & T_{r\_rx}(t) \end{cases} \quad (65)$$

Figure 18:
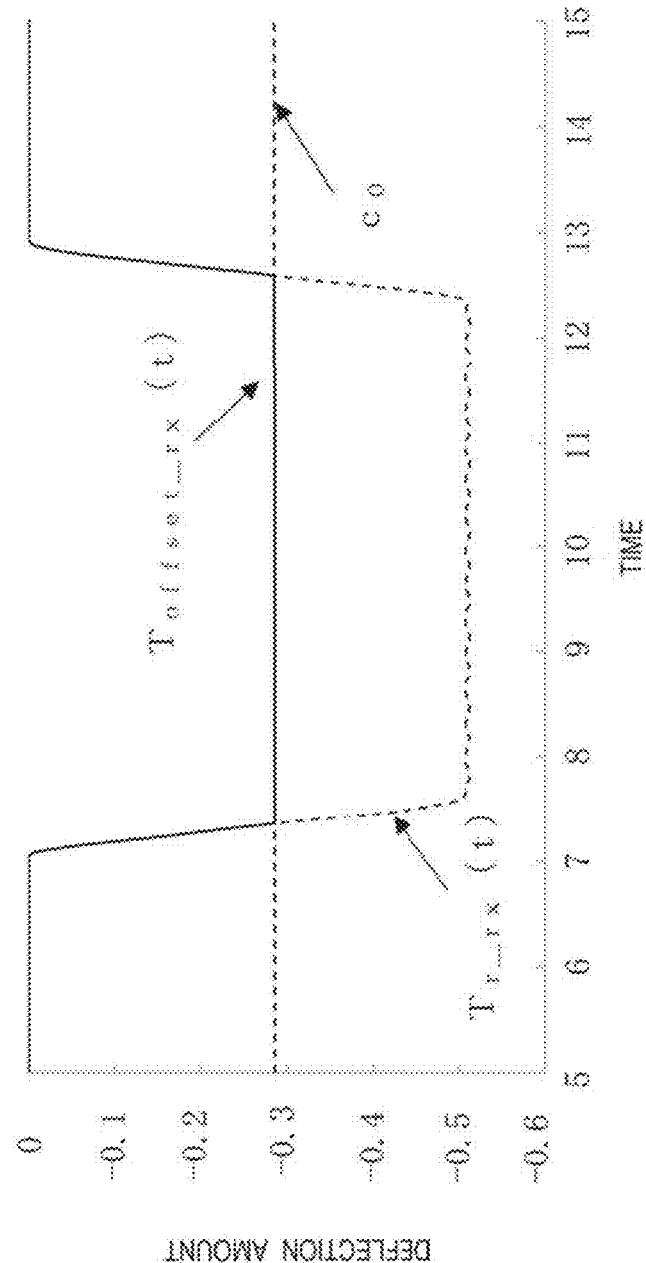
FIG. 18 is a diagram showing an offset.

FIG. 18 shows the derived $T_{offset\_rx}(t)$. In a graph of FIG. 18, a horizontal axis represents time, and a vertical axis represents the deflection amount. A solid line in the graph of FIG. 18 indicates $T_{offset\_rx}(t)$. A dotted line in the graph indicates $T_{r\_rx}(t)$. FIG. 18 shows a state in which the value of $T_{offset\_rx}(t)$ approaches $c_0$ with the passage of time from the entry of the railway train into the bridge, remains constant at $c_0$ for a certain period of time, and converges to 0 with the passage of time when the railway train exits.

Figure 19:
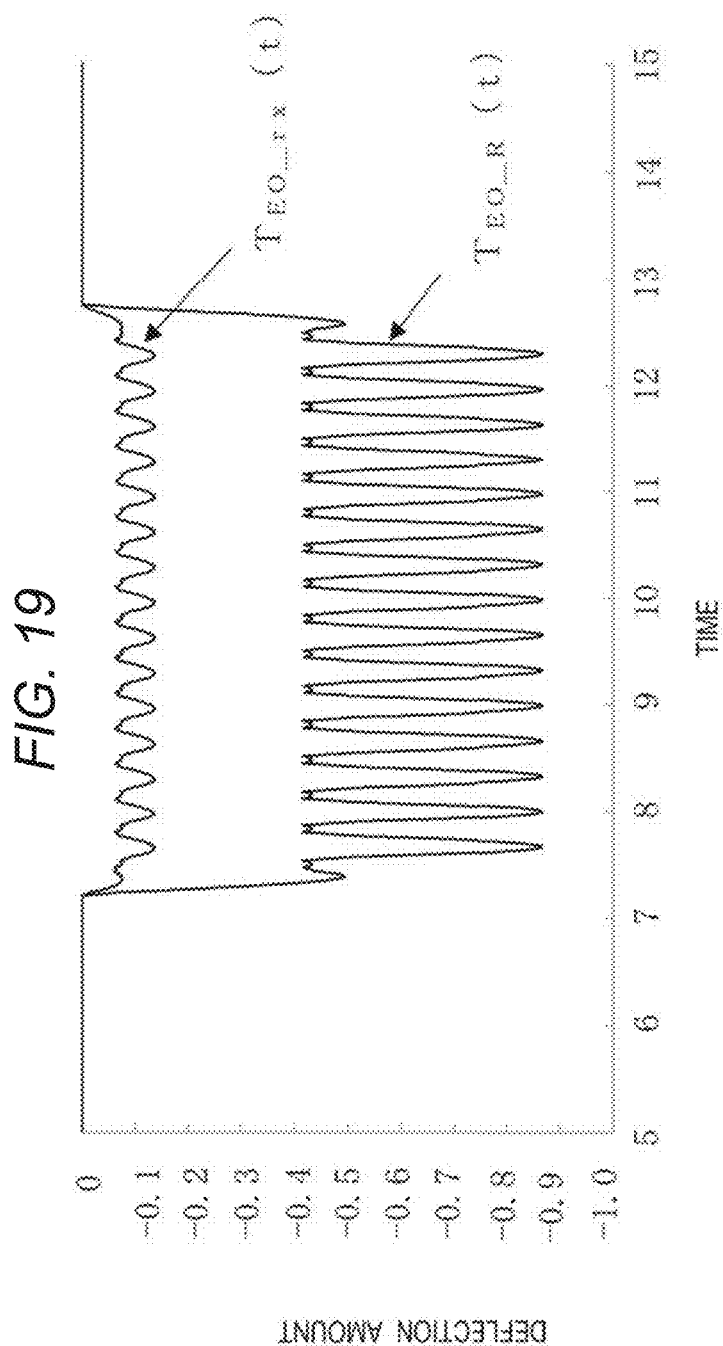
FIG. 19 is a diagram showing the estimated value of the deflection amount.

Then, the inventors derived an estimated value $T_{EO\_rx}(t)$ of the deflection amount at the designated position on the bridge by adding $T_{offset\_rx}(t)$ to the product of the coefficient $c_1$ and $T_{std\_rx}(t)$ using the following Equation (66). FIG. 19 shows the derived value $T_{EO\_rx}(t)$ and an estimated value $T_{EO\_R}(t)$ of the deflection amount at the observation point derived by Equation (57). In a graph of FIG. 19, a horizontal axis represents time, and a vertical axis represents the deflection amount.

$$T_{EO\_rx} = c_1 T_{std\_rx}(t) T_{offset\_rx}(t) \quad (66)$$

In this way, it is possible to derive the deflection amount which is the static response of the unit bridge girder at the designated position 9.

The inventors conceived an idea of obtaining a component of vibration in the vertical direction due to the resonance occurring in the bridge due to the passage of the railway train by subtracting, from the time-series data of the dynamic response measured at the observation point of the bridge, the estimated value of the deflection amount (static response) at the observation point derived using the deflection model. Hereinafter, the component of the vibration in the vertical direction due to the resonance occurring in the bridge due to the passage of the moving object is referred to as a vibration component of the dynamic response. Hereinafter, the vibration component of the dynamic response of the bridge due to the passage of the railway train is simply referred to as a vibration component. The deflection amount due to the vibration component of the dynamic response at the observation point is defined as $u_{nv}(t)$.

Figure 20:
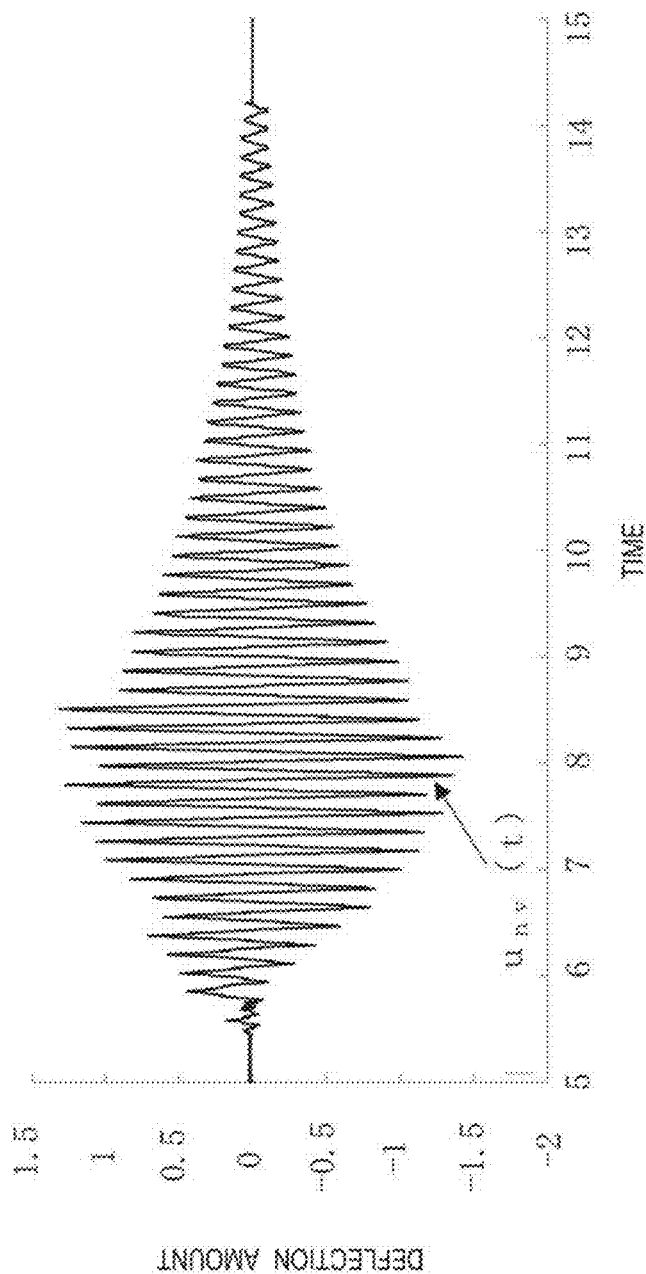
FIG. 20 is a diagram showing the deflection amount due to resonance.

That is, the inventors conceived that, as in the following Equation (67), the deflection amount (vibration component) $u_{nv}(t)$ due to the resonance at the observation point can be derived by subtracting the estimated value $T_{EO\_R}(t)$ of the deflection amount not due to the resonance, which is the static response at the observation point, from the time-series data u(t) of the dynamic response measured at the observation point. FIG. 20 shows an example of the vibration component $u_{nv}(t)$ derived by subtracting $T_{EO\_R}(t)$ from u(t). In a graph of FIG. 20, a horizontal axis represents time, and a vertical axis represents the deflection amount. The position of the observation point is a position of the center of the bridge in the traveling direction of the railway train.

$$u_{nv}(t) = u(t) - T_{EO\_R}(t) \quad (67)$$

The inventors conceived a method of deriving the deflection amount of the dynamic response due to resonance at a designated position in the bridge by the following method based on the vibration component $u_{nv}(t)$ derived by Equation (67).

Hereinafter, a procedure of this method performed by the inventors will be described.

Figure 21:
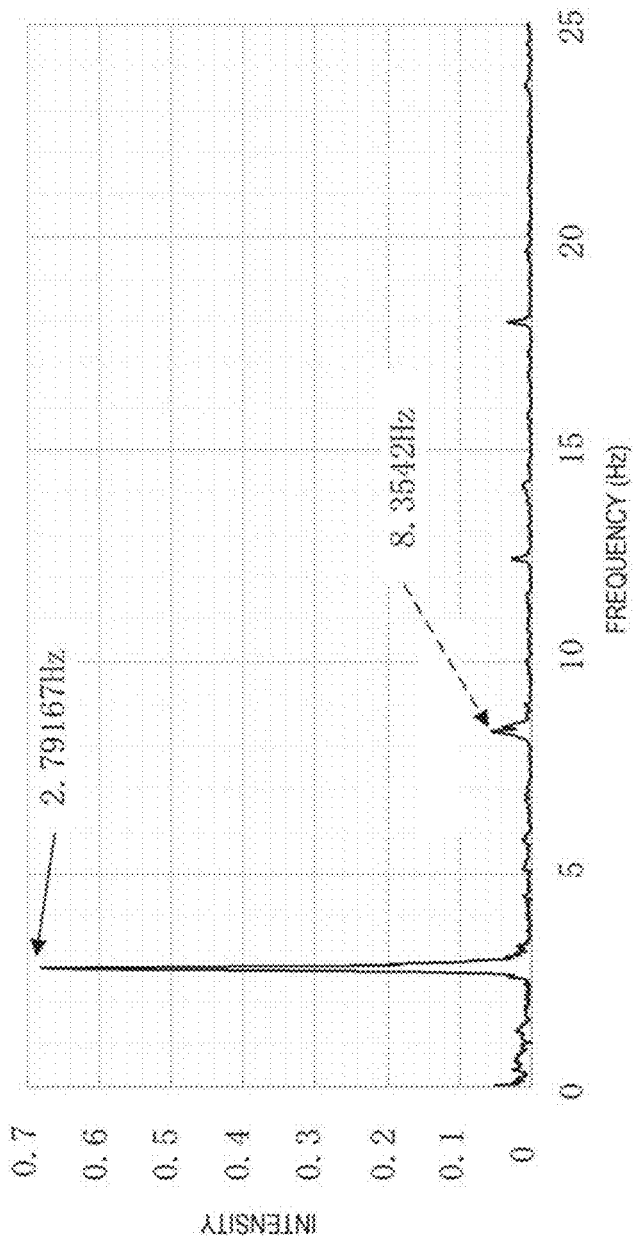
FIG. 21 is a diagram showing an FFT result of the deflection amount due to resonance.

The inventors performed the FFT on the vibration component $u_{nv}(t)$ shown in FIG. 20. FIG. 21 shows a result of the FFT for $u_{nv}(t)$. In a graph of FIG. 21, a horizontal axis represents the frequency, and a vertical axis represents the intensity of the corresponding frequency component.

From the result of the FFT of $u_{nv}(t)$, the inventors specified a peak having a minimum corresponding frequency (in an example of FIG. 21, a peak indicated by a solid arrow) among peaks having an intensity equal to or greater than a predetermined threshold. Then, the inventors specified that the fundamental frequency of the vibration component of the dynamic response of the resonance of the bridge is 2.79167 Hz, which is the frequency corresponding to the specified peak. Hereinafter, the fundamental frequency of the vibration component of the bridge is simply referred to as a fundamental frequency.

In addition, the inventors specified, from the result of the FFT of $u_{nv}(t)$, another peak (in the example of FIG. 21, a peak indicated by a dotted arrow) having an intensity equal to or greater than the predetermined threshold value. Since the frequency corresponding to the specified peak is 8.3542 Hz, which is about three times the fundamental frequency (2.79167 Hz), the inventors specified the specified peak as a peak corresponding to a tertiary wave component having a frequency three times the fundamental frequency. In the following description, the fundamental frequency in the vibration component of the dynamic response generated in the bridge due to the resonance and the harmonic of the vibration component are natural frequencies of the unit bridge girder. Hereinafter, a component of a frequency that is q times a natural number of the fundamental frequency is referred to as a q-th order wave.

From this, the inventors specified that main components of $u_{nv}(t)$ are a component of the fundamental frequency and a component of a frequency (tertiary wave) three times the fundamental frequency.

The inventors extracted the component of the fundamental frequency included in $u_{nv}(t)$ by subjecting $u_{nv}(t)$ to bandpass filter processing for extracting the component of the fundamental frequency. Hereinafter, the component of the q-th order wave included in $u_{nv}(t)$ will be referred to as $u_{nv\_q}(t)$. For example, the component of the fundamental frequency included in $u_{nv}(t)$ is $u_{nv\_1}(t)$.

The inventors extracted a component $u_{nv\_3}(t)$ of the tertiary wave included in $u_{nv}(t)$ by subjecting $u_{nv}(t)$ to the bandpass filter processing for extracting a component of a harmonic frequency three times the fundamental frequency.

Figure 22:
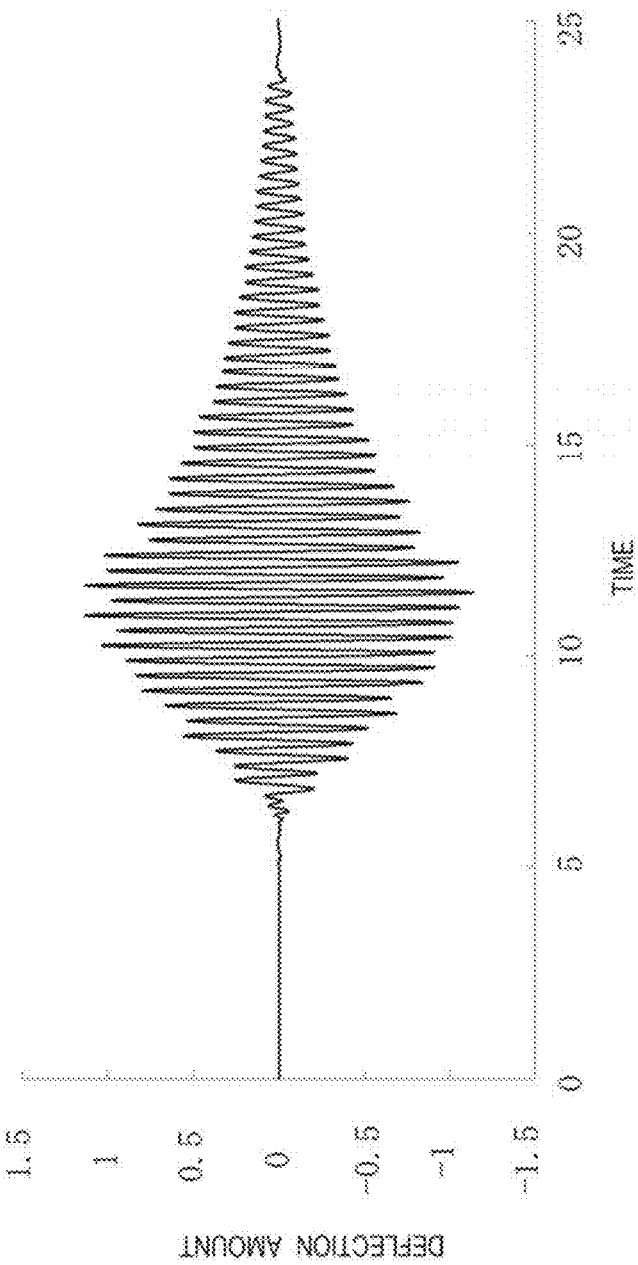
FIG. 22 is a diagram showing a primary wave.
Figure 23:
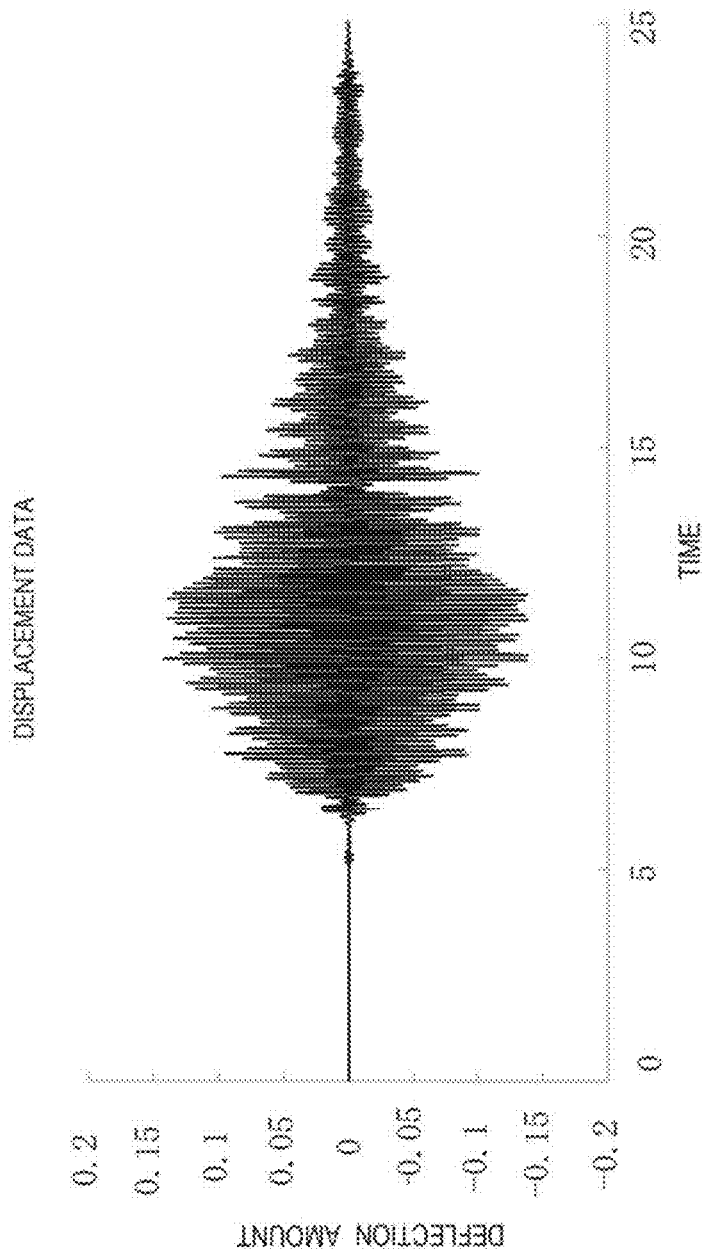
FIG. 23 is a diagram showing a tertiary wave.

FIGS. 22 and 23 show the extracted $u_{nv\_1}(t)$ and $u_{nv\_3}(t)$, respectively. In each of graphs of FIGS. 22 and 23, a horizontal axis represents time, and a vertical axis represents the deflection amount.

When a load position a from the entry end of the bridge exists on a left side of an observation point position x (here, the position of 1/2 of the bridge), from Equation (8), $H_a=1$ based on x>a. Therefore, when x=½ and $H_a=1$ are substituted into Equation (14) and a+b=l, the following Equation

(68) indicating the deflection amount $w_L$ at the observation point generated by a load on the left side is obtained. Here, l is a variable indicating the length of the bridge.

$$w_L = \frac{P}{48EI}(3al^2 - 4a^3) \tag{68}$$

When the load position a from the entry end of the bridge exists on a right side of the observation point, from Equation (8), $H_a=0$ based on x<a. Therefore, when x=l/2 and $H_a=0$ are substituted into Equation (14), the following Equation (69) indicating a deflection amount $w_R$ at the observation point generated by the load on the right side is obtained.

$$w_R = \frac{P}{48EI}(3a^2b + 6ab^2 - b^3) \tag{69}$$

When the load position on the bridge is the position of the observation point at the center, from Equation (8), $H_a=0$ based on x=a. Therefore, when x=l/2 and $H_a=0$ are substituted into Equation (14), the following Equation (70) indicating a deflection amount $w_P$ at the observation point when the load is applied to the observation point is obtained.

$$w_P = \frac{P}{48EI}l^3 \tag{70}$$

In the model of the bridge of the simple beam supported by fulcrums at both ends, the deflection amount becomes maximum when the load is applied to the center of the bridge in the case that the observation point is the center position. Therefore, a maximum value $w_{max}$ of the deflection amount generated in the bridge due to the load is represented by the following Equation (71), similarly to Equation (70).

$$w_{max} = \frac{P}{48EI}l^3 \tag{71}$$

When $w_L$ shown in Equation (68) is divided by $w_{max}$ shown in Equation (71) and normalized by $w_{max}$, the following Equation (72) is obtained.

$$\frac{w_L}{w_{max}} = \frac{\frac{P}{48EI}(3al^2 - 4a^3)}{\frac{P}{48EI}l^3} = \frac{3a}{l} - \frac{4a^3}{l^3} \tag{72}$$

In Equation (72), when a/l=r, and the load position is normalized by the length of the bridge, the following Equation (73) is obtained.

$$\frac{w_L}{w_{max}} = 3r - 4r^3 \tag{73}$$

When $w_R$ shown in Equation (69) is divided by $w_{max}$ shown in Equation (71) and normalized by $w_{max}$, the following Equation (74) is obtained.

$$\frac{w_R}{w_{max}} = \frac{\frac{P}{48EI}(3a^2b + 6ab^2 - b^3)}{\frac{P}{48EI}l^3} = \frac{3b}{l} - \frac{4b^3}{l^3} \tag{74}$$

Here, from a/l=r and a+b=l, b=l (1−r). When b=l (1−r) is substituted into Equation (74) and the bridge length is normalized to l=1, the following Equation (75) is obtained.

$$\frac{w_R}{w_{max}} = 3(1-r) - 4(1-r)^3 \tag{75}$$

When the bridge length is normalized to 1, the amplitude $w_{std}$ of the normalized deflection observed at the center of the bridge when the load moves on the bridge is represented by the following Equation (76) obtained by summarizing Equation (73) and Equation (75).

$$w_{std} = \begin{cases} a < \frac{l}{2}: & 3r - 4r^3 \\ a > \frac{l}{2}: & 3(1-r) - 4(1-r)^3 \end{cases} \tag{76}$$

In Equation (76), r and (1−r) each represent a ratio of the distance from the end of the bridge to the position of the load to the length of the bridge. As shown in the following Equation (77), a variable A obtained by summarizing r and (1−r) is defined.

$$A = \begin{cases} a < \frac{l}{2}: & \frac{a}{l} \\ a > \frac{l}{2}: & \frac{b}{l} \end{cases} \tag{77}$$

When A indicated in Equation (77) is used, Equation (76) is represented as the following Equation (78).

$$w_{std} = 3A - 4A^3 \tag{78}$$

Figure 24:
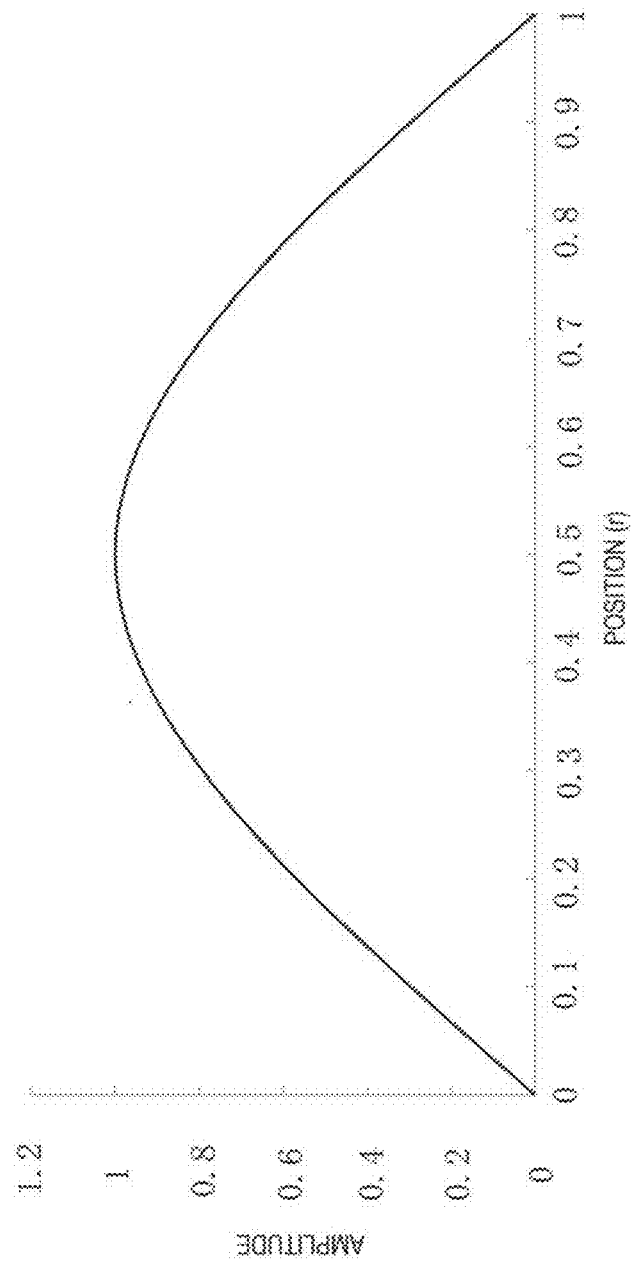
FIG. 24 is a diagram showing an amplitude of a primary wave.
Figure 25:
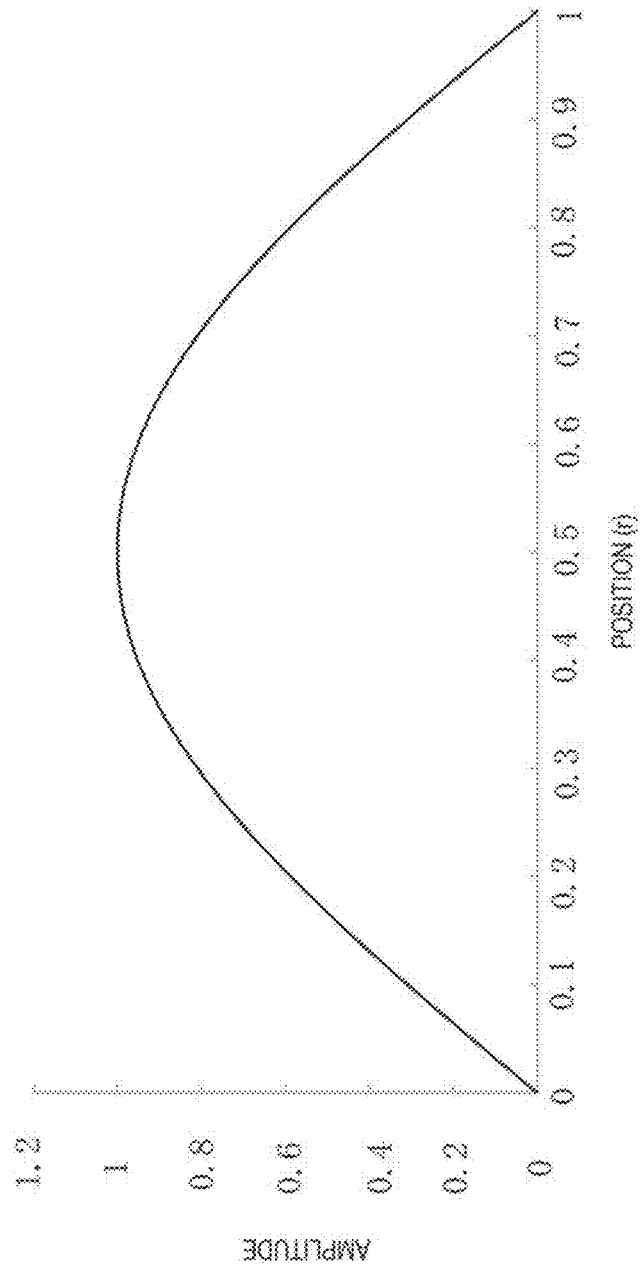
FIG. 25 is a diagram showing the amplitude of the primary wave.

FIG. 24 shows $w_{std}$. In a graph of FIG. 24, a horizontal axis represents r, and a vertical axis represents a normalized amplitude. FIG. 25 shows a waveform of a sine wave sin(rπ). In FIG. 25, a horizontal axis represents r, and a vertical axis represents the amplitude. The inventors found that the waveforms shown in FIGS. 24 and 25 are similar. The inventors found that $w_{std}$ can be approximated to sin (rπ).

Due to the resonance, in the bridge, a component of the fundamental frequency and a component of the harmonic of two or more natural number times the fundamental frequency are generated as vibration components of the dynamic response due to the resonance. These components are sinusoidal vibrations having nodes at both ends of the bridge. Therefore, when the designated position on the bridge is a position where a distance from the entry end to the exit end is lr, a normalized deflection amount $w_{q\_std}(r)$ indicating the distribution of the vibration amplitude indicating the vibration amplitude of the q-th order wave at the designated position can be approximated to sin(qrπ) as shown in the following Equation (79).

$$w_{q\_std}(r) = \sin(qr\pi) \tag{79}$$

sin(rπ) and Equation (78) are approximated. Therefore, the normalized deflection amount $w_{q\_std}$ (r) indicating the distribution of the vibration amplitude including the component of the fundamental frequency and the component of the harmonic frequency is represented by the following Equation (80) in a section of 0≤r≤1.

$$w_{q\_std}(r) = (-1)^{\lfloor qr \rfloor}(3A - 4A^3) \qquad (80)$$

$$A = \begin{cases} 0 \le qr \mod 1 \le 0.5: & qr \mod 1 \\ 0.5 < qr \mod 1 \le 1: & 1 - qr \mod 1 \end{cases}$$

A model of the normalized deflection amount indicating the distribution of the vibration amplitude in the present embodiment is an equation based on the structure of the simple beam-like bridge.

Here, the position of the observation point is defined as a position where a distance from the entry end to the exit end is lr. In addition, the position designated as a target for deriving the deflection amount on the bridge is defined as the position where the distance from the entry end to the exit end is $lr_x$.

By substituting q=1 and r=R into Equation (80), the inventors obtained a deflection amount $w_{1\_std}(R)$ normalized at the observation point, the deflection amount being an amplitude of the primary wave (the component of the fundamental frequency). By substituting q=1 and r=$r_x$ into Equation (80), the inventors also obtained a deflection amount $w_{1\_std}(r_x)$ normalized at the designated position, the deflection amount being an amplitude of the primary wave.

A ratio $Cr_q$ of a deflection amount that is an amplitude of the q-th order wave at the observation point to a deflection amount that is an amplitude of the q-th order wave at the designated position is obtained as a ratio of $w_{q\_std}(R)$ to $w_{q\_std}(r_x)$ as in the following Equation (81).

$$Cr_q = \frac{w_{q\_std}(r_{est})}{w_{q\_std}(r_m)} \qquad (81)$$

Figure 26:
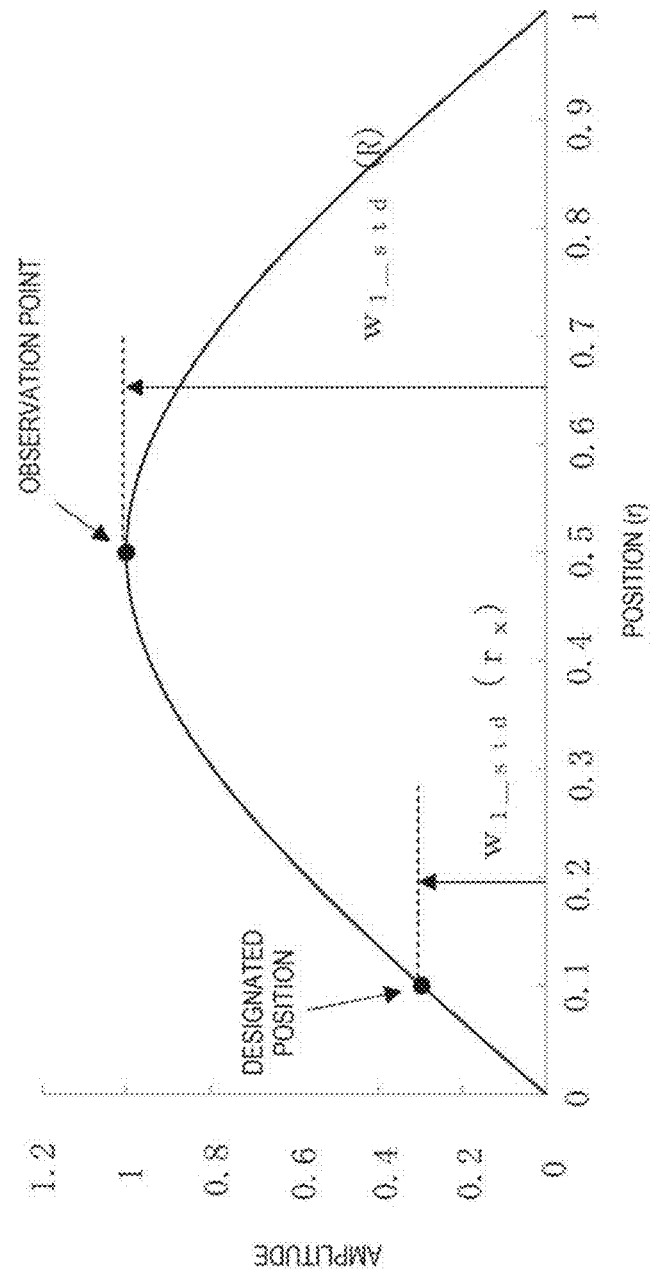
FIG. 26 is a diagram showing the amplitude of the primary wave.

Here, the deflection amount $u_{nv}(t)$ due to the vibration component at the observation point mainly includes the component of the primary wave and the component of the tertiary wave. Therefore, by using Equation (81), the inventors derived a ratio $Cr_1$ of the deflection amount that is the amplitude of the vibration component at the observation point to the deflection amount that is the amplitude of the vibration component at the designated position. FIG. 26 shows $w_{1\_std}(R)$ and $w_{1\_std}(r_x)$ when $r_x$=0.1 and R=0.5. In FIG. 26, a horizontal axis represents r, and a vertical axis represents the normalized deflection amount indicating the distribution of the vibration amplitude. In this case, $w_{1\_std}(R)$ is obtained as 1 by substituting q=1 and R=0.5 into Equation (81). $w_{1\_std}(r_x)$ is obtained as 0.296 by substituting q=1 and $r_x$=0.1 into Equation (81). Therefore, $Cr_1$ is 0.296/1, which is 0.296.

The component of the q-th order wave of the deflection amount of the vibration component at the designated position is defined as $u_{nv\_q\_rx}(t)$. As in the following Equation (82), $u_{nv\_q\_rx}(t)$ is obtained by multiplying the component $u_{nv\_q}(t)$ of the q-th order wave, which is included in the deflection amount $u_{nv}(t)$ generated by the resonance at the observation point, by $Cr_q$.

$$u_{nv\_q\_rx}(t) = Cr_q u_{nv\_q}(t) \qquad (82)$$

By multiplying the obtained $Cr_1$ by $u_{nv\_1}(t)$ as in Equation (82), the inventors derived the component of the fundamental frequency due to the dynamic response at the designated position as $u_{nv\_1\_rx}(t)$.

Figure 27:
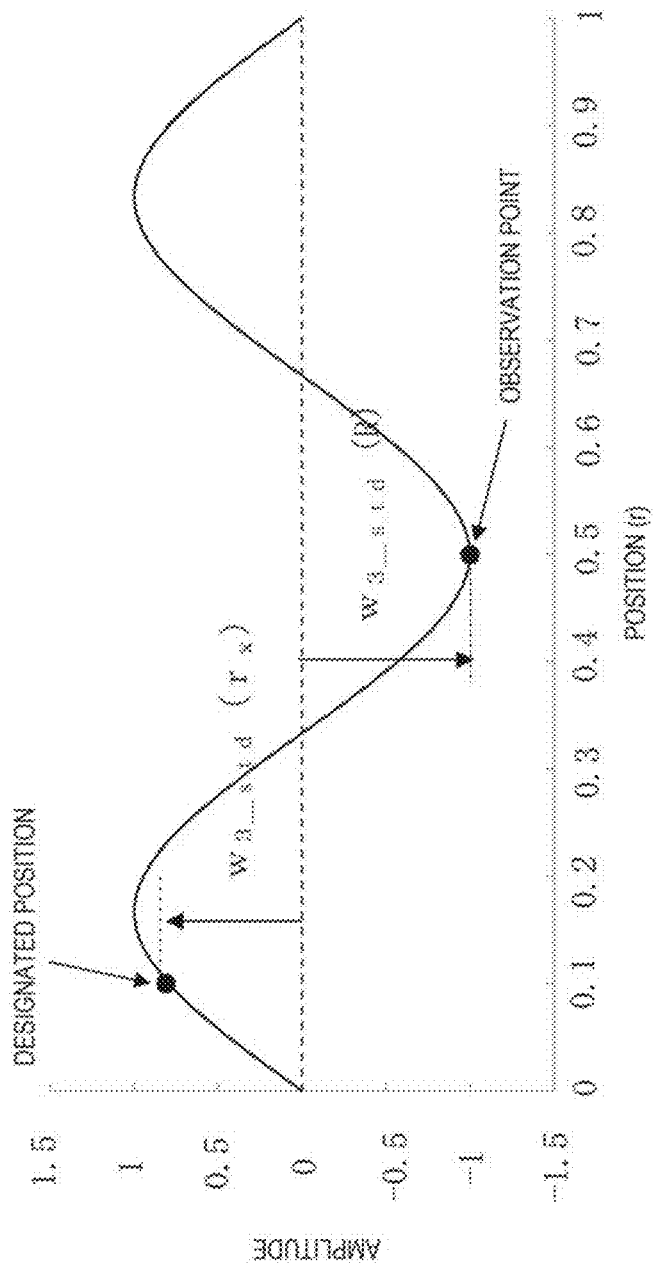
FIG. 27 is a diagram showing an amplitude of a tertiary wave according to a deflection amount normalized by an equation based on a structure of the bridge.
Figure 28:
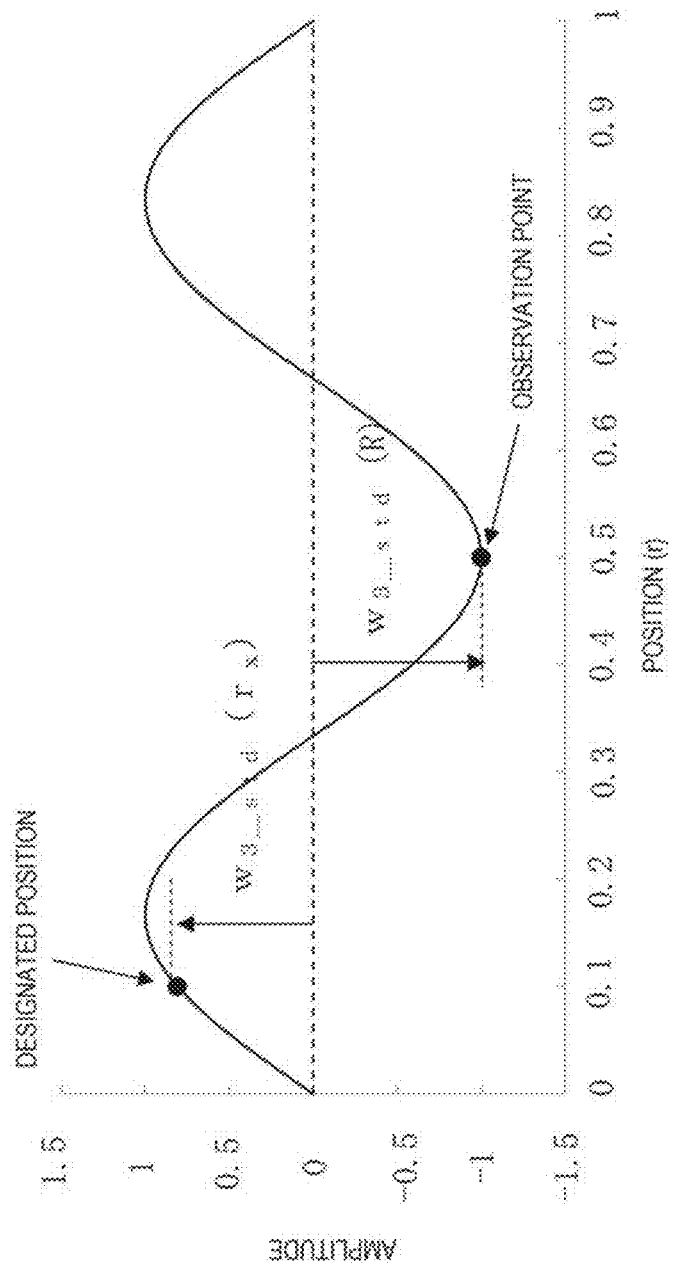
FIG. 28 is a diagram showing an amplitude of a tertiary wave approximated by a sine wave.

The inventors also derived, using Equation (81), a ratio $Cr_3$ of the deflection amount of the vibration component of the dynamic response at the observation point due to the tertiary wave to the deflection amount of the vibration component at the designated position due to the tertiary wave. FIG. 27 shows $w_{3\_std}(R)$ and $w_{3\_std}(r_x)$ when $r_x$=0.1 and R=0.5. In FIG. 27, a horizontal axis represents r, and a vertical axis represents the deflection amount which is the amplitude of the normalized deflection amount indicating the distribution of the vibration amplitude. In this case, $w_{3\_std}(R)$ is obtained as −1 by substituting q=3 and R=0.5 into Equation (81). $w_{3\_std}(r_x)$ is obtained as 0.809 by substituting q=3 and $r_x$=0.1 into Equation (81). Therefore, $Cr_3$ is obtained as 0.809/1, which is 0.809. FIG. 28 shows $w_{3\_std}(R)$ and $w_{3\_std}(r_x)$ derived using Equation (79) when $r_x$=0.1 and R=0.5. In FIG. 28, a horizontal axis represents r, and a vertical axis represents the amplitude of the normalized deflection amount indicating the distribution of the vibration amplitude.

Then, as in Equation (82), the inventors derived a component of the tertiary wave of the deflection amount of the vibration component of the dynamic response at the designated position as $u_{nv\_3\_rx}(t)$ by multiplying the obtained $Cr_3$ by $u_{nv\_3}(t)$.

Figure 29:
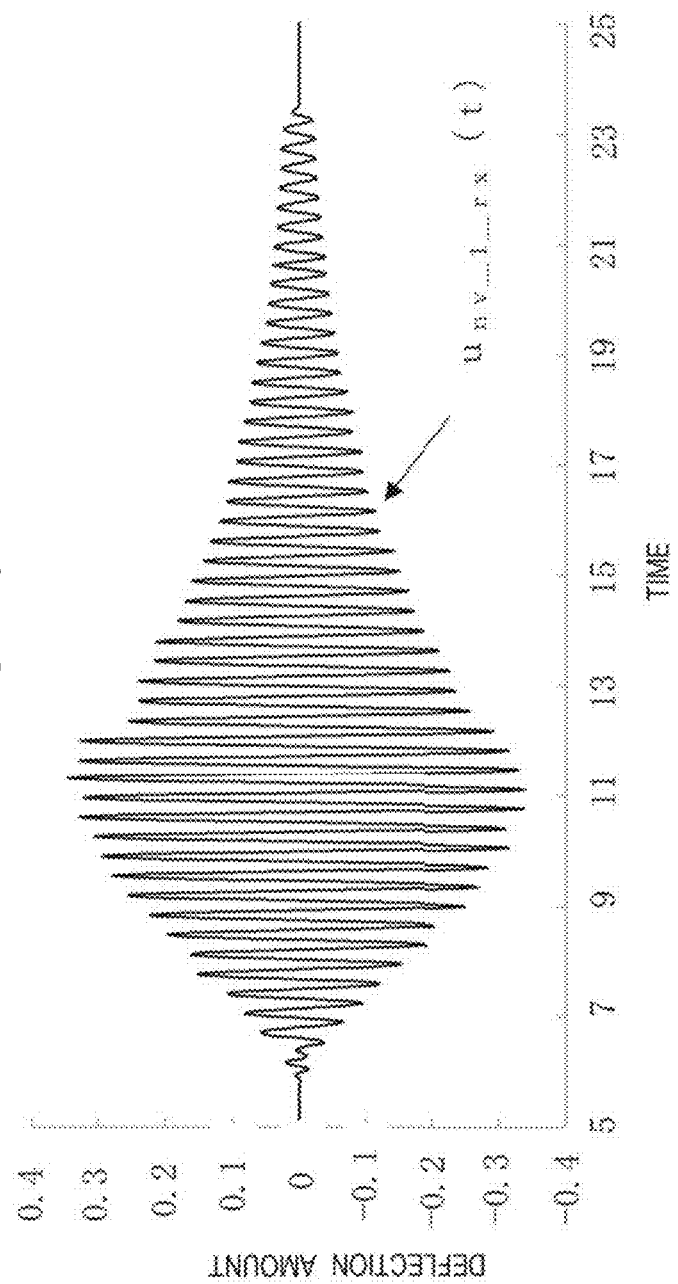
FIG. 29 is a diagram showing derived primary wave components.
Figure 30:
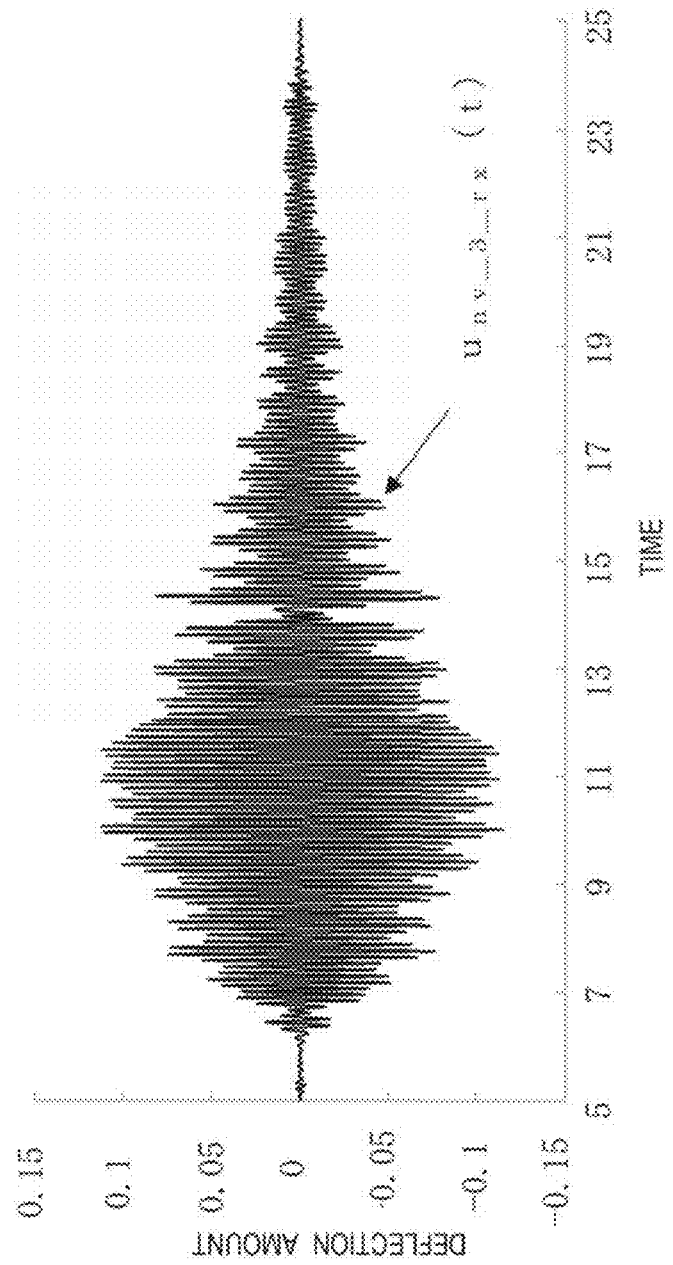
FIG. 30 is a diagram showing derived tertiary wave components.

FIG. 29 shows the derived $u_{nv\_1\_rx}(t)$. In a graph of FIG. 29, a horizontal axis represents time, and a vertical axis represents the deflection amount. FIG. 30 shows the derived $u_{nv\_3\_rx}(t)$. In a graph of FIG. 30, a horizontal axis represents time, and a vertical axis represents the deflection amount.

The inventors obtained the sum of the derived $u_{nv\_1\_rx}$ and $u_{nv\_3\_rx}(t)$ as the estimated value of the vibration component of the dynamic response at the designated position. That is, as in the following Equation (83), a vibration component $u_{nv\_q\_est}(t)$ at the designated position is derived from the sum of the derived q-th order waves $u_{nv\_q\_rx}(t)$.

$$u_{nv\_q\_est}(t) = \sum_{q=1} u_{nv\_q\_rx}(t) \qquad (83)$$

Then, the inventors found that the estimated value $T_{EST\_rx}$ of the dynamic response $T_{EST\_rx}(t)$ at the designated position can be obtained as in the following Equation (84) by adding the estimated value $T_{EO\_rx}(t)$ of the static response at the designated position derived using the deflection model and the obtained estimated value $u_{nv\_q\_est}(t)$ of the vibration component of the dynamic response.

$$T_{EST\_rx}(t) T_{EO\_rx}(t) + u_{nv\_q\_est}(t) \qquad (84)$$

Figure 31:
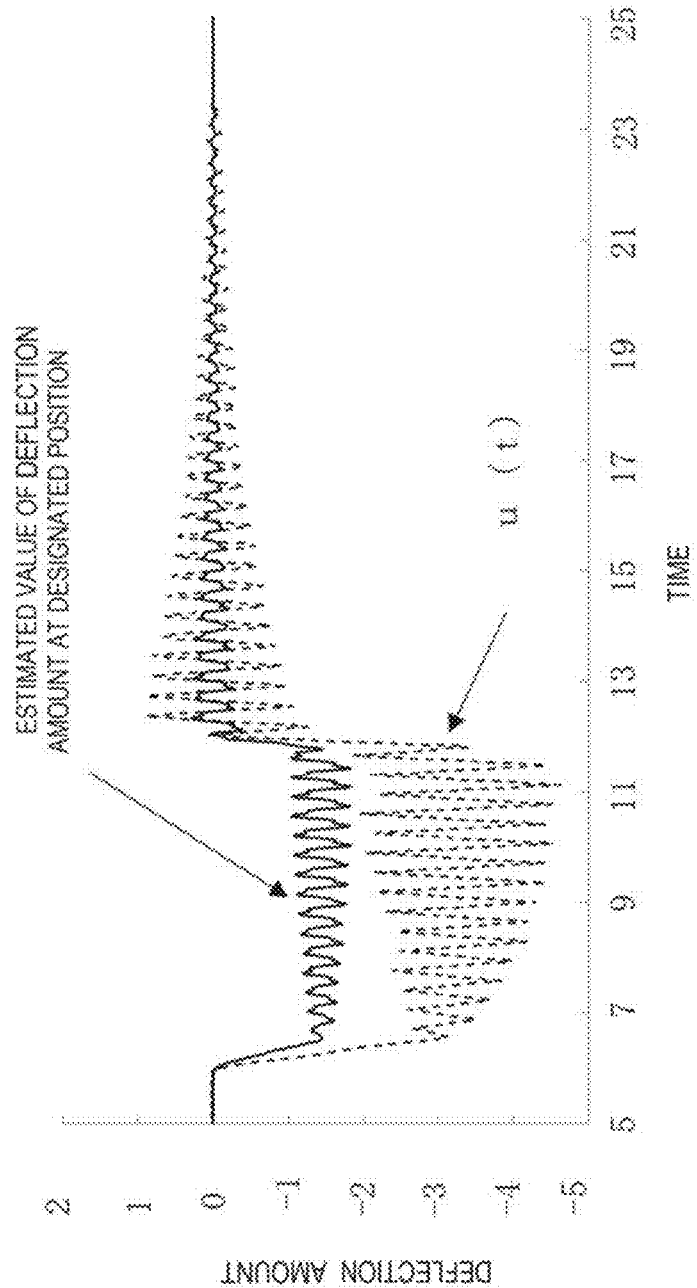
FIG. 31 is a diagram showing a dynamic response of an observation point and a dynamic response of a derived designated position.

FIG. 31 shows a deflection amount obtained by adding $T_{EO\_rx}(t)$, $u_{nv\_1\_rx}(t)$, and $u_{nv\_3\_rx}(t)$. In a graph of FIG. 31, a horizontal axis represents time, and a vertical axis represents the deflection amount. A solid line in the graph of FIG. 31 indicates the deflection amount obtained by adding $T_{EO\_rx}(t)$, $u_{nv\_1\_rx}(t)$, and $u_{nv\_3\_rx}(t)$. A dotted line in the graph of FIG. 31 indicates u(t).

Based on the methods conceived by the inventors, the derivation system 10 of the present embodiment derives the dynamic response at the designated position 9 of the unit bridge girder due to the passage of the railway train 6.

(1-4) Details of Elements

Figure 32:
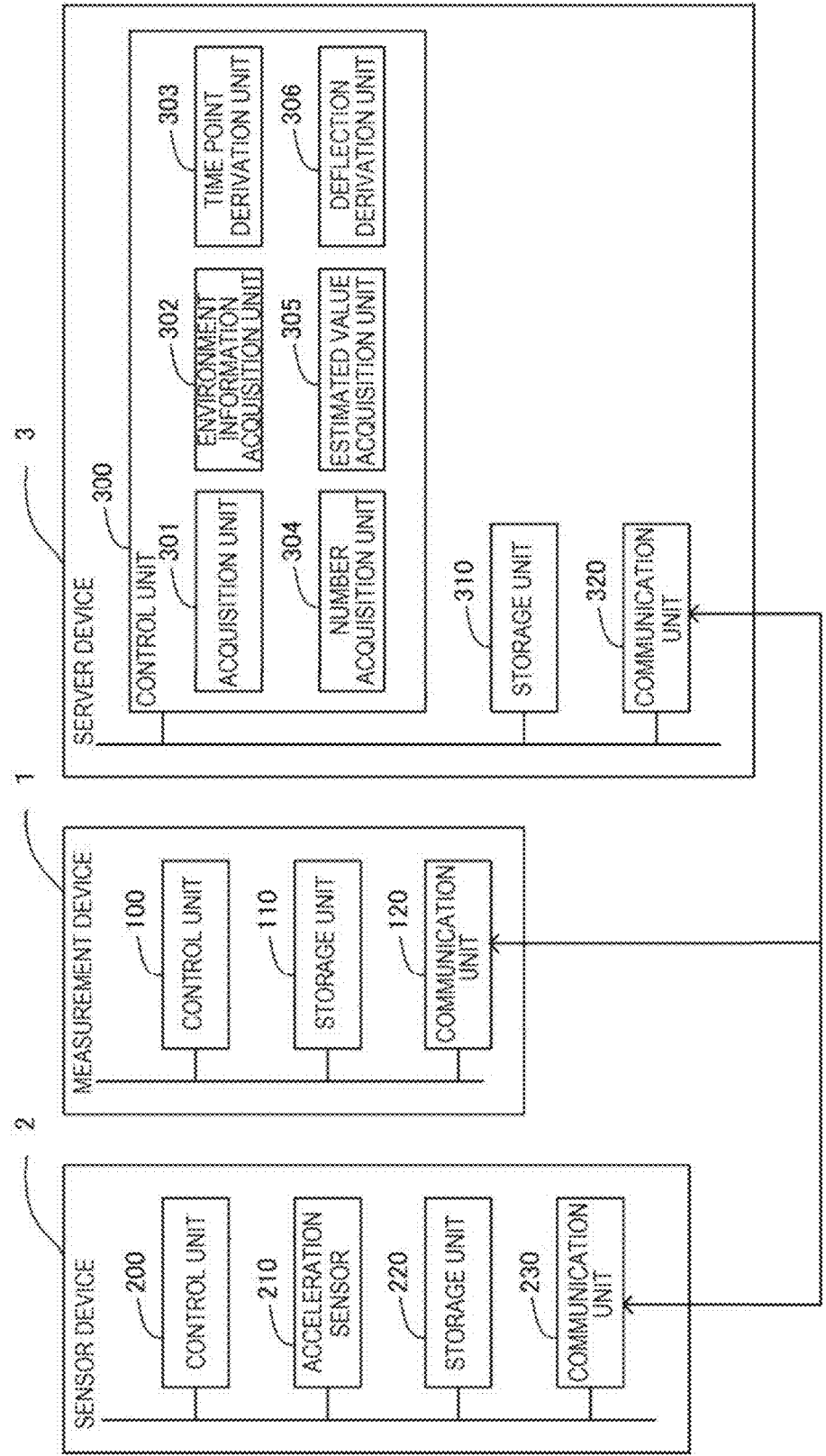
FIG. 32 is a diagram showing details of elements of the derivation system.

Here, each of the measurement device 1, the sensor device 2, and the server device 3 of the derivation system 10 will be described in detail with reference to FIG. 32. In the present embodiment, the position of the designated position 9 in the unit bridge girder is the position where the distance from the entry end to the exit end is $L_B \times r_x$. Here, $r_x$ is a value indicating a ratio of the distance from the entry end of the unit bridge girder to the designated position 9 to $L_B$.

The measurement device 1 measures the deflection at the observation point via the sensor device 2. In the present embodiment, the measurement device 1 is installed on the bridge abutment 8b, but may be installed at another position. The measurement device 1 includes a control unit 100, a storage unit 110, and a communication unit 120. The control unit 100 includes a processor such as a CPU (Central Processing Unit), a ROM (Read Only Memory), a RAM (Random Access Memory), and the like. The control unit 100 implements each function of the measurement device 1 by loading various programs recorded in the ROM or the like in the RAM and executing the programs via the CPU. The storage unit 110 stores various programs, measured deflection data, and the like. The communication unit 120 includes a circuit used for wired or wireless communication with an external device.

The sensor device 2 detects the acceleration as the predetermined physical quantity at the observation point. The sensor device 2 includes a control unit 200, an acceleration sensor 210, a storage unit 220, and a communication unit 230. The control unit 200 includes a processor such as a CPU, a ROM, a RAM, and the like. The control unit 200 implements each function of the sensor device 2 by loading various programs recorded in the ROM or the like in the RAM and executing the programs via the CPU.

The acceleration sensor 210 is an acceleration sensor such as a quartz acceleration sensor or a MEMS acceleration sensor capable of detecting an acceleration generated in each axial direction of three axes orthogonal to one another. In the present embodiment, the acceleration sensor 210 is disposed such that one axis is parallel to the vertical direction in order to more accurately detect the acceleration in the vertical direction. However, an installation location of the sensor device 2 in the superstructure 7 may be inclined. Even when one of the three detection axes of the acceleration sensor 210 is not installed in alignment with the vertical direction, the measurement device 1 combines the accelerations of the three axes and detects the acceleration in the vertical direction.

The control unit 200 of the sensor device 2 detects an acceleration in a cycle in the vertical direction at the observation point on the bridge 5 via the acceleration sensor 210, and transmits the detected acceleration data to the measurement device 1. The control unit 100 of the measurement device 1 measures the deflection of the bridge 5 in the vertical direction at the observation point at an acceleration detection time point based on the acceleration data transmitted from the sensor device 2. In the present embodiment, the control unit 100 obtains the deflection of the bridge 5 in the vertical direction at the observation point by integrating the acceleration indicated by the data transmitted from the sensor device 2 twice with respect to time. Then, the control unit 100 transmits the measured deflection data to the server device 3. In the present embodiment, the sensor device 2 detects the acceleration in a predetermined cycle $\Delta T$. Therefore, the measurement device 1 measures time-series data of the deflection in the $\Delta T$ cycle. That is, the measured time-series data is data of discrete values of displacement measured in the $\Delta T$ cycle, and is data in which each discrete value is associated with the measurement time point.

The server device 3 derives the dynamic response at the designated position 9 based on the deflection of the observation point measured by the measurement device 1. The server device 3 is an example of a derivation device. The server device 3 includes a control unit 300, a storage unit 310, and a communication unit 320. The control unit 300 includes a processor such as a CPU, a ROM, a RAM, and the like. The control unit 300 implements functions of an acquisition unit 301, an environment information acquisition unit 302, a time point derivation unit 303, a number acquisition unit 304, an estimated value acquisition unit 305, and a deflection derivation unit 306 by loading various programs recorded in the ROM or the like into the RAM and executing the programs via the CPU. The storage unit 310 stores various programs, the detected deflection data, and the like. The communication unit 320 includes a circuit used for wired or wireless communication with an external device.

The acquisition unit 301 has a function of acquiring the time-series data of the deflection generated at the observation point as a response caused by the movement of the railway train 6 on each bridge in the bridge 5. With the function of the acquisition unit 301, the control unit 300 acquires the time-series data u(t) of the deflection generated at the observation point from the measurement device 1.

The environment information acquisition unit 302 has a function of acquiring environment information including information on the length of the unit bridge girder, the vehicle length that is the length of the railway vehicle formed in the railway train 6, and the position of the axle at which the wheel is installed in the railway vehicle. With the function of the environment information acquisition unit 302, the control unit 300 acquires, as the environment information, information on the bridge length $L_B$ of the unit bridge girder, the vehicle length $L_c$ of each railway vehicle of the railway train 6, and the distance $L_a$ indicating the position of each railway vehicle of the railway train 6. In the present embodiment, the environment information is stored in advance in the storage unit 310, and the control unit 300 acquires the environment information from the storage unit 310. However, the control unit 300 may acquire the environment information by using another method such as receiving the environment information from an external device.

The time point derivation unit 303 has a function of deriving the entry time point $t_i$ and the exit time point $t_o$ of the railway train 6 with respect to the unit bridge girder based on the time-series data u(t). The control unit 300 executes the FFT on u(t) with the function of the time point derivation unit 303. The control unit 300 detects peaks from the FFT result. The control unit 300 specifies, among the detected peaks, a peak corresponding to a minimum frequency excluding a peak of a side lobe generated due to an influence of a window function used in the FFT. The control unit 300 derives the frequency corresponding to the specified peak as the fundamental frequency $F_f$ of u(t).

The control unit 300 applies low-pass filter processing for attenuating a component of a frequency equal to or higher than the fundamental frequency $F_f$ to u(t) as follows. First, the control unit 300 derives the cycle $T_f$ by deriving the reciprocal of $F_f$ based on the acquired fundamental frequency $F_f$ in the same manner as in Equation (35). The control unit 300 derives the interval $k_{mf}$ using the following Equation (85) based on the derived $T_f$ and $\Delta T$ which is a predetermined cycle.

$$k_{mf} = 2\left\lfloor \frac{T_f}{2\Delta T} \right\rfloor + 1 \tag{85}$$

The control unit 300 applies a low-pass filter to u(t) by taking a moving average in the derived interval $k_{mf}$ for each value of u(t). u(t) subjected to the low-pass filter processing is defined as $u_{lp}(t)=u_{lp}(k\Delta T)$. Here, k is a variable indicating what number of observations when the deflection amount is observed in a cycle at the observation point. The control unit 300 derives $u_{lp}(t)$ using the following Equation (86) based on the derived interval $k_{mf}$. Similarly to u(t) which is data of a plurality of discrete values, $u_{lp}(t)$ is data of a plurality of discrete values.

$$u_{lp}(t) = u_{lp}(k\Delta T) = \frac{1}{k_{mf}} \sum_{n=k-\frac{k_{mf}-1}{2}}^{k+\frac{k_{mf}-1}{2}} u(n\Delta T) \tag{86}$$

Then, the control unit 300 specifies, from $u_{lp}(t)$, two consecutive pieces of data between which a predetermined threshold $C_L$ related to the deflection amount is. Here, the fact that the threshold $C_L$ is between the two consecutive pieces of data of $u_{lp}(t)$ means that $C_L$ is included in a range between the values of the two pieces of consecutively measured displacement data included in $u_{lp}(t)$, that is, a range from the smaller value of these displacement data to the larger value of these displacement data. In the present embodiment, it is assumed that the threshold $C_L$ is a product of a predetermined coefficient from 0 to 1 and an average value of $u_{lp}(t)$ during a period during which the deflection amount is shifted. Here, the period during which the deflection amount is shifted is a period during which the deflection amount of the bridge is maintained within a predetermined range when the railway train riding on the bridge. More specifically, the period during which the deflection amount is shifted is a period during which the deflection amount falls within a range of a predetermined width centered on a value having an absolute value larger than a predetermined value. For example, the control unit 300 extracts data of the deflection amount during a period of a predetermined length (for example, 1 second, 2 seconds, or the like) from $u_{lp}(t)$, and determines the extracted period as the period during which the deflection amount is shifted when the absolute value of the average value of the extracted data is equal to or greater than a predetermined threshold and the absolute value of the difference between the maximum value and the minimum value of the extracted data is equal to or less than the predetermined width. The control unit 300 may receive designation of a start time point and an end time point of the period during which the deflection amount is shifted via an operation unit or the like of the server device 3. Then, the control unit 300 obtains an average value of $u_{lp}(t)$ for the period during which the deflection amount is shifted, and derives a product of the obtained average value and a predetermined coefficient as the threshold $C_L$.

However, the threshold $C_L$ may be another value. For example, the threshold $C_L$ may be a value of the deflection at the observation point of the bridge when the railway vehicle is disposed such that the wheel of first axle at the head of the railway vehicle is placed in the vicinity of the entry end. The threshold $C_L$ may be a deflection amount of the observation point of the bridge when a predetermined weight is applied to the vicinity of the entry end. The threshold $C_L$ may be a value of a predetermined ratio (for example, 10%, 1%, or the like) of the maximum value of the deflection amount at the observation point of the bridge when the railway train passes through the bridge.

Figure 33:
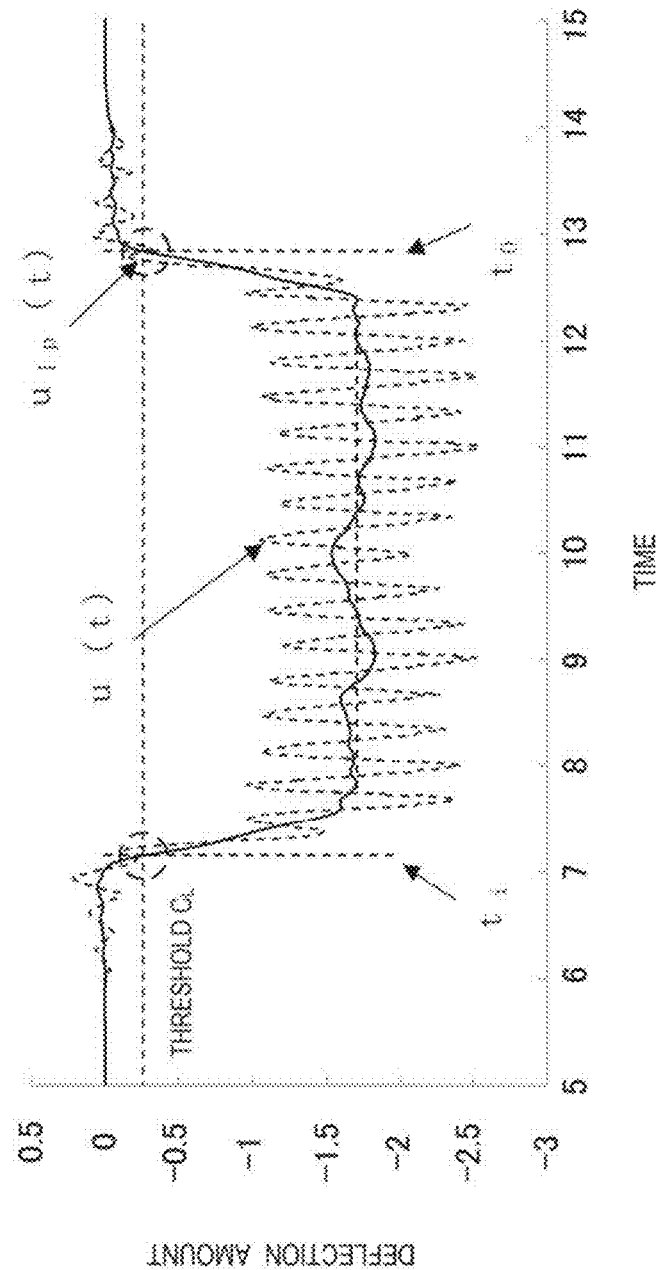
FIG. 33 is a diagram showing derivation processing of an entry time point and an exit time point.
Figure 34:
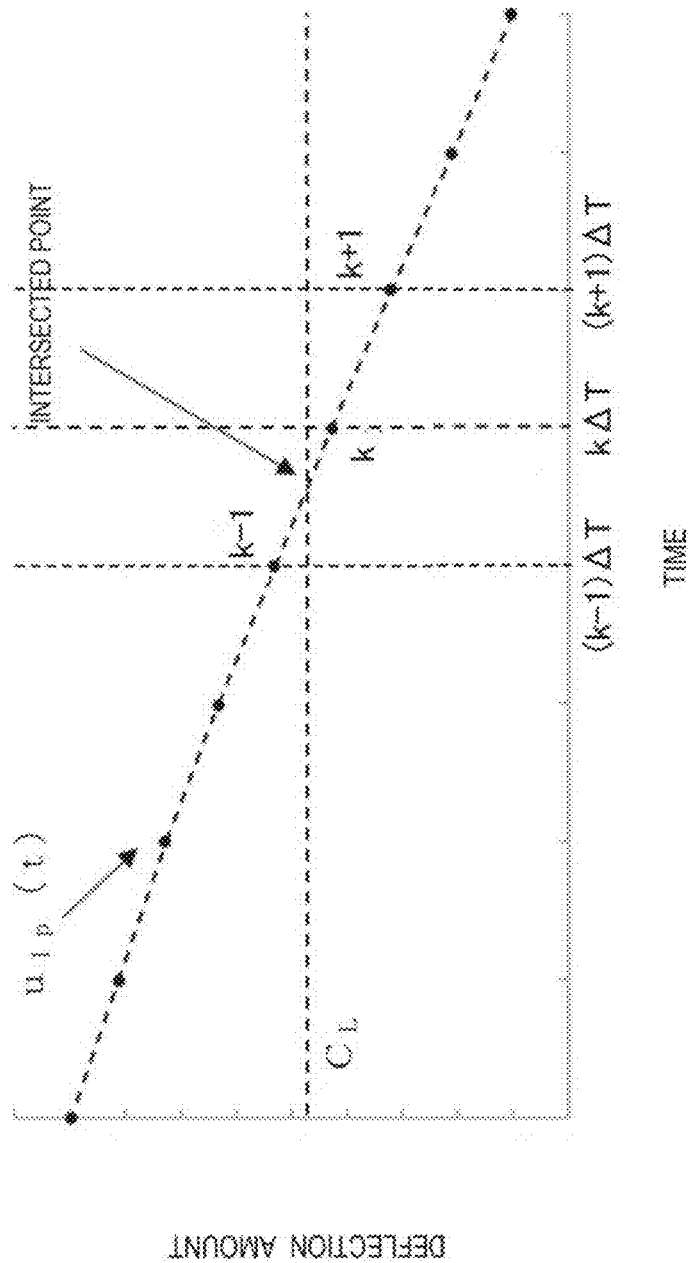
FIG. 34 is a diagram showing the derivation processing of the entry time point and the exit time point.

FIG. 33 shows $u_{lp}(t)$ and the threshold $C_L$. In a graph of FIG. 33, a horizontal axis represents time ($t=k\Delta T$), and a vertical axis represents the deflection amount. A solid line in the graph of FIG. 33 indicates $u_{lp}(t)$, and a dotted line in the graph indicates u(t). In portions surrounded by dotted circles in FIG. 33, $u_{lp}(k)$ and the threshold $C_L$ intersect with each other. FIG. 34 shows an enlarged view of a portion where $u_{lp}(t)$ and $C_L$ intersect with each other (a portion of a dotted circle on the left side in the graph of FIG. 33). In a graph of FIG. 34, a horizontal axis represents time, and a vertical axis represents the deflection amount. Black dots in FIG. 34 indicate data of discrete values included in $u_{lp}(t)$. In an example of FIG. 34, the threshold $C_L$ is between data k−1 and data k included in $u_{lp}(t)$.

The control unit 300 specifies a later one of two time points corresponding to the two consecutive pieces of data between which the specified $C_L$ is. In the example of FIG. 34, the control unit 300 specifies a time point $k\Delta T$ corresponding to the data k.

In an example of FIG. 33, the control unit 300 also specifies two pieces of data in a portion of a dotted circle on the right side in FIG. 33 as two consecutive pieces of data between which $C_L$ is, and specifies the later one of two time points corresponding to the specified two pieces of data.

The control unit 300 derives the earlier one of the specified time points as the entry time point $t_i$ of the railway train 6 entering into the unit bridge girder. In addition, the control unit 300 derives the later one of the specified time points as the exit time point $t_o$ of the railway train 6 exiting from the unit bridge girder. In the example of FIG. 33, the control unit 300 derives the entry time point $t_i=7.2$ [s] and the exit time point $t_o=12.795$ [s]. As described above, in the present embodiment, the control unit 300 derives the time point associated with any data included in $u_{lp}(t)$ as the entry time point $t_i$ and the exit time point $t_o$.

As described above, in the present embodiment, the control unit 300 derives the later one of the two time points corresponding to the two consecutive pieces of data between which $C_L$ is, which are included in $u_{lp}(t)$, as the entry time point $t_i$ and the exit time point $t_o$. However, the control unit 300 may derive other time points as the entry time point $t_i$ and the exit time point $t_o$. For example, the control unit 300 may specify, from $u_{lp}(t)$, two consecutive pieces of data between which the predetermined threshold $C_L$ related to the deflection amount is, and derive, as the entry time point $t_i$ and the exit time point $t_o$, a time point that is during a period after one time point of the time points corresponding to the two specified pieces of data and before the other time point. In the example of FIG. 34, the control unit 300 may derive, as the entry time point $t_i$, a time point after a time point $(k-1)\Delta T$ corresponding to the data k−1 and before the time point $k\Delta T$ corresponding to the data k (for example, time point $(k-1)\Delta T$, a time point corresponding to a point where $u_{lp}(t)$ and $C_L$ intersect with each other, or the like). In addition, the control unit 300 may obtain a curve obtained by interpolating data included in $u_{lp}(t)$, and obtain time points corresponding to intersection points of the obtained curve and $C_L$ as $t_i$ and $t_o$.

It is conceivable that one of two consecutive pieces of data between which $C_L$ included in $u_{lp}(t)$ is present is equal to $C_L$. For example, in the example of FIG. 34, the value of the data k may be equal to $C_L$. In this case, the control unit 300 specifies two sets of data, that is, a set of data equal to $C_L$ and data preceding the data and a set of data equal to $C_L$ and data following the data, as two consecutive pieces of data between which $C_L$ is. In the example of FIG. 34, when the data k is equal to $C_L$, the control unit 300 specifies two sets of a set of the data k−1 and the data k and a set of the data k and data k+1 as two consecutive pieces of data between which $C_L$ is. In such a case, the control unit 300 may select any one set of the specified sets of data and derive a time point between two time points corresponding to two pieces of data included in the selected set as $t_i$ or $t_o$.

In the present embodiment, the control unit 300 derives the time point associated with any data included in $u_{lp}(t)$ as the entry time point $t_i$ and the exit time point $t_o$. As a result, the control unit 300 can easily acquire and utilize the data of $u_{lp}(t)$ corresponding to each measurement time point of $\Delta T$ interval including the entry time point $t_i$ and the exit time point $t_o$ by referring to $u_{lp}(t)$. On the other hand, when deriving the time point not associated with any data included in $u_{lp}(t)$ as the entry time point $t_i$ and the exit time point $t_o$, the control unit 300 obtains the data of $u_{lp}(t)$ corresponding to each measurement time point of the $\Delta T$ interval including $t_i$ and $t_o$ by resampling from the original $u_{lp}(t)$ or the like, which increases time and effort of processing.

The control unit 300 derives the entry time point and the exit time point by using $u_{lp}(t)$ in which a vibration component of a frequency equal to or higher than the fundamental frequency is attenuated, thereby reducing an influence of the vibration component of a frequency equal to or higher than the fundamental frequency and more accurately deriving the entry time point and the exit time point.

However, the control unit 300 may not derive $u_{lp}(t)$. In this case, the control unit 300 may derive time points at which u(t) and the threshold $C_L$ intersect with each other as $t_i$ and $t_o$, for example.

The number acquisition unit 304 has a function of acquiring the number of railway vehicles formed in the railway train 6. The control unit 300 derives the number of railway vehicles included in the railway train 6 based on the first feature by the function of the number acquisition unit 304. Based on $t_i$ and $t_o$, the control unit 300 derives the passing period $t_s$ when the railway train 6 passes through the unit bridge girder using Equation (1). Then, the control unit 300 derives the wave number v of the fundamental frequency $F_f$ included in the passing period $t_s$ using Equation (33) based on the derived is and the fundamental frequency $F_f$ derived based on u(t). Based on the derived v, the control unit 300 derives the number N of railway vehicles included in the railway train 6 using Equation (34), thereby acquiring N. As described above, the control unit 300 derives, as the value of N, a value obtained by subtracting one from the product of $t_s$ and the fundamental frequency $F_f$ of u(t) and rounding the product to an integer.

However, the control unit 300 may acquire N by another method. For example, the control unit 300 may be configured as follows based on the second feature. That is, the control unit 300 subtracts $u_{lp}(t)$ from u(t) to execute high-pass filter processing for attenuating a component of a frequency lower than the fundamental frequency on u(t), and derive $u_{hp}(t)$ which is u(t) on which the high-pass filter processing was performed. Then, the control unit 300 specifies the number of positive peaks from the data of the period from $t_i$ to $t_o$ in $u_{hp}(t)$. The control unit 300 may acquire N by deriving a value obtained by subtracting two from the specified number of positive peaks as the value of N.

In addition, the control unit 300 specifies the number of negative peaks from the data of the period from $t_i$ to $t_o$ in $u_{hp}(t)$. The control unit 300 may acquire N by deriving a value obtained by subtracting one from the specified number of negative peaks as the value of N.

In addition, the control unit 300 may use a method conceived by the inventors as follows. That is, the control unit 300 derives the average velocity $v_a$ of the railway train using Equation (47) based on the fundamental frequency $F_f$ and the vehicle length $L_c(m)$ of the railway vehicles of the railway train 6 indicated by the environment information. Based on the derived $v_a$ and $L_B$ and $L_a$ that are indicated by the environment information, the control unit 300 derives the period $t_c(m)$ during which one railway vehicle passes through the bridge using Equation (40). Then, based on the derived $F_f$, $t_s$, and $t_c(m)$, the control unit 300 may derive the number N of railway vehicles formed in the railway train 6 using Equation (48) and acquire N.

However, the control unit 300 may not derive the value of N. For example, the control unit 300 may receive the designation of N based on the operation of the operation unit of the server device 3 executed by a user and acquire the received value as N. In addition, the control unit 300 may receive designation of N from an external device and acquire the received value as N. Further, the control unit 300 may acquire a predetermined value as N.

The estimated value acquisition unit 305 has a function of acquiring the estimated value $T_{EO\_R}(t)$ of the deflection amount, which is the deflection amount of the structure generated at the observation point and which is the static response generated at the unit bridge girder due to the passage of the railway train 6, based on the number N, the entry time point $t_i$, the exit time point $t_o$, and the environment information.

With the function of the estimated value acquisition unit 305, the control unit 300 derives the estimated value $T_{std\_R}(t)$ of the normalized deflection amount generated at the observation point due to the passage of the railway train 6 when N railway vehicles are formed in the railway train 6. Specifically, the control unit 300 derives $t_s$ from $t_i$ and $t_o$ using Equation (1). The control unit 300 derives $v_a$ from $t_s$, $a_r$, $L_a$, $L_B$, and $L_c$ using Equation (5). That is, $v_a$ is derived as a value obtained by dividing the sum of the distance from the foremost axle (the first axle of the foremost railway vehicle) to the rearmost axle (the $a_r(N)$th axle of the rearmost railway vehicle) in the railway train formed with N railway vehicles and the bridge length $L_B$ by the passing period $t_s$ which is a period from the entry time point $t_i$ to the exit time point $t_o$. The control unit 300 derives $t_{xn}$ and $t_{ln}$ from $v_a$, $L_B$, and $L_x$ using Equation (22) and Equation (23). In addition, the control unit 300 derives $t_o(m, n)$ from $L_a$, $L_c$, and $t_i$ using Equation (3) and Equation (24). Then, the control unit 300 derives the function $w_{std}(a_w(m, n), t)$ for each axis of each railway vehicle of the railway train 6 by substituting the derived $t_{xn}$, $t_{ln}$, and $t_o(m, n)$ into Equation (29) and Equation (30).

The control unit 300 adds up $w_{std}(a_w(m, n), t)$ for the axles for N railway vehicles of the railway train 6 using Equation (31), thereby deriving $C_{std}(m, t)$ indicating the deflection of the unit bridge girder due to the passage of the railway vehicles. Then, the control unit 300 derives $T_{std}(t)$ as the deflection of the unit bridge girder due to the passage of the railway train by adding up $C_{std}(m, t)$ of the N railway vehicles using Equation (32). In this way, the control unit 300 acquires the derived $T_{std}(t)$ as the normalized deflection amount $T_{std\_R}(t)$ at the observation point.

In addition, the control unit 300 obtains $T_{std\_R\_lp}(t)$ by subjecting $T_{std\_R}(t)$ to the low-pass filter processing for attenuating a component equal to or higher than the fundamental frequency. Specifically, the control unit 300 executes the FFT on $T_{std\_R}(t)$, and specifies a peak corresponding to a minimum frequency obtained by excluding a peak of a side lobe generated due to an influence of a window function used in the FFT from a result of the FFT. Then, the control unit 300 sets the frequency corresponding to the specified peak as the fundamental frequency $F_f$, and derives the interval $k_{mf}$ using Equation (36). Based on the derived $k_{mf}$, the control unit 300 replaces $T_{std}(t)$ with $T_{std\_R}(t)$, replaces $T_{std\_lp}(t)$ with $T_{std\_R\_lp}(t)$, and derives $T_{std\_R\_lp}(t)$ using Equation (37). However, the control unit 300 may obtain $T_{std\_R\_lp}(t)$ by applying, to $T_{std\_R}(t)$, another FIR filter that attenuates a component of a frequency equal to or higher than the fundamental frequency.

Based on $u_{lp}(t)$ and $T_{std\_R\_lp}(t)$, the control unit 300 derives the coefficients $c_1$ and $c_0$ of a linear function having $T_{std\_R\_lp}(t)$, which approximates $u_{lp}(t)$ shown in Equation (50), as arguments, by using Equation (51) and Equation (52). Here, $t_a$ is the entry time point $t_i$. In addition, $t_b$ is the exit time point $t_o$.

As shown in the right side of Equation (50), the control unit 300 obtains the deflection amount restored using $T_{std\_R\_lp}(t)$ and the coefficients $c_1$ and $c_0$ as $T_{Estd\_R\_lp}(t)$. The control unit 300 derives the amplitude ratio $R_r$ of $T_{Estd\_R\_lp}(t)$ to $T_{std\_R\_lp}(t)$ using Equation (55).

The control unit 300 derives the offset $T_{offset\_R\_std}(t)$ at the observation point using Equation (56) based on $R_r$ and $T_{std\_R\_lp}(t)$.

Then, the control unit 300 derives $T_{EO\_R}(t)$ using Equation (57) based on $c_1$, $T_{std\_R}(t)$, and $T_{offset\_R\_std}(t)$.

The deflection derivation unit 306 has a function of deriving the vibration component of the dynamic response at the designated position 9 based on the amplitude ratio, which is a ratio of a first deflection amount of the vibration component of the dynamic response of the observation point generated at the unit bridge girder due to the passage of the railway train 6 and a second deflection amount that is the deflection amount of the designated position 9 due to the vibration component of the dynamic response, the time-series data u(t), and the estimated value $T_{EO\_R}(t)$.

With the function of the deflection derivation unit 306, the control unit 300 obtains the vibration component $u_{nv}(t)$ of the dynamic response at the observation point by subtracting $T_{EO\_R}(t)$ from u(t) using Equation (67). The control unit 300 performs the FFT on $u_{nv}(t)$, and specifies a peak having an intensity equal to or greater than the predetermined threshold from the result of the FFT of $u_{nv}(t)$. Then, the control unit 300 specifies the peak having the minimum corresponding frequency among the specified peaks, and specifies the frequency corresponding to the specified peak as the fundamental frequency of the natural frequency of the unit bridge girder. In addition, the control unit 300 specifies a frequency corresponding to each of the other specified peaks. Then, the control unit 300 derives, for each of the specified frequencies, a value obtained by dividing the frequency by the fundamental frequency and rounding the divided frequency to a natural number. Then, the control unit 300 acquires each of the derived natural numbers and one as a natural number indicating the order of the frequency of the component included in $u_{nv}(t)$ (how many times the fundamental frequency is), that is, a natural number indicating how many times the frequency component is included in $u_{nv}(t)$. Hereinafter, one or more natural numbers acquired here are referred to as acquisition orders.

The control unit 300, with each of the acquisition orders being sequential q, extracts the component $u_{nv\_q}(t)$ of the q-th order wave by subjecting $u_{nv}(t)$ to the bandpass filter processing for extracting a component of a frequency q times the fundamental frequency.

The control unit 300, with each of the acquisition orders being sequential q, derives, as the first deflection amount, the deflection amount $w_{q\_std}(R)$ that is normalized at the observation point and indicates the amplitude distribution on the unit bridge girder of the vibration of the q-th order wave, using Equation (80) and based on q and r=R. That is, the control unit 300 derives, as the first deflection amount $w_{q\_std}(R)$, the amplitude at the observation point of the deflection amount indicating the amplitude distribution on the unit bridge girder of the vibration of the frequency of natural number q times the fundamental frequency among the vibration components of the dynamic response. In addition, the control unit 300, with each of the acquisition orders being sequential q, derives, as the second deflection amount, the normalized deflection amount $w_{q\_std}(r_x)$ due to the q-th order wave at the designated position 9, using Equation (80) and based on q and r=$r_x$. That is, the control unit 300 derives, as the second deflection amount $w_{q\_std}(r_x)$, the amplitude at the designated position 9 of the deflection amount indicating the amplitude distribution on the unit bridge girder of the vibration of the frequency of the natural number q times the fundamental frequency among the vibration components of the dynamic response.

The control unit 300, with each of the acquisition orders being sequential q, derives the ratio $Cr_q$ of the first deflection amount $w_{q\_std}(R)$ to the second deflection amount $w_{q\_std}(r_x)$ by using Equation (81). Then, the control unit 300, with each of the acquisition orders being as sequential q, derives a product of the component $u_{nv\_q}(t)$ of the q-th order wave and the ratio $Cr_q$ as the component $u_{nv\_q\_rx}(t)$ of the q-th order wave of the vibration component at the designated position 9, as in Equation (82). The control unit 300 derives the estimated value of the vibration component of the dynamic response at the designated position 9 by adding up $u_{nv\_q\_rx}(t)$ derived for each of the acquisition orders using Equation (83), and further derives the estimated value of the dynamic response by adding up the static response and the vibration component at the designated position 9 using Equation (84).

As described above, according to the configuration of the present embodiment, the derivation system 10 can derive the vibration component of the dynamic response at the designated position 9 in the structure.

Depending on the position of the observation point, the amplitude of a part of the components included in the vibration component of the dynamic response may not be measured. For example, when the center of the bridge is the observation point, the position of the center of the unit bridge girder becomes a node of the waveform and the displacement does not occur, so that a component of an even multiple frequency of the fundamental frequency (for example, a secondary wave, a quaternary wave, or the like) cannot be measured. As described above, for the q-th order wave component, a node of the waveform is generated at a position where the distance from the entry end to the exit end is $L_B(n/q)$, n being an integer of 0 to q. Therefore, the component of the q-th order wave cannot be measured at the position where the distance from the entry end to the exit end is $L_B(n/q)$.

Therefore, when deriving the component $u_{nv\_q\_rx}(t)$ of the q-th order wave of the dynamic response at the designated position 9, the control unit 300 may use the time-series data u(t) measured at a position different from the position where the distance from the entry end to the exit end is $L_B(n/q)$.

In addition, the control unit 300 can derive more components of the q-th order wave at the designated position 9 by using the time-series data u(t) measured at a plurality of different observation points.

When a component of the vibration components of the dynamic response, which is a derivation target, is determined in advance, the control unit 300 may use the time-series data u(t) measured at a position where these components can be measured. For example, when the derivation target is three components of the primary wave, the secondary wave, and the tertiary wave, the control unit 300 may use the time-series data u(t) measured at positions different from both ends of the bridge, the position where the distance from the entry end to the exit end is $L_B(1/3)$, the position where the distance from the entry end to the exit end is $L_B(1/2)$, and the position where the distance from the entry end to the exit end is $L_B(2/3)$.

(2) Derivation Processing

Figure 35:
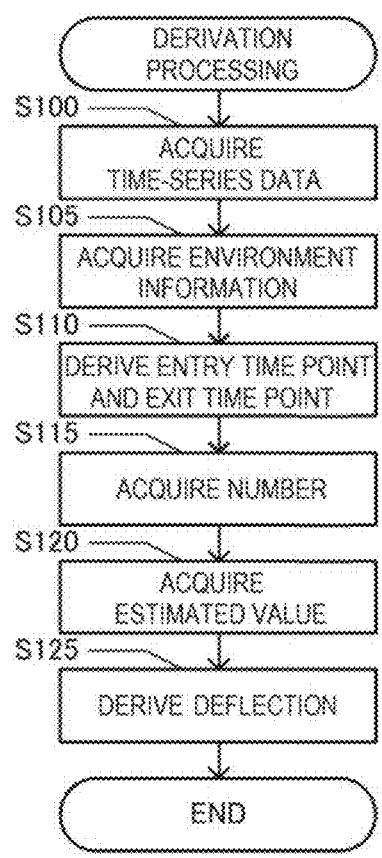
FIG. 35 is a flowchart showing the derivation processing.

Processing of deriving the vibration component of the dynamic response at the designated position 9 executed by the server device 3 will be described with reference to FIG. 35. The server device 3 starts processing in FIG. 35 in response to the fact that the data of the displacement at the observation point is transmitted from the measurement device 1, but may start the processing in FIG. 35 at any timing such as a designated timing.

In S100, the control unit 300 acquires the time-series data u(t) of the deflection generated at the observation point from the measurement device 1 by the function of the acquisition unit 301. S100 is an example of an acquisition step.

In S105, with the function of the environment information acquisition unit 302, the control unit 300 acquires information on the bridge length $L_B$ of the unit bridge girder, the vehicle length $L_c$ of each railway vehicle of the railway train 6, and the distance $L_a$ indicating the position of each railway vehicle of the railway train 6 as the environment information. S105 is an example of an environment information acquisition step.

In S110, with the function of the time point derivation unit 303, the control unit 300 executes the FFT on u(t) and detects peaks from the FFT result. The control unit 300 specifies, among the detected peaks, a peak corresponding to a minimum frequency excluding a peak of a side lobe generated due to an influence of a window function used in the FFT. The control unit 300 derives the frequency corresponding to the specified peak as the fundamental frequency $F_f$ of u(t). The control unit 300 derives the cycle $T_f$ by deriving the reciprocal of $F_f$ based on the acquired fundamental frequency $F_f$ in the same manner as in Equation (35). The control unit 300 derives the interval $k_{mf}$ using Equation (49) based on the derived $T_f$ and $\Delta T$ which is a predetermined cycle. The control unit 300 derives $u_{lp}(t)$ using Equation (50) based on the derived interval $k_{mf}$.

In addition, the control unit 300 extracts an interval having a predetermined value (for example, 1 second, seconds, or the like) from $u_{lp}(t)$, and when the absolute value of the difference between the maximum value and the minimum value of the deflection amount in the extracted interval is equal to or less than a predetermined threshold, the control unit 300 determines the extracted interval as an interval in which the deflection amount is shifted. The control unit 300 obtains an average value of $u_{lp}(t)$ for the interval in which the deflection amount is shifted, and derives a product of the obtained average value and a predetermined coefficient as the threshold $C_L$.

Then, the control unit 300 obtains an intersection point of $u_{lp}(t)$ and the derived threshold $C_L$. Specifically, the control unit 300 obtains two values of t that satisfy $u_{lp}(t)=C_L$. Then, the control unit 300 derives the time point indicated by the smaller one of the obtained values of t as the entry time point $t_i$ of the railway train 6 entering into the unit bridge girder. In addition, the control unit 300 derives the time point indicated by the larger one of the obtained values of t as the exit time point $t_o$ of the railway train 6 exiting from the unit bridge girder. S110 is an example of a time point derivation step.

In S115, with the function of the number acquisition unit 304, the control unit 300 derives the passing period is during which the railway train 6 passes through the unit bridge girder using Equation (1) based on $t_i$ and to derived in S110. Then, the control unit 300 derives the wave number v of the fundamental frequency $F_f$ included in the passing period is using Equation (33) based on $F_f$ derived in S110 and the derived $t_s$. Based on the derived v, the control unit 300 derives the number N of railway vehicles included in the railway train 6 using Equation (34), thereby acquiring N. S115 is an example of a number acquisition step.

In S120, with the function of the estimated value acquisition unit 305, the control unit 300 derives $t_s$ from $t_i$ and $t_o$ using Equation (1). The control unit 300 derives $v_a$ from $t_s$, N, $a_r$, $L_a$, $L_B$, and $L_c$ using Equation (5). That is, $v_a$ is derived as a value obtained by dividing the sum of the distance from the foremost axle (the first axle of the foremost railway vehicle) to the rearmost axle (the $a_r(N)$th axle of the rearmost railway vehicle) in the railway train formed with N railway vehicles and the bridge length $L_B$ by the passing period $t_s$ which is a period from the entry time point $t_i$ to the exit time point $t_o$. The control unit 300 derives $t_{xn}$ and $t_{ln}$ from $v_a$, $L_B$, and $L_x$ using Equation (22) and Equation (23). In addition, the control unit 300 derives $t_o(m, n)$ from $L_a$, $L_c$, and $t_i$ using Equation (3) and Equation (24). Then, the control unit 300 derives the function $w_{std}(a_w(m, n), t)$ for each axis of each railway vehicle of the railway train 6 by substituting the derived $t_{xn}$, $t_{ln}$, and $t_o(m, n)$ into Equation (29) and Equation (30).

The control unit 300 adds up $w_{std}(a_w(m, n), t)$ for the axles for N railway vehicles of the railway train 6 using Equation (31), thereby deriving $C_{std}(m, t)$ indicating the deflection of the unit bridge girder due to the passage of the railway vehicles. Then, the control unit 300 derives $T_{std}(t)$ as the deflection of the unit bridge girder due to the passage of the railway train by adding up $C_{std}(m, t)$ of the N railway vehicles using Equation (32). In this way, the control unit 300 acquires the derived $T_{std}(t)$ as the normalized deflection amount $T_{std\_R}(t)$ at the observation point.

In addition, the control unit 300 obtains $T_{std\_R\_lp}(t)$ by subjecting $T_{std\_R}(t)$ to the low-pass filter processing for attenuating a component equal to or higher than the fundamental frequency. Based on $u_{lp}(t)$ and $T_{std\_R\_lp}(t)$, the control unit 300 derives the coefficients $c_1$ and $c_0$ of a linear function having $T_{std\_R\_lp}$ t which approximates $u_{lp}(t)$ shown in Equation (50), as arguments, by using Equation (51) and Equation (52). Here, to is the entry time point $t_i$. In addition, $t_b$ is the exit time point $t_o$.

As shown in the right side of Equation (50), the control unit 300 obtains the deflection amount restored using $T_{std\_R\_lp}(t)$ and the coefficients $c_1$ and $c_0$ as $T_{Estd\_R\_lp}(t)$. The control unit 300 derives the amplitude ratio $R_r$ of $T_{Estd\_R\_lp}(t)$ to $T_{std\_R\_lp}(t)$ using Equation (55).

The control unit 300 derives the offset $T_{offset\_R\_std}(t)$ at the observation point using Equation (56) based on $R_r$ and $T_{std\_R\_lp}(t)$.

Then, the control unit 300 derives $T_{EO\_R}(t)$ using Equation (57) based on $c_1$, $T_{std\_R}(t)$, and $T_{offset\_R\_std}(t)$. S120 is an example of an estimated value acquisition step.

In S125, with the function of the deflection derivation unit 306, the control unit 300 acquires, using Equation (67), the vibration component $u_{nv}(t)$ of the dynamic response at the observation point by subtracting $T_{EO\_R}(t)$ from u(t). The control unit 300 performs the FFT on $u_{nv}(t)$, and specifies a peak having an intensity equal to or greater than the predetermined threshold from the result of the FFT of $u_{nv}(t)$. Then, the control unit 300 specifies the peak having the minimum corresponding frequency among the specified peaks, and specifies the frequency corresponding to the specified peak as the fundamental frequency of the natural frequency of the unit bridge girder. In addition, the control unit 300 specifies a frequency corresponding to each of the other specified peaks. Then, the control unit 300 derives, for each of the specified frequencies, a value obtained by dividing the frequency by the fundamental frequency and rounding the divided frequency to a natural number. Then, the control unit 300 acquires each of the derived natural numbers and one as the acquisition order.

The control unit 300, with each of the acquisition orders being sequential q, extracts the component $u_{nv\_q}(t)$ of the q-th order wave by subjecting $u_{nv}(t)$ to the bandpass filter processing for extracting a component of a frequency q times the fundamental frequency.

The control unit 300, with each of the acquisition orders being sequential q, derives, as r=R, the deflection amount $w_{q\_std}(R)$ according to the q-th order wave using Equation (80), the deflection amount being normalized at the observation point. In addition, the control unit 300, with each of the acquisition orders being sequential q, derives, as $r=r_x$, the deflection amount $w_{q\_std}(r_x)$ according to the q-th order wave using Equation (80), the deflection amount being normalized at the designated position 9.

The control unit 300, with each of the acquisition orders being sequential q, derives the ratio $Cr_q$ of $w_{q\_std}(R)$ to $w_{q\_std}(r_x)$ using Equation (81).

Then, the control unit 300, with each of the acquisition orders being sequential q, derives the product of the component $u_{nv\_q}(t)$ of the q-th order wave and the ratio $Cr_q$ as the component $u_{nv\_q\_rx}(t)$ of the q-th order wave of the vibration component of the dynamic response at the designated position 9, as in Equation (82). The control unit 300 derives, using Equation (83), the estimated value $u_{nv\_q\_est}(t)$ of the vibration component of the dynamic response at the designated position 9 by adding $u_{nv\_q\_rx}(t)$ derived for each of the acquisition orders. S125 is an example of a deflection derivation step.

(3) Other Embodiments

The above embodiments are examples for carrying out the present disclosure, and various other embodiments can be adopted. The method of deriving the deflection amount due to the resonance at the designated position from the displacement at the observation point as in the above embodiment can also be implemented as an invention of a program or an invention of a method.

Further, a configuration in which the function of the server device 3 is implemented by a plurality of devices may be adopted. The functions of the server device 3 may be distributed and implemented in a plurality of devices. In addition, the functions of the server device 3 may be implemented in another device. For example, the functions of the acquisition unit 301, the environment information acquisition unit 302, the time point derivation unit 303, the number acquisition unit 304, the estimated value acquisition unit 305, and the deflection derivation unit 306 may be implemented in the measurement device 1. The server device 3 may be distributed in a plurality of devices, or the like. Further, the above embodiments are examples, and an embodiment in which a part of the configuration is omitted or another configuration is added may be adopted.

In the above embodiment, the derivation system 10 derives the deflection amount of the bridge through which the railway train 6 formed with one or more railway vehicles passes. However, the derivation system 10 may derive the deflection amount of the bridge in which the other formation moving object moves. For example, the derivation system 10 may derive a deflection amount of a bridge through which a formation truck in which one or more trucks are coupled, a trailer in which a plurality of vehicles are coupled, or the like passes. In addition, the derivation system 10 may derive a deflection amount of a structure different from a bridge such as a base that supports a railroad track.

In addition, in the above embodiment, the number of sensor devices 2 included in the derivation system 10 is two, but may be one or three or more.

In the above embodiment, the control unit 300 acquires, as the time-series data u(t), the data of displacement (deflection) measured from the acceleration detected via the acceleration sensor 210. However, the control unit 300 may acquire, as u(t), displacement data of the bridge derived from a physical quantity detected via a sensor such as an impact sensor, a pressure-sensitive sensor, a strain gauge, an image measuring device, a load cell, or a displacement gauge. For example, the control unit 300 may detect the displacement of the observation point and acquire the detected displacement data by the image measuring device capturing an image of a predetermined object in a cycle, the predetermined object being disposed at the observation point of the bridge 5. The control unit 300 may acquire data of a physical quantity different from the displacement of the bridge as u(t). For example, the control unit 300 may acquire, as u(t), the number of pixels indicating the displacement amount of the predetermined object disposed at the observation point of the bridge 5 in the image captured via the image measuring device.

Further, in the above embodiment, the control unit 300 specifies the peak corresponding to the lowest frequency, except for the side lobe generated due to the influence of the window function used in the FFT, from the result of the FFT on the time-series data u(t) acquired by the function of the acquisition unit 301, and obtains the specified peak as the fundamental frequency $F_f$. However, in consideration of an influence of a noise generated in the result of the FFT on u(t), the control unit 300 may obtain the fundamental frequency $F_f$. For example, the control unit 300 may specify a peak equal to or greater than a predetermined threshold corresponding to the lowest frequency, except for the side lobe generated due to the influence of the window function used in the FFT, from the result of the FFT on u(t), and obtain the specified peak as the fundamental frequency $F_f$.

In the above embodiment, the derivation system 10 derives the vibration component of the dynamic response at the designated position 9. However, the derivation system 10 may further derive a deflection amount $T_{EO\_rx}(t)$ which is a static response at the designated position 9, and derive a deflection amount obtained by adding the derived vibration component $u_{nv\_q\_est}(t)$ and the static response $T_{EO\_rx}(t)$, as an estimated value of the dynamic response at the designated position 9.

For example, the control unit 300 may derive $T_{EO\_rx}(t)$ as follows. The control unit 300 acquires $T_{std\_R}(t)$. In addition, the control unit 300 derives the estimated value $T_{std\_rx}$ of the normalized deflection amount generated at the designated position 9 due to the passage of the railway train 6 when N railway vehicles are formed in the railway train 6, the number of the railway vehicles being acquired with the function of the number acquisition unit 304. Specifically, the control unit 300 replaces $L_x$ with $L_B \times r_x$ from $v_a$, $L_B$, and $r_x$, and derives $t_{xn}$ and $t_{ln}$ using Equation (22) and Equation (23). In addition, the control unit 300 derives $t_o(m, n)$ from $L_a$, $L_c$, and $t_i$ using Equation (3) and Equation (24). Then, the control unit 300 derives the function $w_{std}(a_w(m, n), t)$ for each axis of each railway vehicle of the railway train 6 by substituting the derived $t_{xn}$, $t_{ln}$, and $t_o(m, n)$ into Equation (29) and Equation (30).

The control unit 300 adds up $w_{std}(a_w(m, n), t)$ for the axles for N railway vehicles of the railway train 6 using Equation (31), thereby deriving $C_{std}(m, t)$ indicating the deflection of the unit bridge girder due to the passage of the railway vehicles. Then, the control unit 300 derives $T_{std}(t)$ as the deflection of the unit bridge girder due to the passage of the railway train by adding up $C_{std}(m, t)$ of the N railway vehicles using Equation (32). In this way, the control unit 300 acquires the normalized deflection amount $T_{std}(t)$ at the designated position 9 as $T_{std\_rx}(t)$.

The control unit 300 obtains $T_{std\_rx\_lp}(t)$ by subjecting $T_{std\_rx}(t)$ to the low-pass filter processing for attenuating a component of a frequency equal to or higher than the fundamental frequency. Specifically, the control unit 300 executes the FFT on $T_{std\_rx}(t)$, and specifies a peak corresponding to a minimum frequency obtained by excluding a peak of a side lobe generated due to an influence of a window function used in the FFT from a result of the FFT. Then, the control unit 300 sets the frequency corresponding to the specified peak as the fundamental frequency $F_f$, and derives the interval $k_{mf}$ using Equation (36). Based on the derived $k_{mf}$, the control unit 300 replaces $T_{std\_rx\_lp}(t)$ with $T_{std\_rx}(t)$ replaces $T_{std\_lp}$ with $T_{std\_rx\_lp}(t)_r$ and derives $T_{std\_rx\_lp}(t)$ using Equation (37). However, the control unit 300 may obtain $T_{std\_rx\_lp}$) by applying, to $T_{std\_rx}(t)$, another FIR filter that attenuates a component of a frequency equal to or higher than the fundamental frequency. Similarly, the control unit 300 obtains $T_{std\_R\_lp}(t)$ by subjecting $T_{std\_R}(t)$ to the low-pass filter processing for attenuating a component of a frequency equal to or higher than the fundamental frequency.

The control unit 300 derives the amplitude $h_{rx}$ of $T_{std\_rx\_lp}$) using Equation (58). $t_1$ and $t_2$ are respectively a start time point and an end time point of a period having a predetermined width (for example, 1 second, 2 seconds, or the like) in the center of the passing period is (the period from the entry time point $t_i$ to the exit time point $t_o$), but may be those of another period.

The control unit 300 derives the coefficients $c_1$ and $c_0$ using Equation (51) and Equation (52) based on $u_{lp}(t)$ and $T_{std\_R\_lp}(t)$. That is, the control unit 300 derives the coefficients $c_1$ and $c_0$ of the linear function for $T_{std\_R\_lp}(t)$ that approximates $u_{lp}(t)$. Based on $c_1$, $c_0$, and $h_{rx}$, the control unit 300 derives, using Equation (59), the function $R_{r\_rx}(t)$ of the amplitude ratio of the deflection amount $T_{Estd\_rx\_lp}(t)$ restored by adding $c_0$ to the product of $T_{std\_rx\_lp}(t)$ and the coefficient $c_1$ to $T_{std\_rx\_lp}(t)$. Then, based on $t_1$, $t_2$, and $T_{std\_rx\_lp}(t)$, the control unit 300 derives the average amplitude ratio $R_{r\_rx}$ of $R_{r\_rx}(t)$ during the period from $t_1$ to $t_2$ using Equation (60). However, the control unit 300 may derive the amplitude ratio $R_{r\_rx}$ using Equation (61) based on $c_1$, $c_0$, and $h_{rx}$.

The control unit 300 derives the deflection amount $T_{r\_rx}$ obtained by multiplying $T_{std\_rx\_lp}(t)$ by $R_{r\_rx}$ using Equation (62). However, the control unit 300 may derive the deflection amount $T_{r\_rx}$ using Equation (63) based on $T_{std\_rx\_lp}(t)$, $c_1$, and $c_0$. In addition, the control unit 300 may obtain $T_{r\_rx}$ as in Equation (64) by setting $c_0=0$ before the entry time point $t_i$ and after the exit time point $t_o$.

Then, based on the derived $T_{r\_rx}$, the control unit 300 derives the offset $T_{offset\_rx}(t)$ of the deflection amount at the designated position 9 using Equation (65). That is, the control unit 300 derives $T_{r\_rx}$ obtained by rounding an element whose absolute value is larger than $c_0$ to $c_0$ as the offset $T_{offset\_rx}(t)$. The control unit 300 acquires, using Equation (66), the estimated value $T_{EO\_rx}(t)$ of the deflection amount, which is a static response at the designated position on the bridge, by adding the offset $T_{offset\_rx}(t)$ to the product of the coefficient $c_1$ and $T_{std\_rx}(t)$.

As described above, the control unit 300 may derive $T_{EO\_rx}(t)$.

However, the control unit 300 may acquire the estimated value $T_{EO\_rx}(t)$ by another method. For example, the control unit 300 may acquire the estimated value $T_{EO\_rx}(t)$ as follows.

The control unit 300 specifies, as a period from when deflection starts to when the deflection converges, a period from a time point t1 at which the deflection starts and the value of the deflection amount becomes larger than 0 to a time point t2 at which the deflection converges and the value of the deflection amount converges to 0, in $T_{std\_R}(t)$ and $T_{std\_rx}(t)$. Then, the control unit 300 derives a ratio $R_{rx\_R}(t)$ of $T_{std\_R}(t)$ to $T_{std\_rx}(t)$ using the following Equation (87).

$$R_{rx\_R}(t) = \frac{T_{std\_rx}(t)}{T_{std\_R}(t)} \qquad (87)$$

Based on $t_1$, $t_2$, and $R_{rx\_R}(t)$, the control unit 300 derives an average value Ravg of the ratio of $T_{std\_R}(t)$ to $T_{std\_rx}(t)$ in the period from the time point $t_i$ to the time point $t_2$ using the following Equation (88).

$$Ravg = \frac{1}{t_2 - t_1} \sum_{t=t_1}^{t_2} R_{rx\_R}(t) \qquad (88)$$

However, the control unit 300 may derive, as Ravg, an average value of ratios of $T_{std\_R}(t)$ and $T_{std\_rx}(t)$ in a period different from the period from the time point $t_i$ to the time point $t_2$. For example, the control unit 300 may derive, as Ravg, an average value of ratios of $T_{std\_R}(t)$ and $T_{std\_rx}(t)$ in the passing period $t_s$. In this case, the control unit 300 may derive Ravg using Equation (88) by replacing $t_1$ and $t_2$ in Equation (88) with $t_i$ and $t_o$.

Then, the control unit 300 may acquire, as the estimated value $T_{EO\_rx}(t)$ of the deflection amount at the designated position 9, a value obtained by multiplying the time-series data u(t) by Ravg. However, the control unit 300 may derive, as the estimated value $T_{EO\_rx}(t)$ of the deflection amount at the designated position 9, a value obtained by multiplying the value of each t of the time-series data u(t) by the corresponding data included in $R_{rx\_R}(t)$.

The time-series data may be data acquired at a data rate of twice or more the frequency of vibration assumed to occur in the structure due to the movement of the formation moving object.

Further, the present disclosure can also be applied as a program executed by a computer or a method. In addition, the program and method as described above may be implemented as a single device or may be implemented by using components included in a plurality of devices, and includes various aspects. In addition, it is possible to appropriately change the configuration such that a part of the configuration is software and a part of the configuration is hardware. Further, the present disclosure is also applicable to a recording medium of a program. As a matter of course, the recording medium of the program may be a magnetic recording medium, a semiconductor memory, or the like, and any recording medium to be developed in the future can be considered in the same manner.

What is claimed is:

1. A derivation method for causing a processor to execute a process, the derivation method comprising executing on the processor the steps of:
    acquiring time-series data including acceleration generated at a predetermined observation point of a superstructure of a bridge as a response caused by a movement of a formation moving vehicle formed with one or more moving vehicles on the superstructure, a value of the acceleration being detected by an acceleration sensor disposed at the predetermined observation point of the superstructure;
    acquiring, as environment information, information on a structure length that is a length of the superstructure, a moving vehicle length that is a length of the formation moving vehicle, and an installation position of each of a plurality of wheels of the formation moving vehicle with the superstructure;
    deriving an entry time point and an exit time point of the formation moving vehicle with respect to the superstructure, based on the time-series data;
    acquiring a number of the one or more moving vehicles formed in the formation moving vehicle;
    acquiring an estimated value of a third deflection amount of the superstructure at the predetermined observation point due to a first static response generated as the response, based on the number of the one or more moving vehicles, the entry time point, the exit time point, the environment information, and a deflection model of the superstructure;
    deriving a dynamic response at a designated position based on:
        a fourth deflection amount normalized by a first vibration component of the dynamic response, the first vibration component corresponding to a difference between the time-series data and the estimated value, the fourth deflection amount being derived based on the deflection model and the first vibration component;
        an amplitude ratio of
            a first deflection amount that is normalized and indicates a distribution of a vibration amplitude at the predetermined observation point to
            a second deflection amount that is the normalized and indicates a distribution of the vibration amplitude at the designated position of the superstructure, the designated position being different from the predetermined observation point;
        a second vibration component of the designated position derived based on the first vibration component and the amplitude ratio; and
        a second static response of the designated position derived based on the time-series data and the estimated value; and
    diagnosing a state of the superstructure of the bridge at the designated position based on the dynamic response.

2. The derivation method according to claim 1, wherein the second static response of the designated position is an estimated value of the second deflection amount at the designated position, and
the second static response is generated in the superstructure due to the movement of the formation moving vehicle, based on the number of the one or more moving vehicles, the entry time point, the exit time point, and the environment information.

3. The derivation method according to claim 1, wherein the amplitude ratio is a ratio of the first deflection amount indicating the distribution of the vibration amplitude derived based on how many times a frequency of the first vibration component is a fundamental frequency and a position of the predetermined observation point to the second deflection amount indicating the distribution of the vibration amplitude derived based on how many times a frequency of the second vibration component is the fundamental frequency and a position of the designated position.

4. The derivation method according to claim 1, wherein one or more frequencies are determined from a fundamental frequency and a harmonic frequency of the first vibration component, and components of the determined frequencies are extracted from the first vibration component,
the amplitude ratio is derived for each of the frequencies based on a normalized deflection amount of an order of the frequencies,
a value obtained by multiplying the component corresponding to the frequency by the corresponding amplitude ratio is derived for each of the frequencies, as the second vibration component of the frequency at the designated position, and
a sum of the derived second vibration component of each of the frequencies and the second static response at the designated position is derived as the dynamic response at the designated position.

5. The derivation method according to claim 4, wherein in the derivation of the amplitude ratio,
for the determined frequency, the first deflection amount is derived using Equation (1) in which the predetermined observation point in the superstructure is R when an order of the frequency is q and the structure length is one, the second deflection amount is derived using Equation (2) in which the designated position in the superstructure is r when the order of the frequency is q and the structure length is one, and a ratio of the derived first deflection amount to the derived second deflection amount is derived as the amplitude ratio.

$$\text{FIRST DEFLECTION} = (-1)^{\lfloor qR \rfloor}(3A - 4A^3) \quad (1)$$

$$\rightarrow A = \begin{cases} 0 \le qR \bmod 1 \le 0.5: & qR \bmod 1 \\ 0.5 < qR \bmod 1 \le 1: & 1 - qR \bmod 1 \end{cases} \rightarrow$$

$$\text{SECOND DEFLECTION} = (-1)^{\lfloor qR \rfloor}(3A - 4A^3) \quad (2)$$

$$\rightarrow A = \begin{cases} 0 \le qR \bmod 1 \le 0.5: & qR \bmod 1 \\ 0.5 < qR \bmod 1 \le 1: & 1 - qR \bmod 1 \end{cases} \rightarrow$$

6. The derivation method according to claim 4, wherein in the derivation of the amplitude ratio, for the determined frequency, the first deflection amount is derived using Equation (3) in which the predetermined observation point in the superstructure is R when an order of the frequency is q the structure length is one, and the second deflection amount is derived using Equation (4) in which the designated position in the superstructure is r when the order of the frequency is q and the structure length is one, and a ratio of the derived first deflection amount to the derived second deflection amount is derived as the amplitude ratio.

$$\text{FIRST DEFLECTION} = \sin(qR\pi) \rightarrow \quad (3)$$

$$\text{SECOND DEFLECTION} = \sin(qr\pi) \rightarrow \quad (4)$$

7. The derivation method according to claim 1, wherein each of the one or more moving vehicles is a railway vehicle that moves on the superstructure via the plurality of wheels.

8. The derivation method according to claim 1, wherein the deflection model of the superstructure is an equation based on an architecture of the superstructure.

9. The derivation method according to claim 1, wherein the superstructure of the bridge is a simple beam supported at both ends.

10. The derivation method according to claim 1, wherein Bridge Weigh in Motion (BWIM) is applicable to the superstructure.

11. A derivation device, comprising:

a memory configured to store a program; and a processor configured to execute the program so as to:
 acquire time-series data including acceleration generated at a predetermined observation point of a superstructure of a bridge as a response caused by a movement of a formation moving vehicle formed with one or more moving vehicles on the superstructure, a value of the acceleration being detected by an acceleration sensor disposed at the predetermined observation point of the superstructure;
 acquire, as environment information, information on a structure length that is a length of the superstructure, a moving vehicle length that is a length of the formation moving vehicle, and an installation position of each of a plurality of wheels of the formation moving vehicle with the superstructure;
 derive an entry time point and an exit time point of the formation moving vehicle with respect to the superstructure based on the time-series data;
 acquire a number of the one or more moving vehicles formed in the formation moving vehicle;
 acquire an estimated value of a third deflection amount of the superstructure at the predetermined observation point due to a first static response generated as the response, based on the number of the one or more moving vehicles, the entry time point, the exit time point, the environment information, and a deflection model of the superstructure;
 derive a dynamic response at a designated position based on:
  a fourth deflection amount normalized by a first vibration component of the dynamic response, the first vibration component corresponding to a difference between the time-series data and the estimated value, the fourth deflection amount being derived based on the deflection model and the first vibration component;
  an amplitude ratio of
   a first deflection amount that is normalized and indicates a distribution of a vibration amplitude at the predetermined observation point to
   a second deflection amount that is normalized and indicates a distribution of the vibration amplitude at the designated position of the superstructure, the designated position being different from the predetermined observation point;
  a second vibration component of the designated position derived based on the first vibration component and the amplitude ratio; and
  a second static response of the designated position derived based on the time-series data and the estimated value; and
 diagnose a state of the superstructure of the bridge at the designated position based on the dynamic response.

12. A derivation system comprising:

an acceleration sensor configured to detect acceleration;

a memory configured to store a program; and a processor configured to execute the program so as to:
 acquire time-series data including the acceleration generated at a predetermined observation point of a superstructure of a bridge as a response caused by a movement of a formation moving vehicle formed with one or more moving vehicles on the superstructure, a value of the acceleration being detected by the acceleration sensor disposed at the predetermined observation point of the superstructure;
 acquire, as environment information, information on a structure length that is a length of the superstructure, a moving vehicle length that is a length of the formation moving vehicle, and an installation position of each of a plurality of wheels of the formation moving vehicle with the superstructure;
 derive an entry time point and an exit time point of the formation moving vehicle with respect to the superstructure based on the time-series data;
 acquire a number of the one or more moving vehicles formed in the formation moving vehicle;
 acquire an estimated value of a third deflection amount of the superstructure at the predetermined observation point due to a first static response generated as the response, based on the number of the one or more moving vehicles, the entry time point, the exit time point, the environment information, and a deflection model of the superstructure;
 derive a dynamic response at a designated position based on:
  a fourth deflection amount normalized by a first vibration component of the dynamic response, the first vibration component corresponding to a difference between the time-series data and the estimated value, the fourth deflection amount being derived based on the deflection model and the first vibration component;
  an amplitude ratio of
   a first deflection amount that is normalized and indicates a distribution of a vibration amplitude at the predetermined observation point to
   a second deflection amount that is normalized and indicates a distribution of the vibration amplitude at the designated position of the superstructure, the designated position being different from the predetermined observation point;
a second vibration component of the designated position derived based on the first vibration component and the amplitude ratio; and
a second static response of the designated position derived based on the time-series data and the estimated value; and
diagnose a state of the superstructure of the bridge at the designated position based on the dynamic response.

13. A non-transitory computer-readable storage medium storing a program, the program for causing a computer to execute a process by a processor so as to perform the steps of:
acquiring time-series data including acceleration generated at a predetermined observation point of a superstructure of a bridge as a response caused by a movement of a formation moving vehicle formed with one or more moving vehicles on the superstructure, a value of the acceleration being detected by an acceleration sensor disposed at the predetermined observation point of the superstructure;
acquiring, as environment information, information on a structure length that is a length of the superstructure, a moving vehicle length that is a length of the formation moving vehicle, and an installation position of each of a plurality of wheels of the formation moving vehicle with the superstructure;
deriving an entry time point and an exit time point of the formation oving vehicle with respect to the superstructure based on the time-series data;
acquiring a number of the one or more moving vehicles formed in the formation moving vehicle;
acquiring an estimated value of a third deflection amount of the superstructure at the predetermined observation point due to a first static response generated as the response, based on the number of the one or more moving vehicles, the entry time point, the exit time point, the environment information, and a deflection model of the superstructure;
deriving a dynamic response at a designated position based on:
a fourth deflection amount normalized by a first vibration component of the dynamic response, the first vibration component corresponding to a difference between the time-series data and the estimated value, the fourth deflection amount being derived based on the deflection model and the first vibration component;
an amplitude ratio of
a first deflection amount that is normalized and indicates a distribution of a vibration amplitude at the predetermined observation point to
a second deflection amount that is normalized and indicates a distribution of the vibration amplitude at the designated position of the, superstructure, the designated position being different from the predetermined observation point;
a second vibration component of the designated position derived based on the first vibration component and the amplitude ratio; and
a second static response of the designated position derived based on the time-series data and the estimated value; and
diagnosing a state of the superstructure of the bridge at the designated position based on the dynamic response.

* * * * *